(12) United States Patent
Wheatley et al.

(10) Patent No.: US 12,416,227 B2
(45) Date of Patent: Sep. 16, 2025

(54) OILFIELD SYSTEM

(71) Applicant: Sensia Netherlands B.V., Rotterdam (NL)

(72) Inventors: Robb Wheatley, Houston, TX (US); Emmanuel Coste, Katy, TX (US); Yves-Marie Subervie, Houston, TX (US); Nam Tuan Nguyen, Houston, TX (US); John MacDonald, Aberdeenshire (GB); Jonathan Wun Shiung Chong, Calgary (CA); Carlos Rocha, Icarai-Niteroi-RJ (BR); Matthew Worthington, Houston, TX (US); Jeffery Anderson, Beaumont (CA); Alex Bird, Calgary (CA); Christy Rubenstein, Houston, TX (US); Ying Wang, Houston, TX (US)

(73) Assignee: Sensia Netherlands B.V., Rotterdam (NL)

( * ) Notice: Subject to any disclaimer, the term of this patent is extended or adjusted under 35 U.S.C. 154(b) by 0 days.

(21) Appl. No.: 18/620,847

(22) Filed: Mar. 28, 2024

(65) Prior Publication Data
US 2024/0352839 A1 Oct. 24, 2024

Related U.S. Application Data

(63) Continuation of application No. 17/282,586, filed as application No. PCT/US2019/054405 on Oct. 3, 2019, now abandoned.

(60) Provisional application No. 62/873,942, filed on Jul. 14, 2019, provisional application No. 62/740,949, filed on Oct. 3, 2018.

(51) Int. Cl.
E21B 43/00 (2006.01)
E21B 43/25 (2006.01)
E21B 43/30 (2006.01)
E21B 47/02 (2006.01)

(52) U.S. Cl.
CPC .............. *E21B 43/25* (2013.01); *E21B 43/30* (2013.01); *E21B 47/02* (2013.01)

(58) Field of Classification Search
CPC .................................................. E21B 43/2607
See application file for complete search history.

(56) References Cited

U.S. PATENT DOCUMENTS 6,199,018 B1 * 3/2001 Quist ................. G01M 13/045
706/912
6,772,082 B2 8/2004 Van Der Geest et al.
7,108,069 B2 9/2006 Killie et al.
(Continued)

OTHER PUBLICATIONS

EP Search Report on EP Appl. Ser. No. 19869367.3 dated May 16, 2022 (7 pages).
(Continued)

Primary Examiner — Kenneth L Thompson
(74) Attorney, Agent, or Firm — Foley & Lardner LLP

(57) ABSTRACT

A method can include receiving time series data acquired during equipment operations at a plurality of natural resource sites; detecting operational events using the time series data; ranking the operational events; associating each of the operational events with a corresponding operational action; and outputting at least a portion of the ranked operational events, each with its corresponding operational action.

15 Claims, 27 Drawing Sheets

(56) References Cited

U.S. PATENT DOCUMENTS

| | | | |
|---|---|---|---|
| 7,114,557 B2 * | 10/2006 | Cudmore | E21B 47/008 |
| | | | 175/45 |
| 8,838,390 B1 | 9/2014 | Selman et al. | |
| 9,013,322 B2 * | 4/2015 | Roberson | G01V 3/00 |
| | | | 175/2 |
| 9,022,140 B2 | 5/2015 | Marx et al. | |
| 9,163,499 B2 | 10/2015 | Adams et al. | |
| 9,534,473 B2 * | 1/2017 | Morris | E21B 41/00 |
| 10,062,044 B2 | 8/2018 | Hildebrand et al. | |
| 10,227,859 B2 * | 3/2019 | Richards | E21B 41/00 |
| 2007/0175633 A1 * | 8/2007 | Kosmala | E21B 47/008 |
| | | | 166/250.15 |
| 2013/0080062 A1 | 3/2013 | Aamodt et al. | |
| 2013/0173165 A1 | 7/2013 | Balogun et al. | |
| 2014/0237487 A1 | 8/2014 | Prasanna et al. | |
| 2015/0015412 A1 | 1/2015 | Abbassian et al. | |
| 2015/0095100 A1 * | 4/2015 | Vittal | G05B 23/0213 |
| | | | 700/282 |
| 2016/0032705 A1 | 2/2016 | Benson et al. | |
| 2016/0168953 A1 * | 6/2016 | Zhang | E21B 43/2607 |
| | | | 702/35 |
| 2017/0130712 A1 * | 5/2017 | Zhang | F04B 49/065 |
| 2018/0156004 A1 | 6/2018 | Hussain et al. | |
| 2021/0348490 A1 * | 11/2021 | Wheatley | E21B 47/02 |

OTHER PUBLICATIONS

International Search Report and Written Opinion on PCT Appl. Ser. No. PCT/US2019/054405 dated Nov. 4, 2019 (15 pages).

SA Office Action on SA Appl. Ser. No. 521421627 dated Mar. 30, 2023 (12 pages).

MX Office Action on PCT Application MX/a/2021/003851 dated Jan. 14, 2025.

UAE Examination Search Report on Appl. No. P6000512/2012 dated Oct. 10, 2024.

Second Substantive Examination dated Jul. 22, 2025, on MX/a/2021/003851.

* cited by examiner

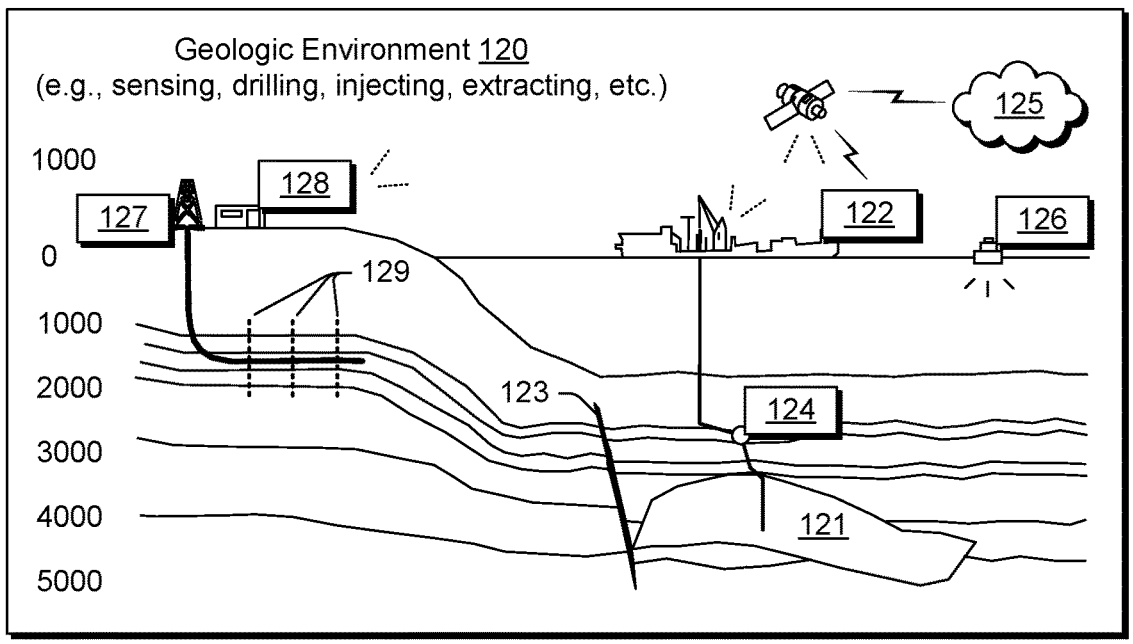
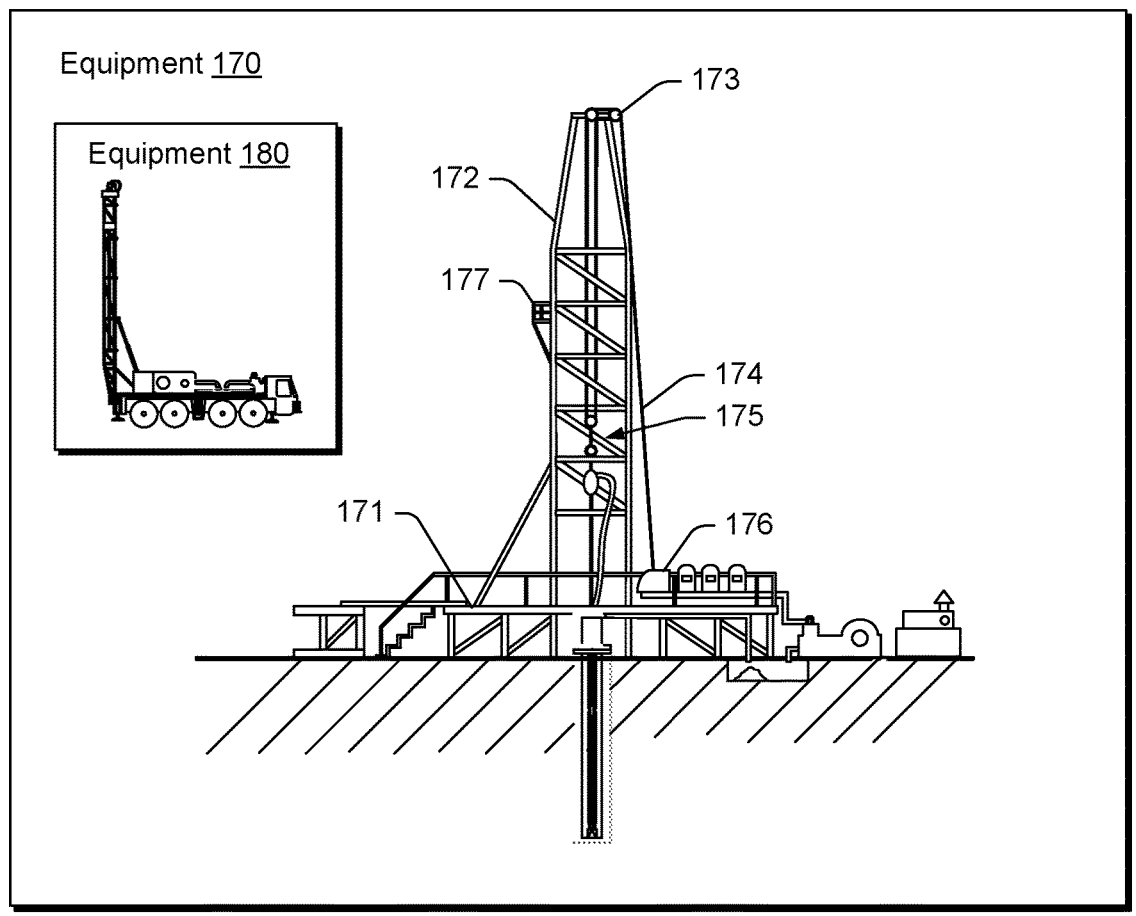
Fig. 1

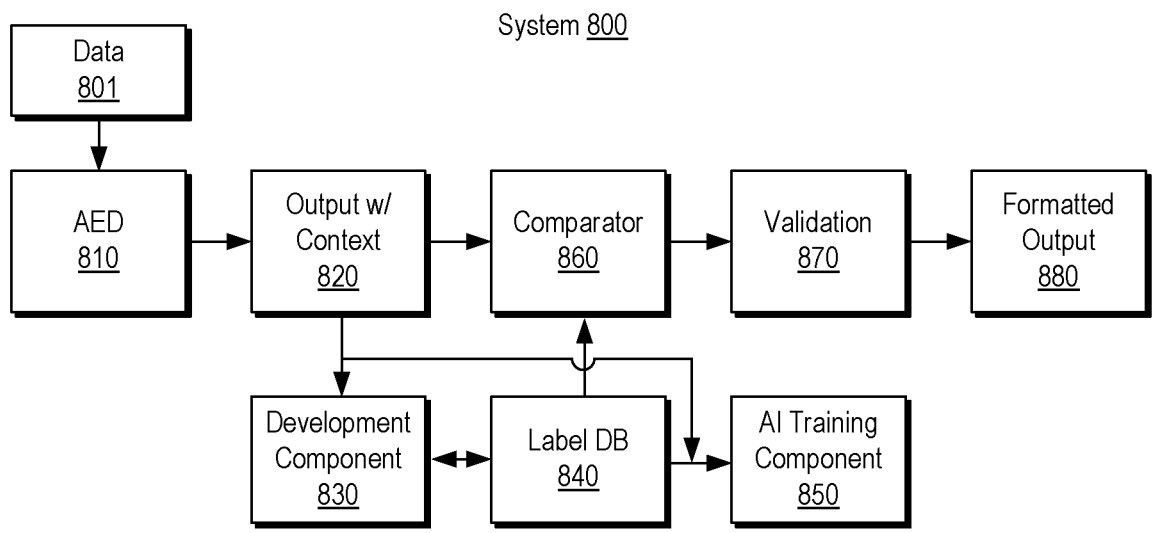
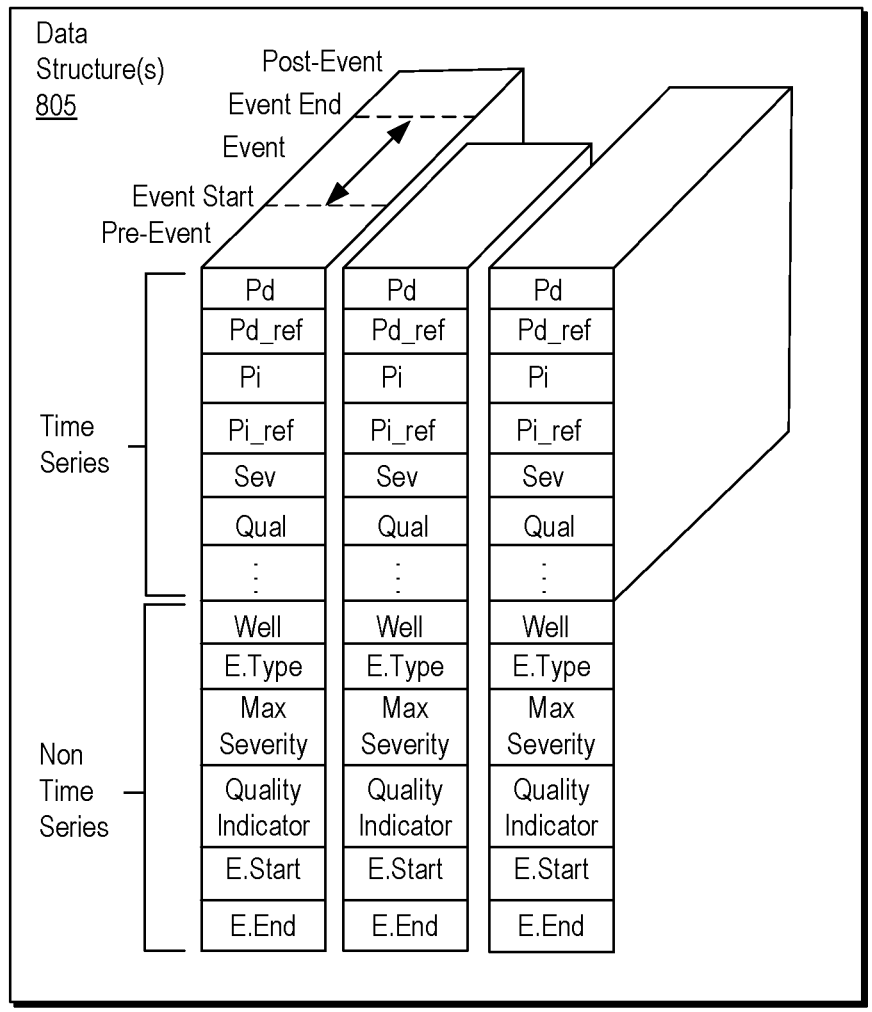
Fig. 8

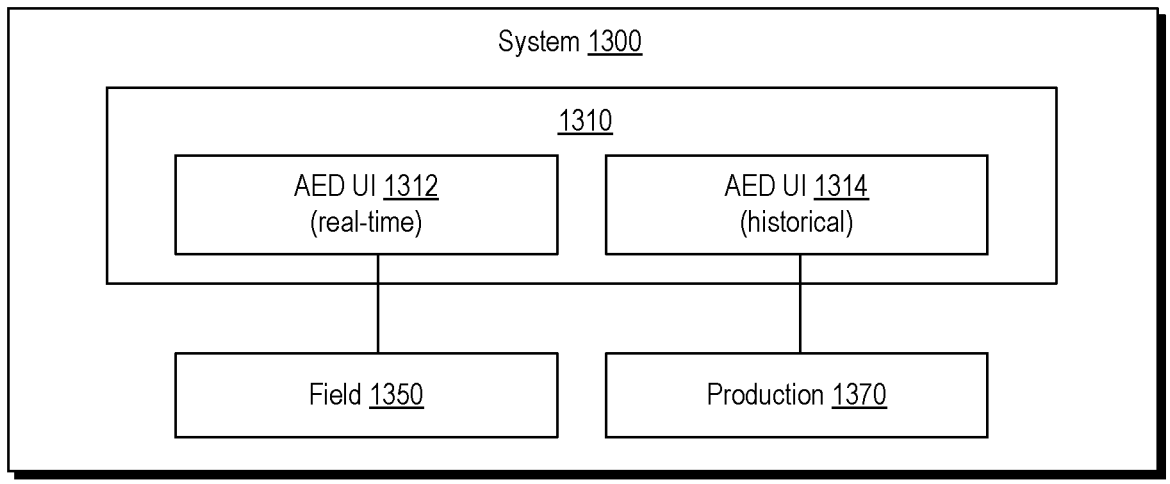
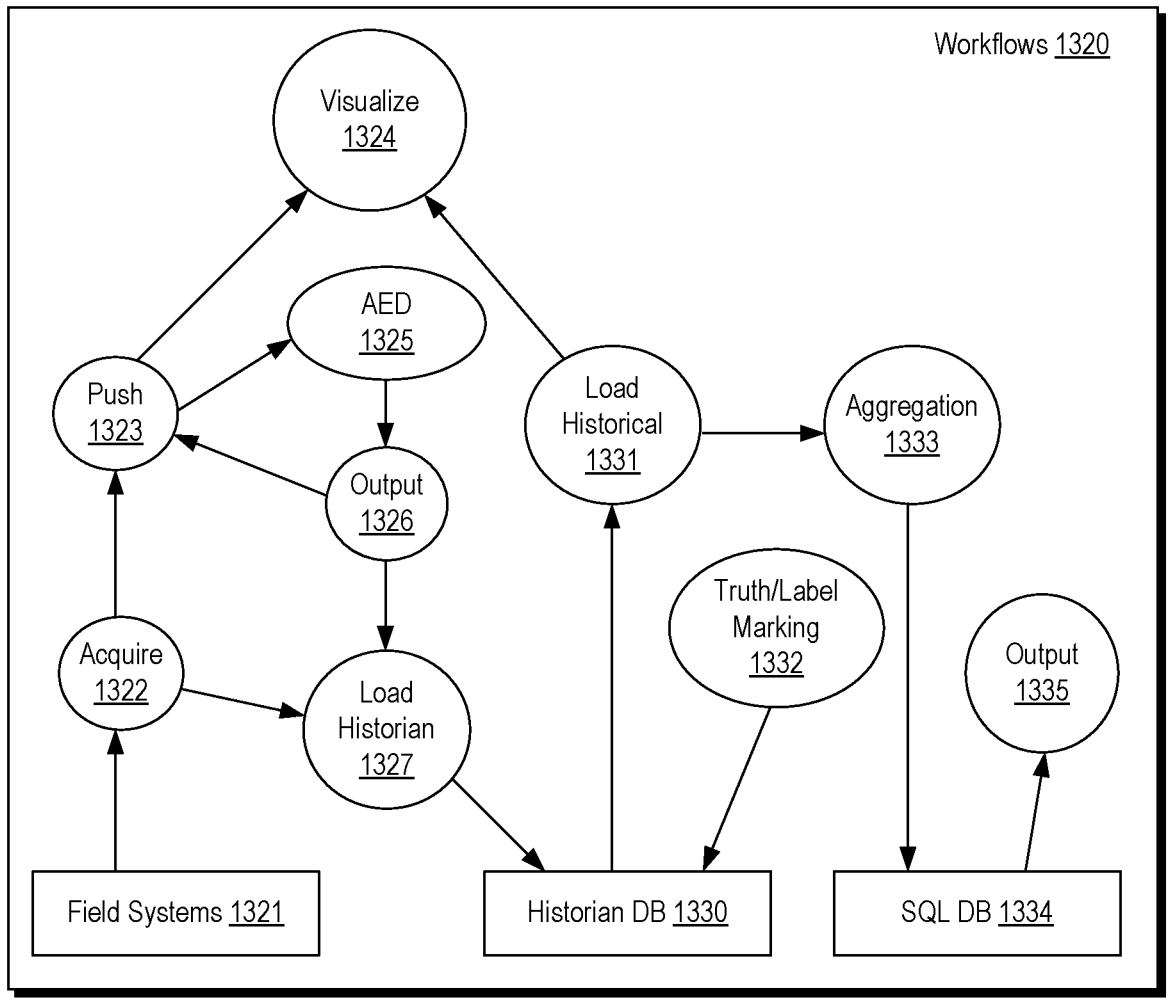
Fig. 13

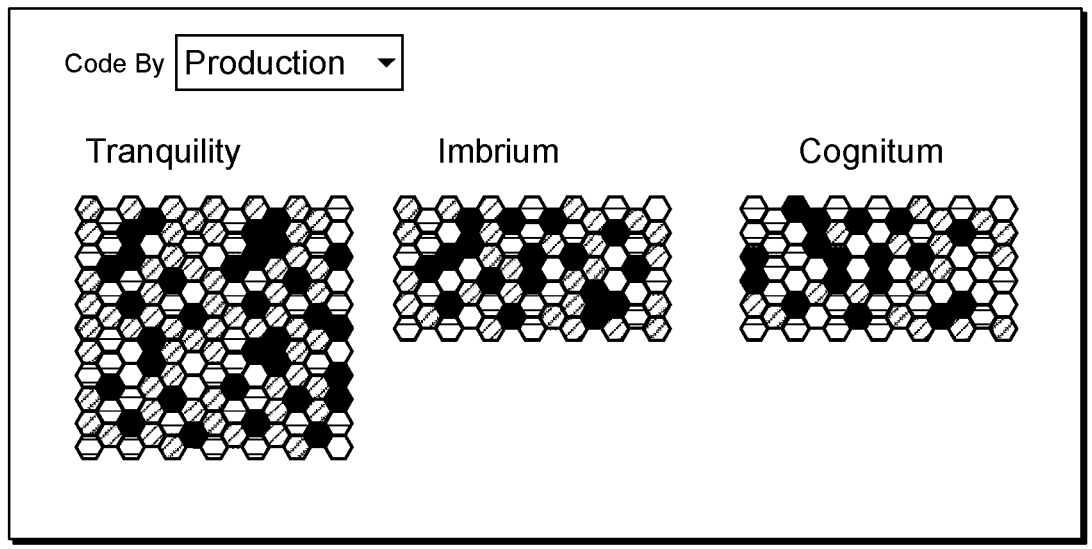
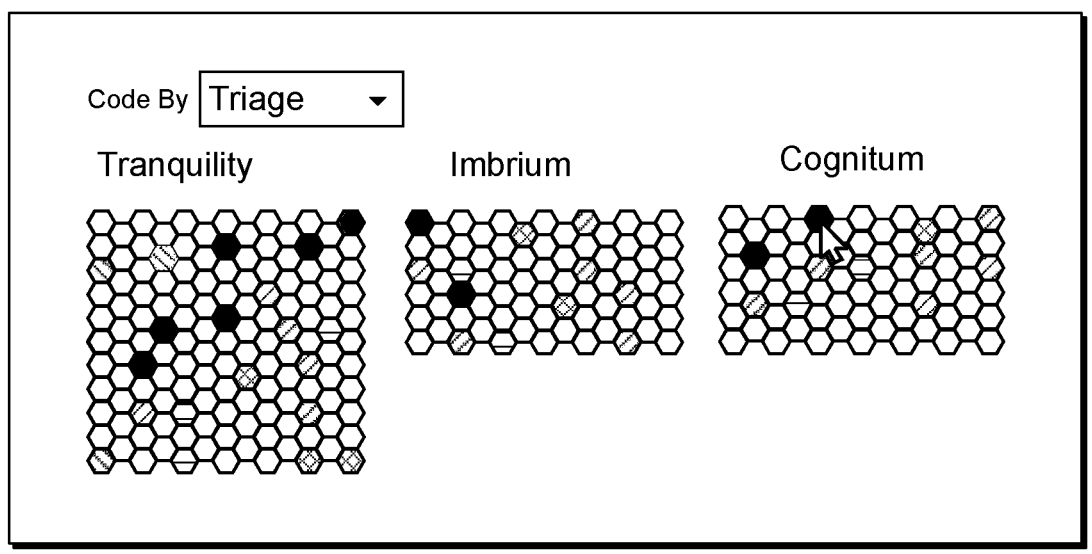
Fig. 15

GUI 1700

■ All 55 | 🗎 Unassigned 23 | ⦿ Assigned 32 | 👤 Down 8 | ⊠ Out of Service 3

(Mine×) (Triage Rank×)

| Assigned | Client | Field | Well | Triage Score | AED Type |  | Auto | Lo | RoC | Hi |
|---|---|---|---|---|---|---|---|---|---|---|
| J.C. | PetroCo. | Tranquility | EB-12 | 0.95 | Pump Off | 24m |  |  |  |  |
| R.A. | PetroCo. | Imbrium | A2 | 0.91 | Gas Interference | 17m |  | Pd 2m | Im 2m +2 | Tm |
|  | PetroCo. | Tranquility | 34 H | 0.88 | Deadhead Event | 3m |  |  | Tm | Pd |
|  | PetroCo. | Imbrium | 68 Z | 0.86 | Insufficient Lift | 10m |  |  |  | Im 2m |
| J.C. | PetroCo. | Tranquility | EB-11 | 0.77 | Pump Off | 17m |  |  | Tm |  |
|  | PetroCo. | Imbrium | EB-07 | 0.76 | Pump Off | 6m |  |  |  |  |
| R.A. | PetroCo. | Imbrium | AB-01 | 0.67 | Gas Interference | 17m |  | Pd 2m | Tm |  |
|  | XYZOilCo. | Cognitum | A5 | 0.43 | Deadhead Event | 3m |  |  |  | Im 2m |
|  | XYZOilCo. | Cognitum | AA35 | 0.38 | Insufficient Lift | 10m |  |  | Tm |  |
|  | XYZOilCo. | Cognitum | EB-11 | 0.37 | Pump Off | 17m |  |  |  | Im 2m |

Fig. 17

GUI 1900

Alarms & Events  Setpoints  Command Log  Next Well →

| State | Event | Duration | Source | Severity | Start | End | Actions |
|---|---|---|---|---|---|---|---|
| 🔔 | *Pump Off* | *12m18s* | *AED* | *Critical* | *20XX-0Y-23 14:12:12* | | *WFX1* |
| 🔔 | Discharge Pressure LoLo | 12m18s | RTU | Critical | 20XX-0Y-23 14:12:12 | | WFX7 |
| 🔔 | Intake Pressure Hi | 12m18s | RTU | Major | 20XX-0Y-23 14:12:12 | | WFX19 |
| | Insufficient Lift | 24m24s | AED | Critical | 20XX-0Y-23 14:12:12 | 20XX-0Y-23 14:12:12 | WFX2 |
| | VSD Motor Amps Hi | 12m18s | RTU | Major | 20XX-0Y-23 14:12:12 | 20XX-0Y-23 14:12:12 | WFX22 |
| | VSD Motor Amps Hi | 12m18s | RTU | Major | 20XX-0Y-23 14:12:12 | 20XX-0Y-23 14:12:12 | WFX11 |
| | Intake Pressure LoLo | 12m18s | RTU | Critical | 20XX-0Y-23 14:12:12 | 20XX-0Y-23 14:12:12 | WFX13 |
| | Gas Interference Event | 12m18s | AED | Critical | 20XX-0Y-23 14:12:12 | 20XX-0Y-23 14:12:12 | WFX39 |
| | Intake Pressure LoLo | 12m18s | RTU | Critical | 20XX-0Y-23 14:12:12 | 20XX-0Y-23 14:12:12 | WFX6 |
| | Intake Pressure LoLo | 12m18s | RTU | Critical | 20XX-0Y-23 14:12:12 | 20XX-0Y-23 14:12:12 | WFX3 |

Please select an alarm or event to initiate a workflow.

Fig. 19

OILFIELD SYSTEM

CROSS REFERENCE TO RELATED APPLICATIONS

This application is a continuation of U.S. patent application Ser. No. 17/282,586, filed Apr. 2, 2021, which claims the benefit of and priority to PCT Application No. PCT/US2019/054405, filed Oct. 3, 2019, which claims the benefit of and priority to both U.S. Provisional Application No. 62/740,949, filed Oct. 3, 2018, and U.S. Provisional Application No. 62/873,942, filed Jul. 14, 2019. The entire disclosures of all of these patent applications are incorporated by reference herein.

BACKGROUND

A resource field can be an accumulation of one or more resources (e.g., oil, gas, oil and gas) in a subsurface environment. A resource field can include at least one reservoir. A bore can be drilled into an environment where the bore may be utilized to form a well that can be utilized in producing hydrocarbons from a reservoir.

A rig can be a system of components that can be operated to form a bore in an environment, to transport equipment into and out of a bore in an environment, etc. As an example, a rig can include a system that can be used to drill a bore and to acquire information about an environment, about drilling, etc. A resource field may be an onshore field, an offshore field or an on and offshore field. A rig can include components for performing operations onshore and/or offshore. A rig may be, for example, vessel-based, offshore platform-based, onshore, etc.

Field planning and/or development can occur over one or more phases, which can include an exploration phase that aims to identify and assess an environment (e.g., a prospect, a play, etc.), which may include drilling of one or more bores (e.g., one or more exploratory wells, etc.). Various types of equipment may be utilized to improve production of fluid from a reservoir. For example, one or more of artificial lift technology, hydraulic fracturing technology, injection technology, etc., may be utilized.

SUMMARY

A method can include receiving time series data acquired during equipment operations at a plurality of natural resource sites; detecting operational events using the time series data; ranking the operational events; associating each of the operational events with a corresponding operational action; and outputting at least a portion of the ranked operational events, each with its corresponding operational action. A system can include a processor; memory accessible to the processor; processor-executable instructions stored in the memory and executable by the process to instruct the system to: receive time series data acquired during equipment operations at a plurality of natural resource sites; detect operational events using the time series data; rank the operational events; associate each of the operational events with a corresponding operational action; and output at least a portion of the ranked operational events, each with its corresponding operational action. One or more computer-readable storage media can include computer-executable instructions executable to instruct a computing system to: receive time series data acquired during equipment operations at a plurality of natural resource sites; detect operational events using the time series data; rank the operational events; associate each of the operational events with a corresponding operational action; and output at least a portion of the ranked operational events, each with its corresponding operational action. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

FIG. 1 illustrates examples of equipment in a geologic environment;

FIG. 8 illustrates an example of a system and examples of one or more data structures;

FIG. 13 illustrates an example of a system and examples of workflows;

FIG. 15 illustrates examples of graphical user interfaces;

FIG. 17 illustrates an example of a graphical user interface;

FIG. 19 illustrates an example of a graphical user interface;

DETAILED DESCRIPTION

Figure 2:
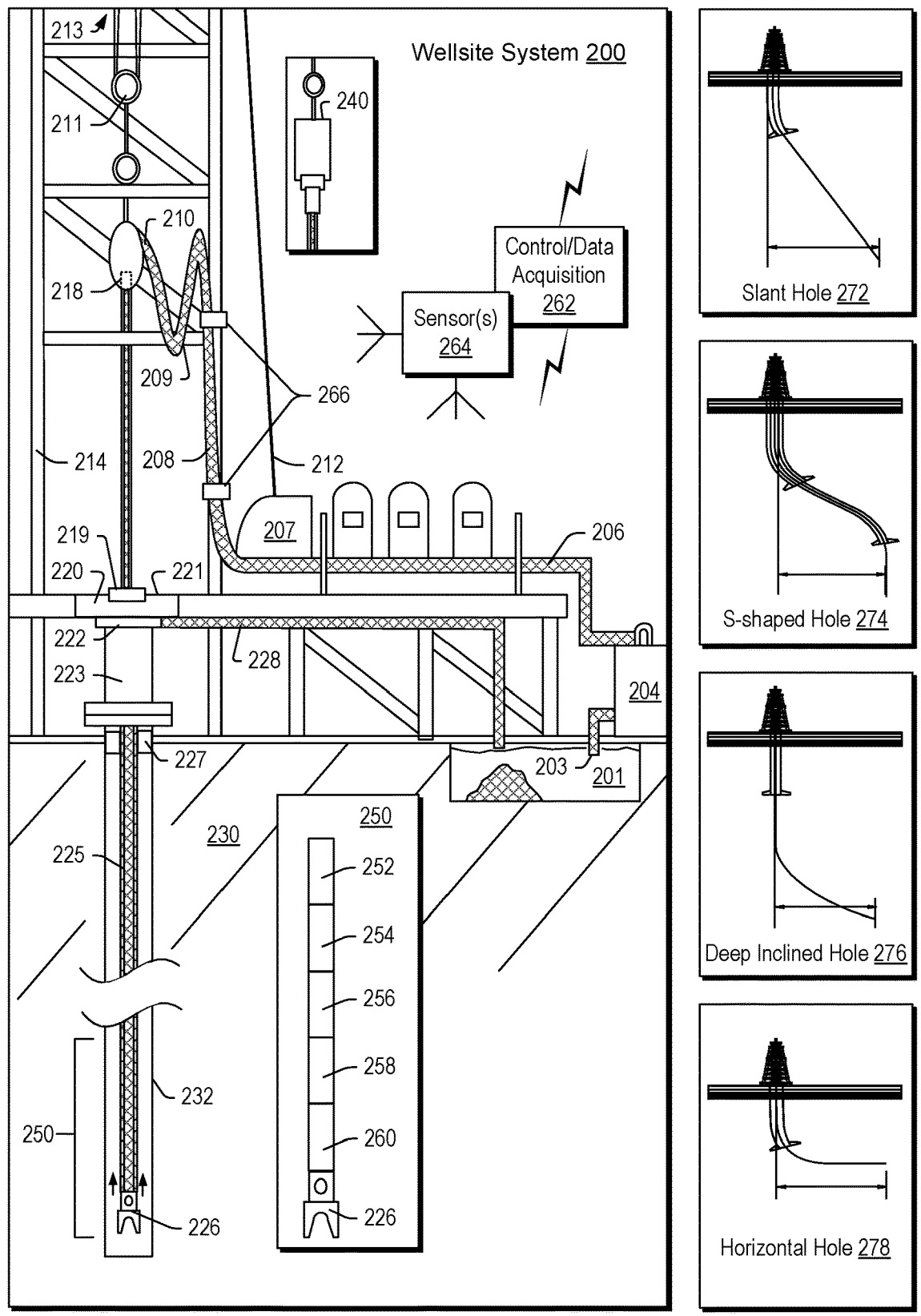
FIG. 2 illustrates examples of equipment and examples of hole types.

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

FIG. 1 shows an example of a geologic environment 120. In FIG. 1, the geologic environment 120 may be a sedimentary basin that includes layers (e.g., stratification) that include a reservoir 121 and that may be, for example, intersected by a fault 123 (e.g., or faults). As an example, the geologic environment 120 may be outfitted with any of a variety of sensors, detectors, actuators, etc. For example, equipment 122 may include communication circuitry to receive and to transmit information with respect to one or more networks 125. Such information may include information associated with downhole equipment 124, which may be equipment to acquire information, to assist with resource recovery, etc. Other equipment 126 may be located remote from a well site and include sensing, detecting, emitting or other circuitry. Such equipment may include storage and communication circuitry to store and to communicate data, instructions, etc. As an example, one or more pieces of equipment may provide for measurement, collection, communication, storage, analysis, etc. of data (e.g., for one or more produced resources, etc.). As an example, one or more satellites may be provided for purposes of communications, data acquisition, etc. For example, FIG. 1 shows a satellite in communication with the network 125 that may be configured for communications, noting that the satellite may additionally or alternatively include circuitry for imagery (e.g., spatial, spectral, temporal, radiometric, etc.).

FIG. 1 also shows the geologic environment 120 as optionally including equipment 127 and 128 associated with a well that includes a substantially horizontal portion that may intersect with one or more fractures 129. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop the reservoir (e.g., via fracturing, injecting, extracting, etc.). As an example, the equipment 127 and/or 128 may include components, a system, systems, etc. for fracturing, seismic sensing, analysis of seismic data, assessment of one or more fractures, injection, production, etc. As an example, the equipment 127 and/or 128 may provide for measurement, collection, communication, storage, analysis, etc. of data such as, for example, production data (e.g., for one or more produced resources). As an example, one or more satellites may be provided for purposes of communications, data acquisition, etc.

FIG. 1 also shows an example of equipment 170 and an example of equipment 180. Such equipment, which may be systems of components, may be suitable for use in the geologic environment 120. While the equipment 170 and 180 are illustrated as land-based, various components may be suitable for use in an offshore system.

The equipment 170 includes a platform 171, a derrick 172, a crown block 173, a line 174, a traveling block assembly 175, drawworks 176 and a landing 177 (e.g., a monkeyboard). As an example, the line 174 may be controlled at least in part via the drawworks 176 such that the traveling block assembly 175 travels in a vertical direction with respect to the platform 171. For example, by drawing the line 174 in, the drawworks 176 may cause the line 174 to run through the crown block 173 and lift the traveling block assembly 175 skyward away from the platform 171; whereas, by allowing the line 174 out, the drawworks 176 may cause the line 174 to run through the crown block 173 and lower the traveling block assembly 175 toward the platform 171. Where the traveling block assembly 175 carries pipe (e.g., casing, etc.), tracking of movement of the traveling block 175 may provide an indication as to how much pipe has been deployed.

As an example, a trip may refer to the act of pulling equipment from a bore and/or placing equipment in a bore. As an example, equipment may include a drillstring that can be pulled out of a hole and/or placed or replaced in a hole. As an example, a pipe trip may be performed where a drill bit has dulled or has otherwise ceased to drill efficiently and is to be replaced.

FIG. 2 shows an example of a wellsite system 200 (e.g., at a wellsite that may be onshore or offshore). As shown, the wellsite system 200 can include a mud tank 201 for holding mud and other material (e.g., where mud can be a drilling fluid), a suction line 203 that serves as an inlet to a mud pump 204 for pumping mud from the mud tank 201 such that mud flows to a vibrating hose 206, a drawworks 207 for winching drill line or drill lines 212, a standpipe 208 that receives mud from the vibrating hose 206, a kelly hose 209 that receives mud from the standpipe 208, a gooseneck or goosenecks 210, a traveling block 211, a crown block 213 for carrying the traveling block 211 via the drill line or drill lines 212 (see, e.g., the crown block 173 of FIG. 1), a derrick 214 (see, e.g., the derrick 172 of FIG. 1), a kelly 218 or a top drive 240, a kelly drive bushing 219, a rotary table 220, a drill floor 221, a bell nipple 222, one or more blowout preventors (BOPs) 223, a drillstring 225, a drill bit 226, a casing head 227 and a flow pipe 228 that carries mud and other material to, for example, the mud tank 201. In the example system of FIG. 2, a borehole 232 is formed in subsurface formations 230 by drilling (e.g., rotary, sliding, directional, etc.).

As shown in the example of FIG. 2, the drillstring 225 is suspended within the borehole 232 and has a drillstring assembly 250 that includes the drill bit 226 at its lower end. As an example, the drillstring assembly 250 may be a bottom hole assembly (BHA).

The wellsite system 200 can provide for operation of the drillstring 225 and other operations. As shown, the wellsite system 200 includes the platform 211 and the derrick 214 positioned over the borehole 232. As mentioned, the wellsite system 200 can include the rotary table 220 where the drillstring 225 pass through an opening in the rotary table 220.

As shown in the example of FIG. 2, the wellsite system 200 can include the kelly 218 and associated components, etc., or a top drive 240 and associated components. As to a kelly example, the kelly 218 may be a square or hexagonal metal/alloy bar with a hole drilled therein that serves as a mud flow path. The kelly 218 can be used to transmit rotary motion from the rotary table 220 via the kelly drive bushing 219 to the drillstring 225, while allowing the drillstring 225 to be lowered or raised during rotation. The kelly 218 can pass through the kelly drive bushing 219, which can be driven by the rotary table 220. As an example, the rotary table 220 can include a master bushing that operatively couples to the kelly drive bushing 219 such that rotation of the rotary table 220 can turn the kelly drive bushing 219 and hence the kelly 218. The kelly drive bushing 219 can include an inside profile matching an outside profile (e.g., square, hexagonal, etc.) of the kelly 218; however, with slightly larger dimensions so that the kelly 218 can freely move up and down inside the kelly drive bushing 219.

As to a top drive example, the top drive 240 can provide functions performed by a kelly and a rotary table. The top drive 240 can turn the drillstring 225. As an example, the top drive 240 can include one or more motors (e.g., electric and/or hydraulic) connected with appropriate gearing to a short section of pipe called a quill, that in turn may be screwed into a saver sub or the drillstring 225 itself. The top drive 240 can be suspended from the traveling block 211, so the rotary mechanism is free to travel up and down the derrick 214. As an example, a top drive 240 may allow for drilling to be performed with more joint stands than a kelly/rotary table approach.

In the example of FIG. 2, the mud tank 201 can hold mud, which can be one or more types of drilling fluids. As an example, a wellbore may be drilled to produce fluid, inject fluid or both (e.g., hydrocarbons, minerals, water, etc.).

In the example of FIG. 2, the drillstring 225 (e.g., including one or more downhole tools) may be composed of a series of pipes threadably connected together to form a long tube with the drill bit 226 at the lower end thereof. As the drillstring 225 is advanced into a wellbore for drilling, at some point in time prior to or coincident with drilling, the mud may be pumped by the pump 204 from the mud tank 201 (e.g., or other source) via the lines 206, 208 and 209 to a port of the kelly 218 or, for example, to a port of the top drive 240. The mud can then flow via a passage (e.g., or passages) in the drillstring 225 and out of ports located on the drill bit 226 (see, e.g., a directional arrow). As the mud exits the drillstring 225 via ports in the drill bit 226, it can then circulate upwardly through an annular region between an outer surface(s) of the drillstring 225 and surrounding wall(s) (e.g., open borehole, casing, etc.), as indicated by directional arrows. In such a manner, the mud lubricates the drill bit 226 and carries heat energy (e.g., frictional or other energy) and formation cuttings to the surface where the mud (e.g., and cuttings) may be returned to the mud tank 201, for example, for recirculation (e.g., with processing to remove cuttings, etc.).

As an example, mud-pulse telemetry equipment may include a downhole device configured to effect changes in pressure in the mud to create an acoustic wave or waves upon which information may modulated. In such an example, information from downhole equipment (e.g., one or more modules of the drillstring 225) may be transmitted uphole to an uphole device, which may relay such information to other equipment for processing, control, etc.

As an example, telemetry equipment may operate via transmission of energy via the drillstring 225 itself. For example, consider a signal generator that imparts coded energy signals to the drillstring 225 and repeaters that may receive such energy and repeat it to further transmit the coded energy signals (e.g., information, etc.).

In the example of FIG. 2, an uphole control and/or data acquisition system 262 may include circuitry to sense pressure pulses generated by telemetry equipment 252 and, for example, communicate sensed pressure pulses or information derived therefrom for process, control, etc.

The assembly 250 of the illustrated example includes a logging-while-drilling (LWD) module 254, a measuring-while-drilling (MWD) module 256, an optional module 258, a roto-steerable system and motor 260, and the drill bit 226. Such components or modules may be referred to as tools where a drillstring can include a plurality of tools.

The LWD module 254 may be housed in a suitable type of drill collar and can contain one or a plurality of selected types of logging tools. It will also be understood that more than one LWD and/or MWD module can be employed, for example, as represented at by the module 256 of the drill-string assembly 250. Where the position of an LWD module is mentioned, as an example, it may refer to a module at the position of the LWD module 254, the module 256, etc. An LWD module can include capabilities for measuring, processing, and storing information, as well as for communicating with the surface equipment. In the illustrated example, the LWD module 254 may include a seismic measuring device.

The MWD module 256 may be housed in a suitable type of drill collar and can contain one or more devices for measuring characteristics of the drillstring 225 and the drill bit 226. As an example, the MWD tool 254 may include equipment for generating electrical power, for example, to power various components of the drillstring 225. As an example, the MWD tool 254 may include the telemetry equipment 252, for example, where the turbine impeller can generate power by flow of the mud; it being understood that other power and/or battery systems may be employed for purposes of powering various components. As an example, the MWD module 256 may include one or more of the following types of measuring devices: a weight-on-bit measuring device, a torque measuring device, a vibration measuring device, a shock measuring device, a stick slip measuring device, a direction measuring device, and an inclination measuring device.

FIG. 2 also shows some examples of types of holes that may be drilled. For example, consider a slant hole 272, an S-shaped hole 274, a deep inclined hole 276 and a horizontal hole 278.

As an example, a drilling operation can include directional drilling where, for example, at least a portion of a well includes a curved axis. For example, consider a radius that defines curvature where an inclination with regard to the vertical may vary until reaching an angle between about 30 degrees and about 60 degrees or, for example, an angle to about 90 degrees or possibly greater than about 90 degrees.

As an example, a directional well can include several shapes where each of the shapes may aim to meet particular operational demands. As an example, a drilling process may be performed on the basis of information as and when it is relayed to a drilling engineer. As an example, inclination and/or direction may be modified based on information received during a drilling process.

As an example, deviation of a bore may be accomplished in part by use of a downhole motor and/or a turbine. As to a motor, for example, a drillstring can include a positive displacement motor (PDM).

As an example, a system may be a steerable system and include equipment to perform a method such as geosteering. As an example, a steerable system can include a PDM or a turbine on a lower part of a drillstring which, just above a drill bit, a bent sub can be mounted. As an example, above a PDM, MWD equipment that provides real-time or near real-time data of interest (e.g., inclination, direction, pressure, temperature, real weight on the drill bit, torque stress, etc.) and/or LWD equipment may be installed. As to the latter, LWD equipment can make it possible to send to the surface various types of data of interest, including for example, geological data (e.g., gamma ray log, resistivity, density and sonic logs, etc.).

The coupling of sensors providing information on the course of a well trajectory, in real-time or near real-time, with, for example, one or more logs characterizing the formations from a geological viewpoint, can allow for implementing a geosteering method. Such a method can include navigating a subsurface environment, for example, to follow a desired route to reach a desired target or targets.

As an example, a drillstring can include an azimuthal density neutron (AON) tool for measuring density and porosity; a MWD tool for measuring inclination, azimuth and shocks; a compensated dual resistivity (CDR) tool for measuring resistivity and gamma ray related phenomena; one or more variable gauge stabilizers; one or more bend joints; and a geosteering tool, which may include a motor and optionally equipment for measuring and/or responding to one or more of inclination, resistivity and gamma ray related phenomena.

Referring again to FIG. 2, the wellsite system 200 can include one or more sensors 264 that are operatively coupled to the control and/or data acquisition system 262. As an example, a sensor or sensors may be at surface locations. As an example, a sensor or sensors may be at downhole locations. As an example, a sensor or sensors may be at one or more remote locations that are not within a distance of the order of about one hundred meters from the wellsite system 200. As an example, a sensor or sensor may be at an offset wellsite where the wellsite system 200 and the offset wellsite are in a common field (e.g., oil and/or gas field).

As an example, one or more portions of a drillstring may become stuck. The term stuck can refer to one or more of varying degrees of inability to move or remove a drillstring from a bore. As an example, in a stuck condition, it might be possible to rotate pipe or lower it back into a bore or, for example, in a stuck condition, there may be an inability to move the drillstring axially in the bore, though some amount of rotation may be possible. As an example, in a stuck condition, there may be an inability to move at least a portion of the drillstring axially and rotationally. Differential sticking may occur when high-contact forces caused by low reservoir pressures, high wellbore pressures, or both, are exerted over a sufficiently large area of the drillstring. A condition referred to as "mechanical sticking" can be a condition where limiting or prevention of motion of the drillstring by a mechanism other than differential pressure sticking occurs. Mechanical sticking can be caused, for example, by one or more of junk in the hole, wellbore geometry anomalies, cement, keyseats or a buildup of cuttings in the annulus. Placing equipment in a borehole, a completed well, etc., can possibly give rise to one or more types of sticking, where, for example, one or more actions may be taken to remedy stuck equipment.

As an example, artificial lift technology may be utilized to assist production of fluid(s) from a well that is in fluid communication with a reservoir. Various types of artificial lift technology involve placing equipment in a borehole, a completed well, etc. Artificial lift technology can add energy to fluid to enhance production of the fluid. Artificial lift systems can include rod pumping systems, gas lift systems and electric submersible pump (ESP) systems. As an example, an artificial lift pumping system can utilize a surface power source to drive a downhole pump assembly. As an example, a beam and crank assembly may be utilized to create reciprocating motion in a sucker-rod string that connects to a downhole pump assembly. In such an example, the pump can include a plunger and valve assembly that converts the reciprocating motion to fluid movement (e.g., lifting the fluid against gravity, etc.). As an example, an artificial lift gas lift system can provide for injection of gas into production tubing to reduce the hydrostatic pressure of a fluid column. In such an example, a resulting reduction in pressure can allow reservoir fluid to enter a wellbore at a higher flow rate. A gas lift system can provide for conveying injection gas down a tubing-casing annulus where it can enter a production train through one or more gas-lift valves (e.g., a series of gas-lift valves, etc.). As an example, an electric submersible pump (ESP) can include a stack of impeller and diffuser stages where the impellers are operatively coupled to a shaft driven by an electric motor. As an example, an electric submersible pump (ESP) can include a piston that is operatively coupled to a shaft driven by an electric motor, for example, where at least a portion of the shaft may include one or more magnets and form part of the electric motor.

Examples of artificial lift equipment can include a gas lift (GL) system, a rod pumping (RP) system, and an ESP system. Such equipment may be disposed at least in part in a downhole environment to facilitate production of fluid; noting that a pump system (e.g., RP and/or ESP) may be utilized to move fluid to a location other than a surface location (e.g., consider injection to inject fluid into a subterranean region, etc.). A gas lift system operates at least in part on buoyancy as injected gas may be expected to rise due to buoyancy in a direction that is opposite gravity; whereas a RP or an ESP may operate via mechanical movement of physical components to drive fluid in a desired direction, which may be with or against gravity.

Figure 3:
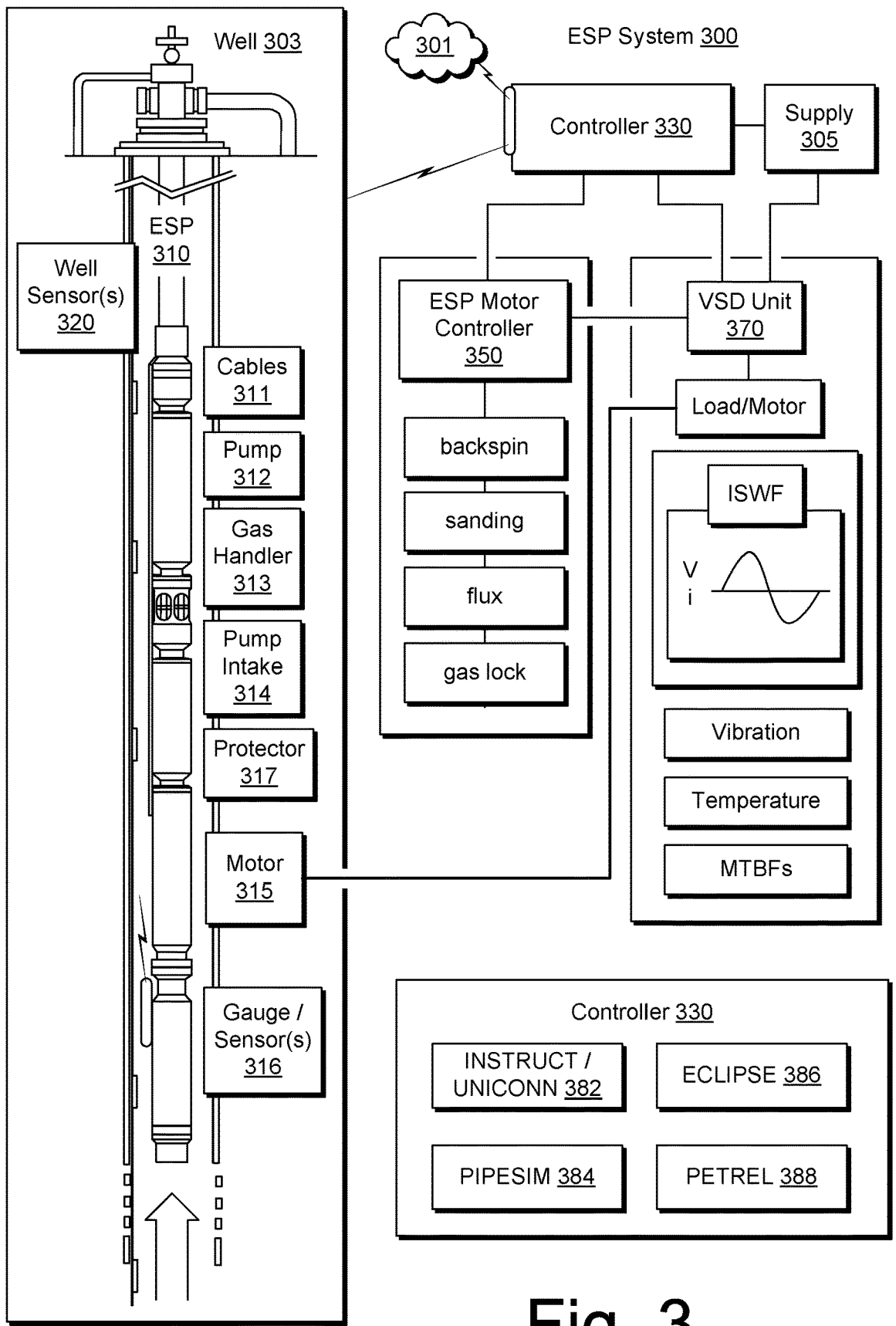
FIG. 3 illustrates an example of a system.

FIG. 3 shows an example of an ESP system 300 that includes an ESP 310 as an example of equipment that may be placed in a geologic environment. As an example, an ESP may be expected to function in an environment over an extended period of time (e.g., optionally of the order of years). As an example, consider ESPs such as the REDA™ ESPs (Schlumberger Limited, Houston, Texas), which may find use in applications that call for, for example, pump rates in excess of about 4,000 barrels per day and lift of about 12,000 feet or more.

In the example of FIG. 3, the ESP system 300 includes a network 301, a well 303 disposed in a geologic environment (e.g., with surface equipment, etc.), a power supply 305, the ESP 310, a controller 330, a motor controller 350 and a VSD unit 370. The power supply 305 may receive power from a power grid, an onsite generator (e.g., natural gas driven turbine), or other source. The power supply 305 may supply a voltage, for example, of about 4.16 kV.

As shown, the well 303 includes a wellhead that can include a choke (e.g., a choke valve). For example, the well 303 can include a choke valve to control various operations such as to reduce pressure of a fluid from high pressure in a closed wellbore to atmospheric pressure. Adjustable choke valves can include valves constructed to resist wear due to high-velocity, solids-laden fluid flowing by restricting or sealing elements. A wellhead may include one or more sensors such as a temperature sensor, a pressure sensor, a solids sensor, etc.

As to the ESP 310, it is shown as including cables 311 (e.g., or a cable), a pump 312, gas handling features 313, a pump intake 314, a motor 315, one or more sensors 316 (e.g., temperature, pressure, strain, current leakage, vibration, etc.) and optionally a protector 317.

As an example, an ESP may include a REDA™ HOTLINE™ high-temperature ESP motor. Such a motor may be suitable for implementation in a thermal recovery heavy oil production system, such as, for example, SAGO system or other steam-flooding system.

As an example, an ESP motor can include a three-phase squirrel cage with two-pole induction. As an example, an ESP motor may include steel stator laminations that can help focus magnetic forces on rotors, for example, to help reduce energy loss. As an example, stator windings can include copper and insulation.

In the example of FIG. 3, the well 303 may include one or more well sensors 320, for example, such as the OPTI-CLINE™ sensors or WELLWATCHER BRITEBLUE™ sensors (Schlumberger Limited, Houston, Texas). Such sensors are fiber-optic based and can provide for real-time sensing of temperature, for example, in SAGO or other operations. As shown in the example of FIG. 1, a well can include a relatively horizontal portion. Such a portion may collect heated heavy oil responsive to steam injection. Measurements of temperature along the length of the well can provide for feedback, for example, to understand conditions downhole of an ESP. Well sensors may extend thousands of feet into a well (e.g., 4,000 feet or more) and beyond a position of an ESP.

In the example of FIG. 3, the controller 330 can include one or more interfaces, for example, for receipt, transmission or receipt and transmission of information with the motor controller 350, a VSD unit 370, the power supply 305 (e.g., a gas fueled turbine generator, a power company, etc.), the network 301, equipment in the well 303, equipment in another well, etc.

As shown in FIG. 3, the controller 330 may include or provide access to one or more modules or frameworks. Further, the controller 330 may include features of an ESP motor controller and optionally supplant the ESP motor controller 350. For example, the controller 330 may include the INSTRUCT™ motor controller and/or the UNICONN™ motor controller 382 (Schlumberger Limited, Houston, Texas). In the example of FIG. 3, the controller 330 may access one or more of the PIPESIM™ framework 384, the ECLIPSE™ framework 386 (Schlumberger Limited, Houston, Texas) and the PETREL™ framework 388 (Schlumberger Limited, Houston, Texas) (e.g., and optionally the OCEAN™ framework and/or the DELFI™ framework (Schlumberger Limited, Houston, Texas)).

In the example of FIG. 3, the motor controller 350 may be a motor controller such as the UNICONN™ motor controller or the INSTRUCT™ motor controller. A motor controller can connect to a SCADA system, the ESPWATCHER™ surveillance system, the LIFTWATCHER™ system (Schlumberger Limited, Houston, Texas), LIFTIQ™ system (Schlumberger Limited, Houston, Texas), etc. A motor controller can perform various control and data acquisition tasks for ESPs, surface pumps or other monitored wells. A motor controller can interface with a monitoring system (e.g., the PHOENIX™ monitoring system), for example, to access pressure, temperature and vibration data and various protection parameters as well as to provide direct current power to downhole sensors (e.g., sensors of a gauge, etc.).

The PHOENIX™ monitoring system includes a "gauge", which can be available in various configurations. As an example, a configuration of the gauge may provide for measurement of intake pressure and temperature, motor oil or motor winding temperature, vibration, and current leakage. As another example, a configuration of the gauge can provide for measurement of pump discharge pressure, which can be used in evaluating pump performance.

The PHOENIX™ monitoring system includes high-temperature microelectronics and digital telemetry circuitry that can communicate with surface equipment through an ESP motor cable. The electrical system of the PHOENIX™ monitoring system has a tolerance for high phase imbalance and a capacity to handle voltage spikes.

As an example, a controller can be operatively coupled to the PHOENIX™ monitoring system, for example, to provide remote access and control. Data can be integrated with a real-time surveillance service that may provide for robust surveillance of monitored parameters (e.g., via satellite and/or other network technologies). The PHOENIX™ monitoring system is SCADA ready and has a MODBUS protocol terminal with RS232 and RS485 ports for data output.

As to some examples of gauge parameters, consider Table 1 below.

TABLE 1

Some examples of gauge parameters for sensors.

| Measurement | Range | | Accuracy | Resolution | Drift | Rate |
|---|---|---|---|---|---|---|
| P Intake | 0-40 | MPa | +/−34 | 0.7 | 34/year | 4 s |
| P Discharge | 0-40 | MPa | +/−34 | 0.7 | 34/year | 4 s |
| T Intake | 0-150 | C | 1.3% FS | 0.1 | NA | 4 s/8 s |
| T Winding/Oil | 0-409 | C | 1% FS | 0.1 | NA | 36 s |
| Vibration | 0-30 | G | 3.3% FS | 0.1 | NA | Variable |
| Current Leak | 0-25 | mA | 0.2% FS | 0.001 | NA | Variable |

As to dimensions of a gauge, consider a gauge that is approximately 60 centimeters in length and approximately 11 cm in diameter. Such a gauge may be rated to withstand pressures of approximately 45 MPa and survive for 24 hours at a temperature of approximately 175 degrees C. A surface choke unit may provide for reading sensed information from a three-phase ESP power cable.

The UNICONN™ motor controller and/or the INSTRUCT™ motor controller can interface with fixed speed drive (FSD) controllers or a VSD unit, for example, such as the VSD unit 370. For FSD controllers, the UNICONN™ motor controller and/or the INSTRUCT™ motor controller can monitor ESP system three-phase currents, three-phase surface voltage, supply voltage and frequency, ESP spinning frequency and leg ground, power factor and motor load.

For VSD units, the UNICONN™ motor controller and/or the INSTRUCT™ motor controller can monitor VSD output current, ESP running current, VSD output voltage, supply voltage, VSD input and VSD output power, VSD output frequency, drive loading, motor load, three-phase ESP running current, three-phase VSD input or output voltage, ESP spinning frequency, and leg-ground.

In the example of FIG. 3, the ESP motor controller 350 includes various modules to handle, for example, backspin of an ESP, sanding of an ESP, flux of an ESP and gas lock of an ESP. The motor controller 350 may include any of a variety of features, additionally, alternatively, etc. In the example of FIG. 3, the VSD unit 370 may be a low voltage drive (LVD) unit, a medium voltage drive (MVD) unit or other type of unit (e.g., a high voltage drive, which may provide a voltage in excess of about 4.16 kV). As an example, the VSD unit 370 may receive power with a voltage of about 4.16 kV and control a motor as a load with a voltage from about 0 V to about 4.16 kV. The VSD unit 370 may include control circuitry such as the SPEEDSTAR™ MVD control circuitry (Schlumberger Limited, Houston, Texas).

Figure 4:
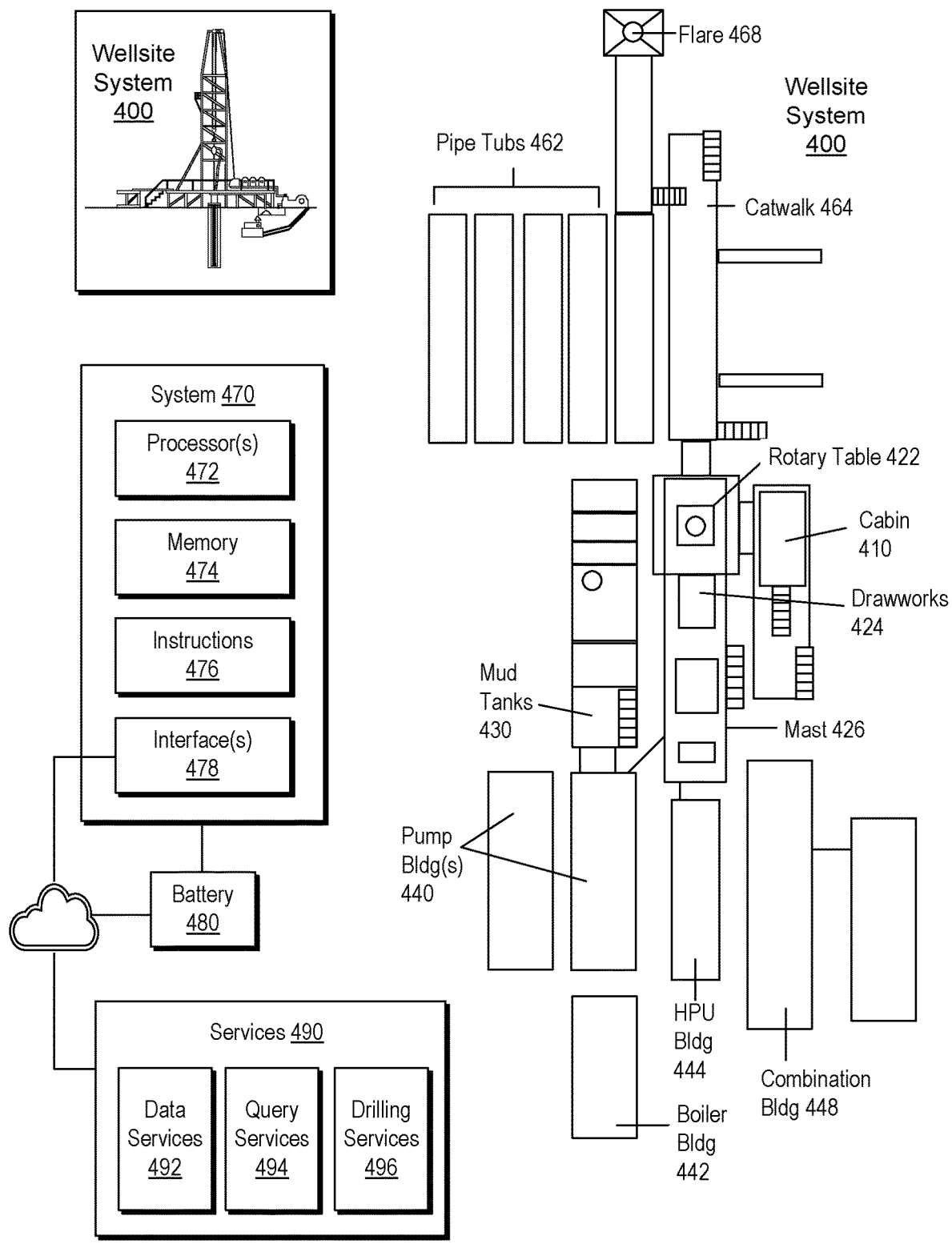
FIG. 4 illustrates an example of a wellsite system and an example of a computing system.

FIG. 4 shows an example of a wellsite system 400, specifically, FIG. 4 shows the wellsite system 400 in an approximate side view and an approximate plan view along with a block diagram of a system 470. Such a system may implement one or more technologies (e.g., drilling, artificial lift, hydraulic fracturing, etc.).

In the example of FIG. 4, the wellsite system 400 can include a cabin 410, a rotary table 422, drawworks 424, a mast 426 (e.g., optionally carrying a top drive, etc.), mud tanks 430 (e.g., with one or more pumps, one or more shakers, etc.), one or more pump buildings 440, a boiler building 442, an HPU building 444 (e.g., with a rig fuel tank, etc.), a combination building 448 (e.g., with one or more generators, etc.), pipe tubs 462, a catwalk 464, a flare 468, etc. Such equipment can include one or more associated functions and/or one or more associated operational risks, which may be risks as to time, resources, and/or humans.

As shown in the example of FIG. 4, the wellsite system 400 can include a system 470 that includes one or more processors 472, memory 474 operatively coupled to at least one of the one or more processors 472, instructions 476 that can be, for example, stored in the memory 474, and one or more interfaces 478. As an example, the system 470 can include one or more processor-readable media that include processor-executable instructions executable by at least one of the one or more processors 472 to cause the system 470 to control one or more aspects of the wellsite system 400. In such an example, the memory 474 can be or include the one or more processor-readable media where the processor-executable instructions can be or include instructions. As an example, a processor-readable medium can be a computer-readable storage medium that is not a signal and that is not a carrier wave.

FIG. 4 also shows a battery 480 that may be operatively coupled to the system 470, for example, to power the system 470. As an example, the battery 480 may be a back-up battery that operates when another power supply is unavailable for powering the system 470. As an example, the battery 480 may be operatively coupled to a network, which may be a cloud network. As an example, the battery 480 can include smart battery circuitry and may be operatively coupled to one or more pieces of equipment via a SMBus or other type of bus.

In the example of FIG. 4, services 490 are shown as being available, for example, via a cloud platform. Such services can include data services 492, query services 494 and drilling services 496. As an example, the services 490 may be part of a system such as the system 300 of FIG. 3.

Figure 5:
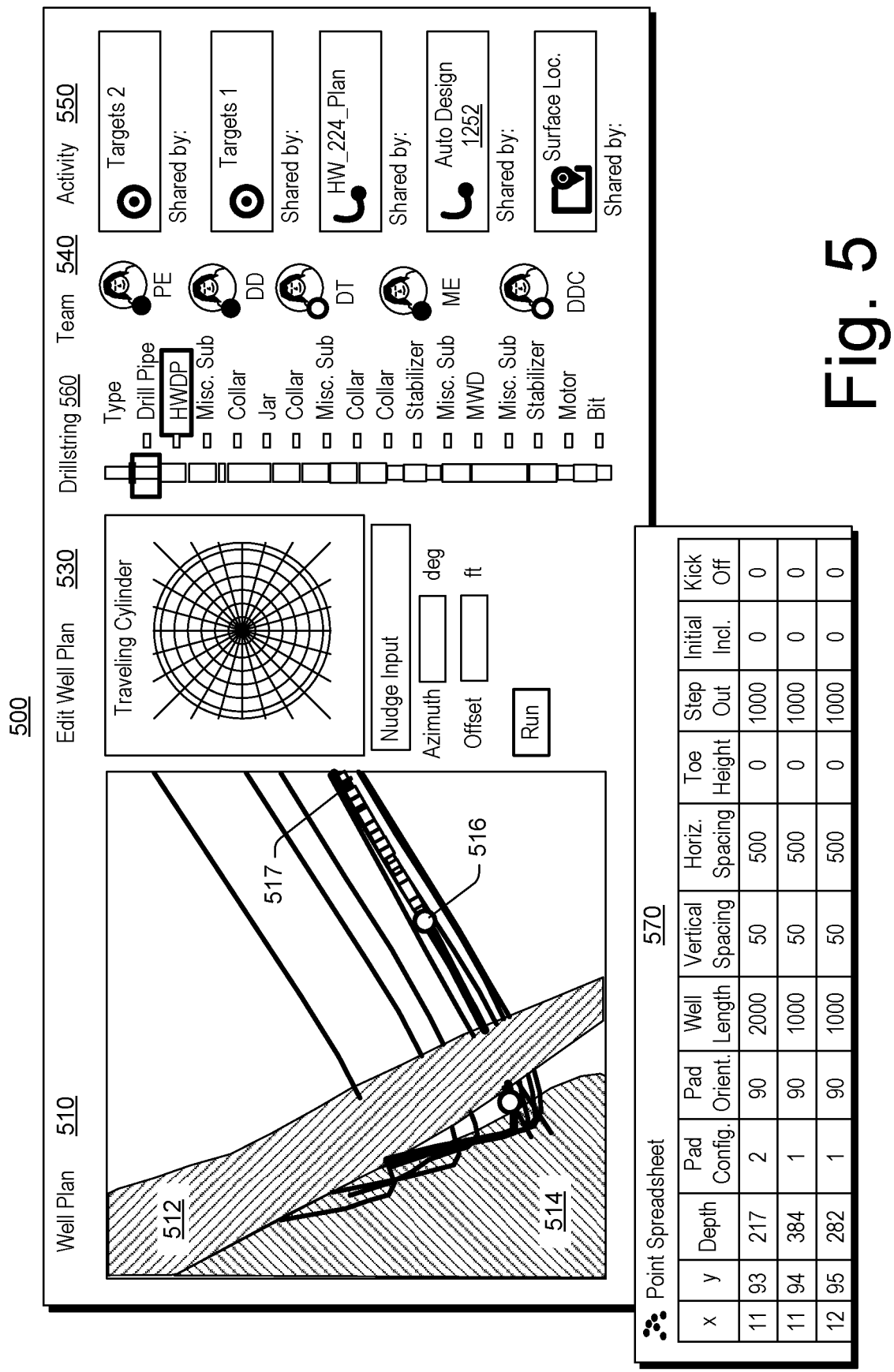
FIG. 5 illustrates an example of a graphical user interface.

FIG. 5 shows an example of a graphical user interface (GUI) 500 that includes information associated with a well plan. Specifically, the GUI 500 includes a panel 510 where surfaces representations 512 and 514 are rendered along with well trajectories where a location 516 can represent a position of a drillstring 517 along a well trajectory. The GUI 500 may include one or more editing features such as an edit well plan set of features 530. The GUI 500 may include information as to individuals of a team 540 that are involved, have been involved and/or are to be involved with one or more operations. The GUI 500 may include information as to one or more activities 550. As shown in the example of FIG. 5, the GUI 500 can include a graphical control of a drillstring 560 where, for example, various portions of the drillstring 560 may be selected to expose one or more associated parameters (e.g., type of equipment, equipment specifications, operational history, etc.). FIG. 5 also shows a table 570 as a point spreadsheet that specifies information for a plurality of wells.

In the example of FIG. 5, the drillstring graphical control 560 includes components such as drill pipe, heavy weight drill pipe (HWDP), subs, collars, jars, stabilizers, motor(s) and a bit. A drillstring can be a combination of drill pipe, a bottom hole assembly (BHA) and one or more other tools, which can include one or more tools that can help a drill bit turn and drill into material (e.g., a formation).

Figure 6:
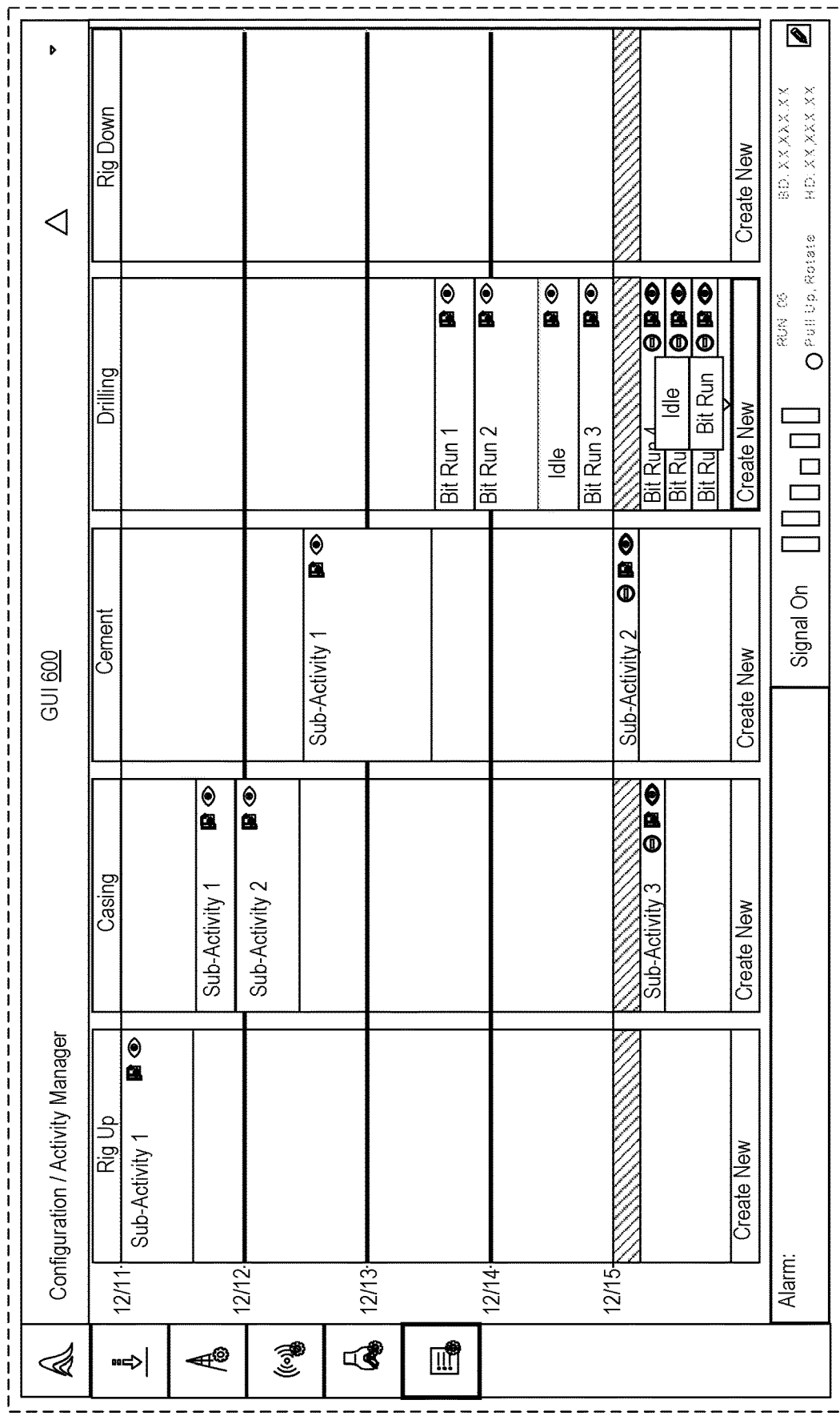
FIG. 6 illustrates an example of a graphical user interface.

FIG. 6 shows an example of a graphical user interface 600 that includes a schedule organized with respect to time (days, dates, etc.) and with respect to various types of operations. The GUI 600 can be part of a well planning system, which may be part of a field development framework. For example, the various operations in the GUI 600 can be implemented to drill at least a portion of a well in a geologic environment (e.g., an oil field or oilfield) where the well may be completed for one or more purposes (e.g., production of hydrocarbons, injection of fluid(s), fracturing of rock, etc.).

As an example, the GUIs 500 and 600 can be part of a field development framework and/or an execution framework for execution of one or more actions (e.g., field actions). For example, the well plan 510 of the GUI 500 may be based at least in part on information rendered in the GUI 600. As an example, an interaction with the GUI 500 may be processed by one or more processors to generation information that can be rendered to the GUI 600 and, for example, vice versa. As an example, the GUIs 500 and 600 may be utilized for operations that may occur after drilling. For example, consider one or more artificial lift operations that may be performed in a well or wells as associated with the GUI 500 or the GUI 600. For example, rather than a drillstring 560, the graphic may be of an ESP system. As to the GUI 600, operation phases in the columns may be for one or more artificial lift operations.

As an example, a framework may be implemented using computing resources (e.g., hardware, communication equipment, etc.) as may be available, for example, in the cloud, a server, a workstation, etc.

As an example, a framework can include components that can take certain inputs and generate certain outputs. The outputs of a component may be used as inputs of another component or other components such that a real-time workflow can be constructed.

As explained, various types of equipment can be utilized in various types of operations that aim to produce a natural resource from a reservoir, where operations can include logging, drilling, completing, injecting, fracturing, artificial lifting, etc. Various types of operations may be particular to certain types of wells, certain types of formations, etc. For example, in the Permian Basin, high gas-to-oil ratio can be a challenge for ESP operations (e.g., gas lock, insufficient lift, etc.). As an example, a method can include detection of one or more events as to numerous wells in a field such as the Permian Basin, which may help to manage and/or reduce undesirable consequences (e.g., frequent shut downs, etc.) through one or more actions (e.g., control actions, etc.). In such an example, the field may experience reduced ESP downtime, reduced number of site visits and, hence, reduced human safety and other risks. Where a shut down or other power supply condition occurs (e.g., electrical power supply interruption, etc.), it may be followed by a restart, which can be time consuming, particularly if performed manually. As an example, a method may reduce shut downs and/or reduce restart time responsive to a shut down or a power supply issue. Rapid restarting after an unexpected power interruption may help to reduce deferred production.

As an example, a method can include monitoring operation of an electric submersible pump (ESP). Such a method may include receiving data signals indicating values for a plurality of parameters regarding operation of the electric submersible pumping system; establishing, for at least some of the plurality of parameters, an associated reference signal; and detecting a deviation of one of the parameters from the reference signal associated with that parameter. As a result of the deviation having a rate of change below a predetermined threshold, the method can include updating the value of the reference signal to reflect the deviation. As a result of the deviation having a rate of change above the predetermined threshold, the method can include detecting an event and generating an indication of the event. The indication of the event may further depend on a type of the parameter and a direction of the deviation from the reference signal.

Over time, well performance tends to gradually change, which affects channels such as static intake pressure, intake pressure, average drive current, and the like. To adapt those signals to changes over time, certain examples can include constructing a time dependency reference signal. In such an approach, the reference signal may be described as a function of time, which can capture a correlation between raw measurements with time and reflect relationships in its coefficients. As an example, a linear curve can be fit to raw measurements where coefficients of the curve are computed by minimizing residuals between the curve and the real, raw measurements. For example, let X be the observations, Coeff be the set of coefficients a, b, c, d, e and R be the residuals where R can be minimized using a least square regression, outputting the coefficients Coeff. In such an example, reference values can be reconstructed based on t and on Coeff.

For channels that depend on time and another variable, but also on drive frequency, another approach may be employed to model such dependencies. Such channels can include, for example, discharge pressure, intake pressure, well head pressure, and average drive current. Correlation may be discovered based on real measurements of those channels. In situations where there is no correlation between the channels, this too may be automatically learned and reflected by the determined coefficients. For example, the coefficient associated with drive frequency may be negligible. To adapt such signals to changes over time and frequency, certain examples can include constructing a time and frequency dependency reference signal. For example, a reference signal can depend on time and frequency where various coefficients can be determined. As an example, consider a set of Coeff {a, b, c, d, e} that may be derived using the approach explained above with respect to time-dependent channels.

As an example, a method can include an approach for temperature as dependent on power where power can depend, for example, on current (e.g., amperage). In such an example, power can be converted into heat; whereas, power can itself depends on frequency.

As one example of the above determination of reference signals, consider reference signals for Pd and Pi. When an event detection process (e.g., via an AED engine) first begins, data relating to real values of various parameters can be collected, which can allow for various coefficients to be determined. Then, for subsequent restarts, the AED engine can first use reference values from the time-based reference. For example, when the ESP is restarted, the frequency may be gradually increased while still remaining below a minimum frequency. As a result, low flow (LF) events are not detected if the reference value is calculated based on frequency, which is why the time-based reference value can be utilized to ensure LF events at restart can be detected.

During normal operating conditions, the AED engine can use reference values from a time- and frequency-based model (e.g., $Ref_{tf}$). Such an approach can help to reduce risk of a LF false alarm when, for example, rig operators change a frequency to operate at another stable flow rate during normal operations. In this example, outliers are not fed to the input of the AED learning engine (e.g., by filtering), and the AED learning engine can use a selected and potentially programmable number of observations (e.g., 10,000 observations) to calculate coefficients.

As discussed above, when certain events occur, signals tend to deviate from their reference values. These deviations, when not explainable by other context information (e.g., shutting off the pump, opening or closing various valves, and the like), may be utilized to detect events. As an example, a method can include estimating static intake pressure and utilizing an LF-IL event detection process. As an example, a reference value for frequency can be computed to detect a LF event, for example, when a pump is running below its minimum frequency. The following are examples of events that may be selected for detection by an AED engine.

As an example, an AED engine may detect an event when, at restart, the intake pressure increases back to the static intake pressure after decreasing and the pressure difference decreases. The AED engine may also detect an event when, during normal operation, the intake pressure increases back to the static intake pressure and the pressure difference decreases.

An AED engine may detect an event when, during normal operation, pressures are fluctuating. For example, intake pressure tends to increase back to static intake pressure and the pressure difference tends to decrease. Such an approach can detect a gas slugging situation where a large volume of gas causes the fluctuation of pressures and decreases the flow rate. An AED engine may detect an event when, during normal operation, the pressure difference is too low compared to its reference value. An AED engine may detect an event when, at start-up (e.g., when the pump is first installed and turned on), the intake pressure increases up to the static intake pressure after decreasing, which suggests the annulus emptying. An AED engine may also detect an event when, during normal operation, the frequency is substantially lower than its reference value. With regard to ESP surveillance, a concept may be applied to detecting other low-flow events, such as a closed valve, gas interference, or the like.

Another example of an ability to detect an event is where the event corresponds to a scenario in which an AED engine is to reestablish one or more reference values. For example, when the pump is off, if the static pressure is fluctuating substantially, it likely indicates some well intervention that could modify its productivity. In this scenario, an AED engine may restart and reestablish reference signals for various parameters without using previously established reference signals.

As an example, an AED approach may utilize a training phase. For example, consider a logistic regression classification model that may be used to train with "good" and "bad" samples for LF-GI detection. In logistic regression, a sigmoid function can be utilized to calculate the probability of a given sample belonging to one of the two classes (e.g., "good" or "bad"). A sigmoid function approach can predict a label for each sample where, based on this prediction, a cost function may be calculated and minimized.

As an example, a surveillance workflow and visualization can be based on Automated Events Detection (AED), contextual information and capturing of expert knowledge. As an example, an Automated Events Detection (AED) system can be referred to as an AED framework (AEDF) or an AED platform (AEDP).

The term "ground truth" can refer to information provided by direct observation (e.g., empirical sensor data) as opposed to information provided by inference.

In machine learning, the term "ground truth" can refer to accuracy of a training set's classification for supervised learning techniques. Classification can be for purposes of labeling where, for example, data may be labeled depending on how they are classified. Above, an example is given for use of a sigmoid function to classify data and label data as "good" or "bad".

As an example, consider Bayesian filtering via supervised learning. In such an example, a Bayesian filter can be taught the difference between classes using ground truth data (e.g., human review messages classified as being spam messages or non-spam messages). In such an example, inaccuracies in the ground truth will correlate to inaccuracies in operation of the Bayesian filter, which can, as a consequence, erroneously classify input (e.g., an input spam message as non-spam or a non-spam message as spam).

In oilfield operations, there can be a very sparse set of ground truth data or ground truth labels or "labels" to evaluate performance of a machine learning model that is to be used to detect abnormal patterns (e.g., consider a neural network or other type of machine model that can be trained). As a result, challenges include, first, since the number of labels tends to be small, it can be difficult to train a machine learning model to recognize patterns; and second, it is desirable to validate the model and generate the PIs (Performance Indicators) such as number of false alarms, detection rate, etc., in a development cycle. To address such challenges, at scale, an AEDF can include a tool or tools can facilitate one or more validation workflows that aim to validate model outputs and record ground truth labels.

As an example, a set of tools can facilitate development and use processes, which may be utilized in real-time and/or offline scenarios. An AEDF may provide an ability to automate the validation processing of a nearly unlimited number of equipment operational datasets, to generate the PIs for each of the datasets to quickly spot problems and to speed up the development process.

Figure 7:
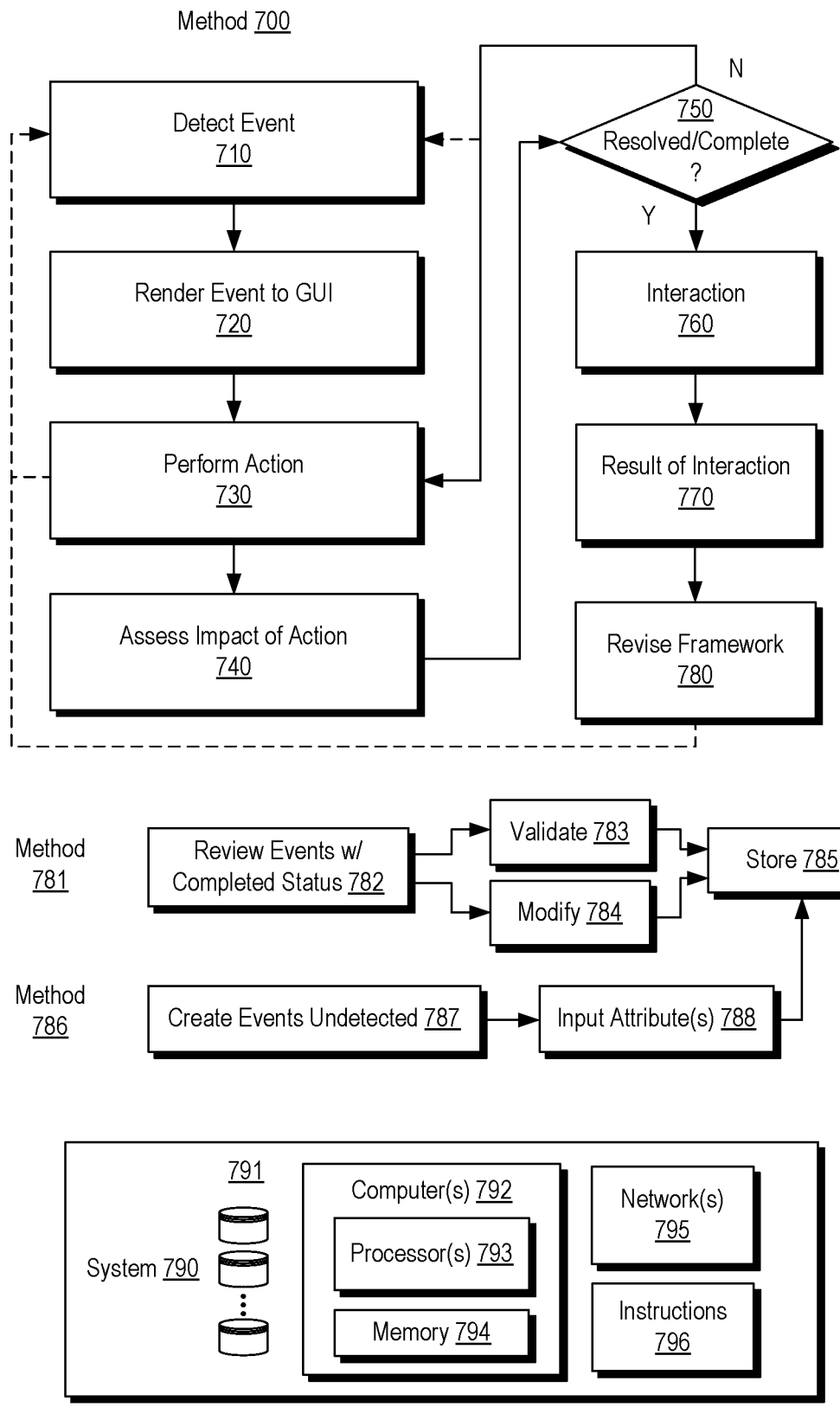
FIG. 7 illustrates examples of methods and an example of a system.

FIG. 7 shows an example of a method 700, an example of a method 781, an example of a method 786 and an example of a system 790. The method 700 includes a detection block 710 for detecting an event, a render block 720 to render an event to a GUI, a performance block 730 for performing an action, an assessment block 740 for assessing the impact(s) of a performed action, a decision block 750 for deciding whether the detected event is resolved and/or completed, an interaction block 760 for interacting with a framework (e.g., AEDF), a result block 770 for generating an interaction result and a revision block 780 for revising the framework (e.g., AEDF). In the example of FIG. 7, the render block 720 can allow for viewing of an event, for example, as it is happening in real-time along with other information (e.g., contextualized information). As an example, the interaction block 760 can involve interaction via one or more GUIs such as a "Truth Marking" GUI that allows for expert interaction as to what may be considered a "Ground Truth". As to the result block 770, it can include performing calculations, for example, as to one or more performance indicators (PIs) which may compare output of an AEDF with a "Truth". As to the revision block 780, it may revise one or more databases, etc., by altering a data structure and/or a data structure entry. As shown in the example of FIG. 7, the method 700 can include one or more loops, for example, after a decision (e.g., a determination) as to resolution or completion (e.g., termination of an event), the method may continue to the detection block 710, the performance block 730 or another block. As an example, the method 700 can include various threads, loops, etc., that may occur in series and/or in parallel. As an example, after framework revision per the revision block 780, the method 700 may continue to perform an action per the performance block 730 and/or to detect an event per the detection block 710. As an example, a revision can be or include a revision to a model or models, which may include one or more machine models that can be trained, for example, via interaction, a result of interaction, etc. As an example, one or more actions of a method such as the method 800 of FIG. 8 may be utilized for revision as in the revision block 780, etc.

As to the method 781, it includes a review block 782 for reviewing events with completed status, a validation block 783 for validating an event with completed status that has been reviewed, a modification block 784 for modifying an event with completed status that has been reviewed, and a storage block 785 for storing the reviewed events with completed status in a data store such that the stored events can be utilized as labels (e.g., ground truth labels). As shown, the method 786 can include creating events not picked up by an AEDF per a creation block 787 and an input block 788 for inputting attributes associated with one or more created events where the output thereof may be stored per the storage block 785, for example, for adding information to truths that can be labels (e.g., a database, etc.).

In the example of FIG. 7, a system 790 includes one or more information storage devices 791, one or more computers 792, one or more networks 795 and instructions 796. As to the one or more computers 792, each computer may include one or more processors (e.g., or processing cores) 793 and memory 794 for storing the instructions 796, for example, executable by at least one of the one or more processors. As an example, a computer may include one or more network interfaces (e.g., wired or wireless), one or more graphics cards, a display interface (e.g., wired or wireless), etc.

FIG. 8 shows an example of a system 800 that can be utilized in a workflow or workflows and examples of one or more data structures 805. As an example, one or more components of the system 800 can be part of an AEDF.

In FIG. 8, the system 800 includes a data component 801 that can receive data (e.g., a digital data interface), an AED component 810 that can process received data to detect events, an output component 820 that can output an event as detected with contextual information, a development component 830 that can utilize one or more contextualized events for development of a resource, a label database 840 as a component that can be a resource that includes labeled events as output ground truth events or possible ground truth events, an artificial intelligence (AI) training component 850 that can utilize the label database 840 for training a machine model to output a trained machine model, a comparator 860 that can compare contextualized output to information stored in the label database 840, a validation component 870 that can be utilized to assess one or more comparisons made by the comparator 860 and a formatted output component 880 that can output validated events, optionally in a contextualized manner that can be formatted to facilitate storage, rendering, transmission, editing, etc. For example, consider the formatted output component 880 including circuitry that can generate output in an extensible mark-up language (XML), which may be rendered to a display and/or utilized to generate a graphical user interface (GUI) that can be rendered to a display.

As shown in FIG. 8, the one or more data structures 805 can include time series data and non-time series data. As indicated, the system 800 can include an AED component 810 that can receive data via the data component 801. As an example, such data can include data organized according to one or more data structure specifications, which can include specifications for time series and non-time series data.

As an example, the AED component 810 can detect events and generate output with appropriate quality and context (see, e.g., the output component 820). As an example, such output can be in the form of real-time streams of event transitions, which can include an "on" transition such as an event start and an "off" transition such as an event end (see, e.g., the non-time series data of the one or more data structures 805). As an example, various transitions can be from off to on and from on to off. As an example, an event can be assigned an active status when on and a completed status when an on is followed by (e.g., paired with) an off. Events may be extracted and stored in a database making it possible to associate additional data with an event.

The one or more data structures 805 show various types of data that can be related to an event. In the example of FIG. 8, context is provided by the non-time series data, together with associated channels of measurements and AED time series data. As shown, a "+/−" feature can be utilized to account for surveillance demands, for example, where lead-up and follow-on data are of interest (e.g., for review, analysis, control action, etc.). As an example, a data processing component may strip off pre-event and/or post-event data. As an example, a database can include one or more data structures that are accessible via one or more application programming interface (API) specifications. For example, consider an API call that aims to receive in response a portion of data in one or more data structures (e.g., with or without pre-event, post-event, etc.), which may include time series data and/or non-time series data. As an example, the pre- and post-times can be predefined, optionally be event type. For example, a pre-period may be a percentage of a time span that is expected for a particular type of event, which may depend on the physical dynamics and/or control dynamics of the event, lead-up to the event and resolution of the event (e.g., settling dynamics, etc.).

Figure 9:
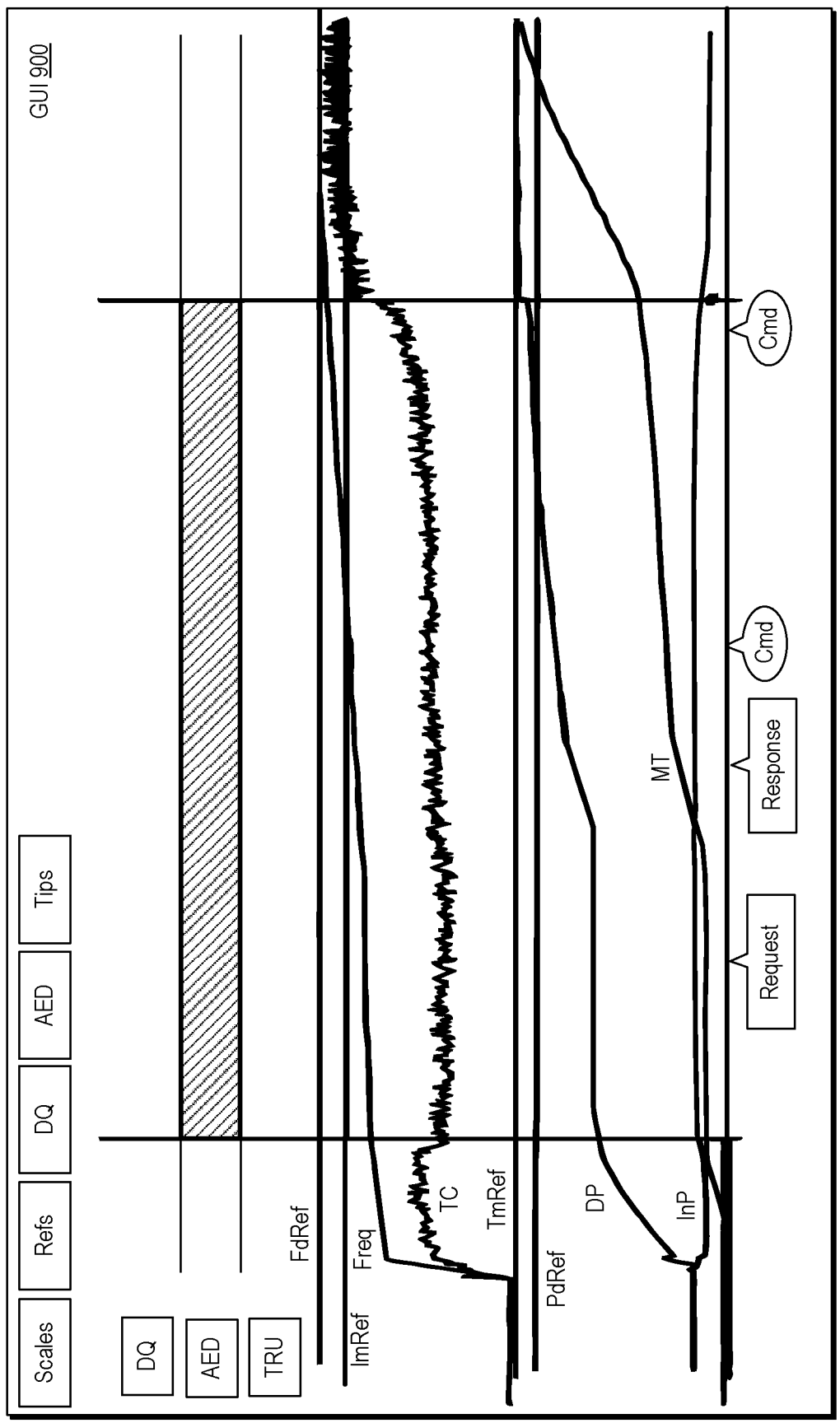
FIG. 9 illustrates an example of a graphical user interface.

FIG. 9 shows an example of a GUI 900 where various types of data are rendered and classified, for example, via labels, markers, etc. As shown, various channels are rendered with respect to time. In the example of FIG. 9, channels include total current (TC), intake pressure (ln P), motor temperature (MT), frequency (Freq), and discharge pressure (DP) and references include motor temperature reference (TmRef) and various other references. As shown, an indicator of an AED event is rendered where various channels show changes. For example, motor temperature (MT) increases along with discharge pressure (DP). Total current trends upwardly late in the AED window and, in response to issuance of a command, begins to stabilize in the post AED window period along with discharge pressure (DP).

The GUI 900 shows an example of how contextualization may be performed for an event (e.g., an AED event). The GUI 900 shows time series data, event start and event stop, data leading to the event, data after the event, one or more alarms (e.g., low level threshold alarms), one or more other events, a log of one or more actions, etc. As an example, contextualization can include type of event and/or severity of an event. The GUI 900 also shows a request and a response followed by one or more commands (Cmd). As an example, a framework can receive a request and issue a response where one or more commands may be made based on the response. As an example, a controller can provide for receiving a request, issuing a response and issuing one or more commands.

As an example, a framework can include executable instructions that can render one or more graphical user interfaces (GUIs). For example, consider GUIs that are rendered for event promotion and/or event creation (see, e.g., the method 700 of FIG. 7, etc.). As an example, consider an event promotion GUI that includes an event type field, a description field as to the event type, a severity field, a start time field, an end time field and a comment field. Such a GUI can include a graphical control that can add the event as a label (e.g., a ground truth label). As to a modification GUI, consider a source field that can indicate a source of the event (e.g., underlying data, etc.) as well as one or more of the fields mentioned above for the event promotion GUI. In such an example, the GUI may include one or more graphical controls such as a "new" graphical control and a "modify" graphical control. Such GUIs may be utilized to store events to a database such as a label database (see, e.g., the label database 840 of the system 800 of FIG. 8).

Figure 10:
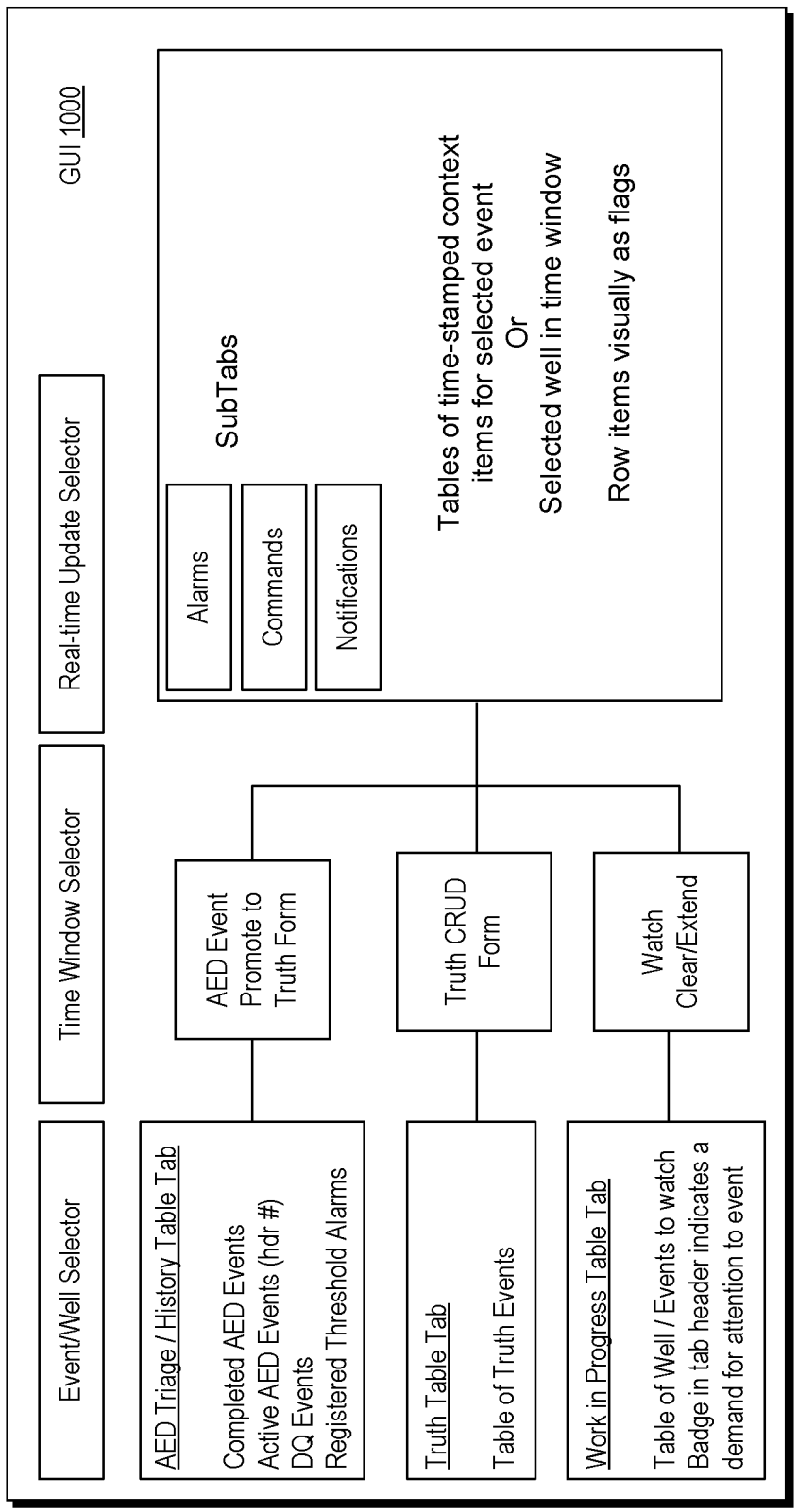
FIG. 10 illustrates an example of a graphical user interface.

FIG. 10 shows an example of an operational architecture for an example of a GUI 1000 that includes various controls for selection of views. As shown, an event and/or well selector view, a time window selector view, a real-time update selector view, etc., may be selected using one or more graphical controls rendered to a display as part of the GUI 1000. Such a GUI may be utilized in one or more workflows, for example, consider a workflow as shown in FIG. 8 with respect to the system 800.

In the example of FIG. 10, a commands graphical control is indicated that can be utilized to render a view of one or more command graphical controls. For example, consider a GUI that includes a graphical control for a frequency command that can be issued to control frequency. In such an example, the GUI can render a value that can be a set point or other value to be issued to equipment. For example, consider a frequency value that can be issued responsive to actuation of a graphical control that causes a motor drive to change an operational frequency to the frequency value, for example, to cause a change in rotational speed of a multi-phase electric motor of an electric submersible pump (ESP). As another example, consider a choke value of a surface choke valve of a well that can be utilized to adjust a choke value (e.g., to open, to open to a percentage of fully open, to close, etc.).

Figure 11:
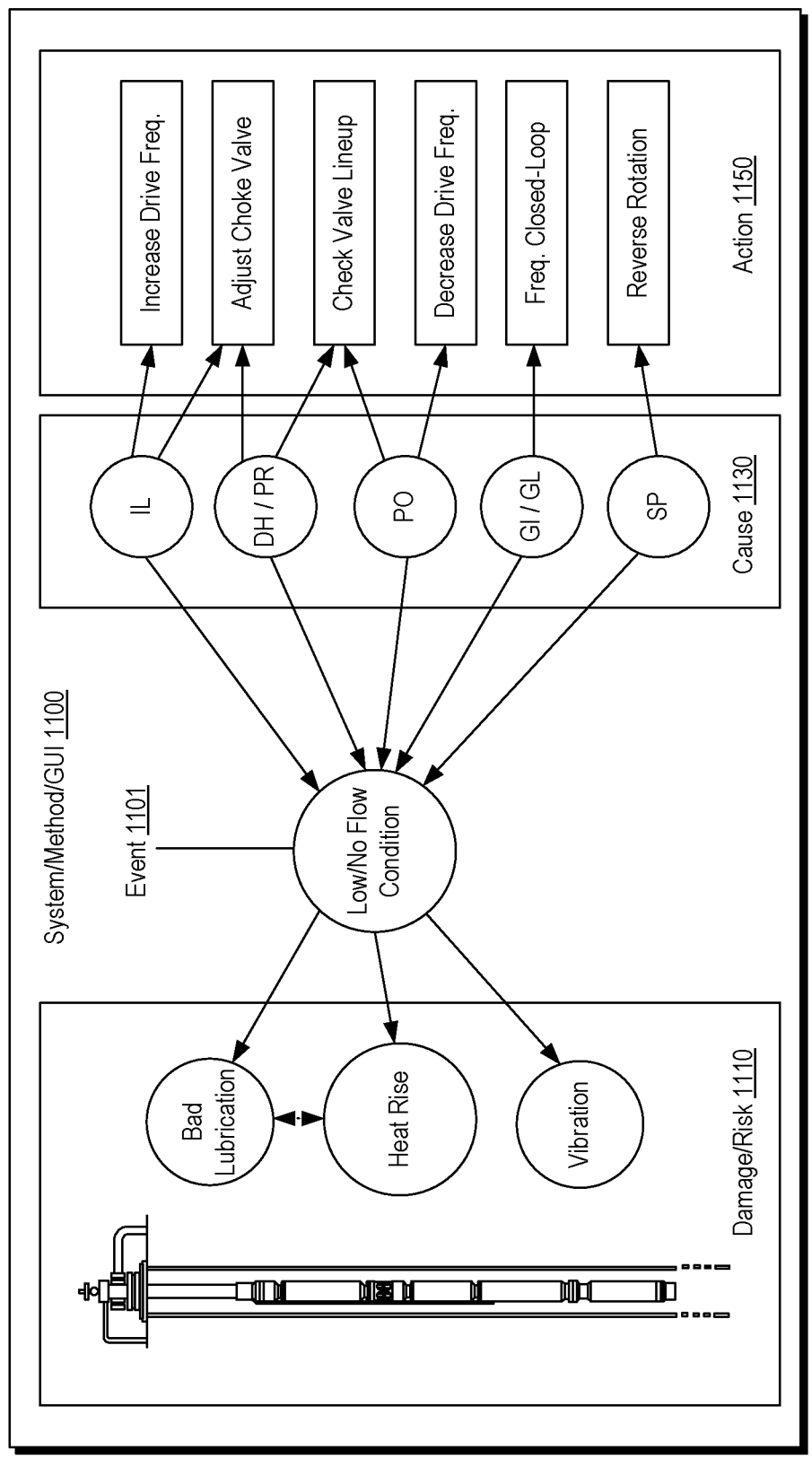
FIG. 11 illustrates an example of graphical user interfaces that illustrates examples of a system and a method.

FIG. 11 shows an example of a system, a method (or methods) and a GUI or GUIs 1100. As shown in FIG. 11, a framework such as an AEDF can be utilized to detect a heat rise and/or other condition(s) with respect to equipment such as an ESP and identify one or more root causes and call for one or more remedial actions, which can be control actions that call for controlling one or more physical pieces of equipment that can alter an environment and/or a piece of equipment. Such control actions may be one or more of automatic, semi-automatic and manual.

In the example of FIG. 11, an event 1101 is indicated as a low or no flow condition for equipment where damage and/or a risk of damage 1110 may be indicated, where one or more causes 1130 may be indicated and/or where one or more actions 1150 may be indicated. As shown, the one or more causes 1130 can include a sub-minimal rotational speed cause (IL), an outflow restriction cause (DH/PR), an inflow restriction cause (PO), a gas interference cause (GI/GL) and/or a stuck pump cause (SP). As shown, an action or actions can be indicated, which may include one or more remedial actions that aim to address the event, for example, as to one or more operations performed by the equipment, one or more conditions of the equipment, one or more causes of the event, etc.

The example of FIG. 11 can pertain to a single system such as, for example, a single ESP as installed in a well. As mentioned, various low level alarms may be set as part of a monitoring system where an event such as the event in the example of FIG. 11 can cause issuance of one or more of such low level alarms. For an individual that is responsible for monitoring the single ESP, there can be multiple low level alarms in progress, which may take some time for the individual to sort out and comprehend, either individually or collectively. Where the individual is responsible for more than a single ESP, the situation becomes more taxing on the individual. For example, consider an individual that is responsible for monitoring fifty ESPs where each includes multiple low level alarms for multiple channels of data (e.g., temperature, frequency, pressure, current, flow, etc.). The burden placed on the individual to discern and prioritize the information generated can be substantial.

As an example, a framework can be utilized for monitoring one or more systems where the framework includes a triage engine that can prioritize events. Such a framework can be useful for a single system and can be particularly useful for multiple systems, especially as the number of systems increases.

Figure 12:
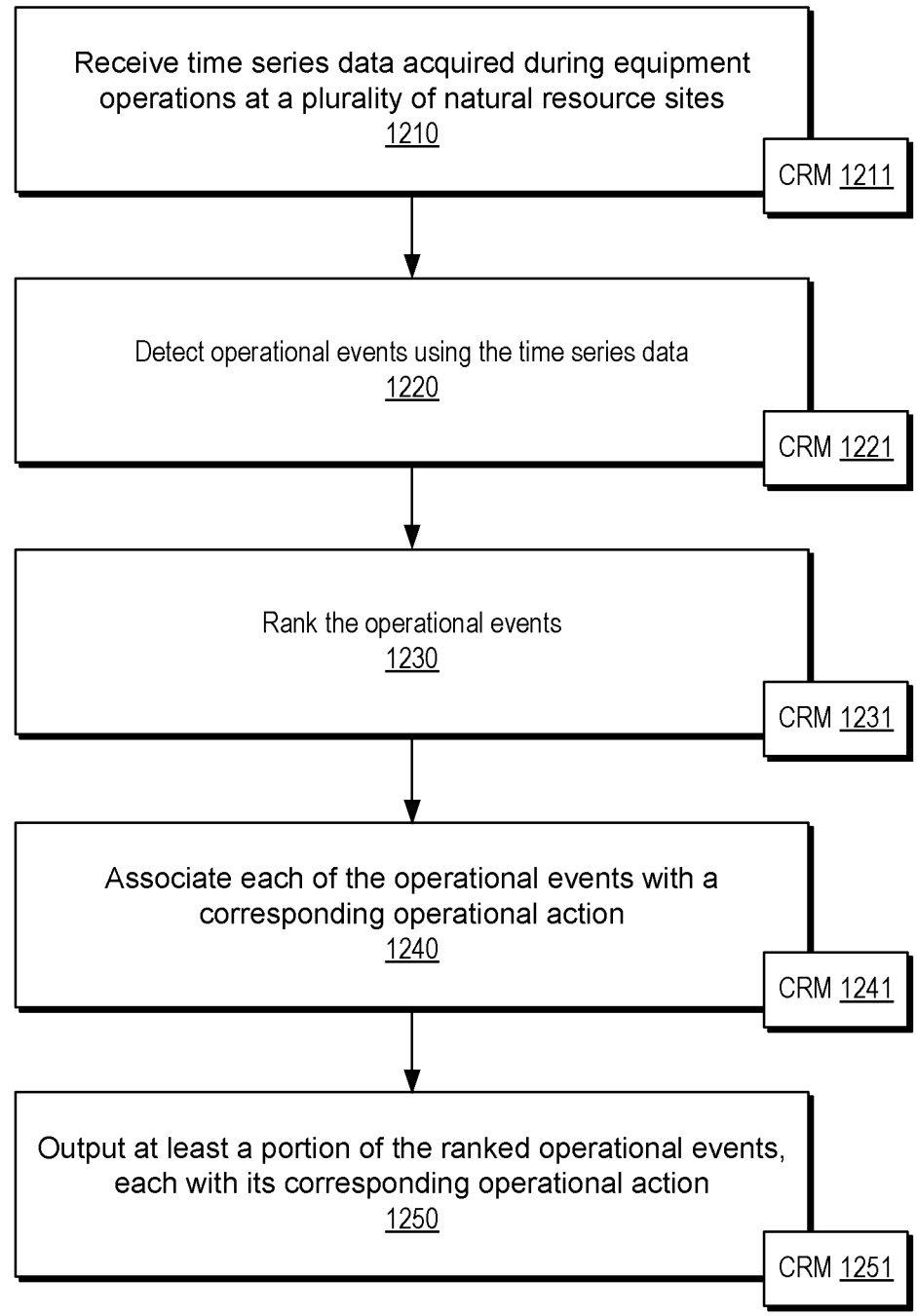
FIG. 12 illustrates an example of a method.

FIG. 12 shows an example of a method 1200 that includes a reception block 1210 for receiving time series data acquired during equipment operations at a plurality of natural resource sites; a detection block 1220 for detecting operational events using the time series data; a rank block 1230 for ranking the operational events; an association block 1240 for associating each of the operational events with a corresponding operational action; and an output block 1250 for outputting at least a portion of the ranked operational events, each with its corresponding operational action.

The method 1200 is shown along with various computer-readable media blocks 1211, 1221, 1231, 1241 and 1251 (e.g., CRM blocks). Such blocks may be utilized to perform one or more actions of the method 1200. For example, consider the system 790 of FIG. 7 and the instructions 796, which may include instructions of one or more of the CRM blocks 1211, 1221, 1231, 1241 and 1251.

As an example, the method 1200 can include outputting that includes rendering graphics for the at least a portion of the ranked events to a graphical user interface, where the graphical user interface includes graphical controls linked to the graphics that associate each of the at least a portion of the ranked events with its corresponding operational action. As an example, an operational action can be particular for a system, equipment, etc. For example, in FIG. 11, the actions listed in the action block 1150 include operational actions that can be taken for a well that includes an ESP installed therein.

FIG. 13 shows an example of a system 1300 and examples of workflows 1320. The system 1300 includes a graphical user interface (GUI) block 1310 that can include GUI components 1312 and 1314, which can be operatively coupled to a field component 1350 and/or to a production component 1370.

The GUI component 1312 can provide an event dashboard across a population of assets such as, for example, a multi-well list with events in real-time; can provide graphical controls for real-time mitigation of various events (e.g., triage); can provide for event disposition (e.g., status), acknowledgment, etc.; and live graphics such as charts, contextual graphics of events and acquired data, etc.

The GUI component 1314 can provide for historical presentations of events in context, for example, via tabular views, event-driven charts, grids, etc. and can provide for event disposition, acknowledgment, editing, etc.

The field component 1350 can generate output for AED signals, which may be normal, ranked, alarms, etc., where, for example, alarms can be tagged to facilitate filtering (e.g., reducing number, classifying, analyzing, etc.).

The production component 1370 can provide for access to a truth (e.g., label) and event database, for example, to prepare organized analyses, which may include analyses of uptime, downtime, number of events, event duration (e.g., based on event status, etc.), etc.

Various components of the system 1300 may be extensible and adaptable for various operations, workflows, etc. The system 1300 may be part of an AEDF.

As to the workflows 1320, these are shown in the form of a type of state diagram, which may be AEDF states. For example, an AEDF may have states of operation. As an example, a single AEDF may be in a particular operational state. As an example, an AEDF may be implemented as a parallel processing machine such that multiple states can exist at a time. As an example, multiple instances of an AEDF and/or AEDA may be generated and utilized to perform one or more aspects in series and/or in parallel.

In the example of FIG. 13, the workflows 1320 can utilize a field systems block 1321 operatively coupled to field equipment, which can output acquired data 1322 that can be loaded to a historian 1327 for storage in a historian database 1330 and that can be pushed 1323 for visualization 1324 (e.g., to one or more GUIs, etc.) and for AED analysis 1325, which can generate output 1326, which may be fed back to be pushed 1323 and/or be loaded to the historian 1327. The workflows 1320 also show loading of historical data 1331 from the historian database 1330 where the historian database 1330 can include truth marked data 1332, which may be labels, for visualization 1324 and aggregation 1333 of historical data, which may be stored in another database such as a SQL database 1334 for generating output 1335.

As an example, consider an AED engine as part of an AEDF that can include: tools to visualize and validate results and to record expert knowledge in the context of the input dataset where the tools: provide the ability to convert disparate historical data provided by different clients in different timestamp formats, data formats, units, and signal names into a common form, which can allow clean, efficient comparisons of results generated from data from different clients, fields, and equipment; handle datasets, supporting efficient visualization including panning, and zooming of results and input time series data together; are adaptable to different data, addition of new outputs, layouts, and visualization parameters; validate model outputs and create and maintain truth labels relative to outputs in a persistent store; and allow offline or real-time operations functioning in a cloud based or other environment.

As an example, in a development cycle of a machine learning algorithm that trains a machine model (e.g., neural network, etc.), a user can analyze PIs to identify one or more specific datasets that may have an issue as to potential problems to be resolved. As an example, a user can query a database for sets of labels to retrain the machine learning model if one or more PIs are not met. As an example, as the set of labels grow, the expert knowledge database is enriched such that the model becomes more capable of replicating expert knowledge and reproducing expected results (e.g., to some specified confidence level).

As an example, a detection engine can be automated and can operate without human interaction during a detection phase, for example, adapting itself to each of the wells it monitors. As an example, an AED framework can perform multi-variate analysis, combining measurements, and exploiting complex correlations between them to provide a consolidated output to one or more end-users.

As an example, an engine can be built around multiple processing steps including data conditioning, data quality and event detectors which output multiple diagnostics to a monitoring system. As an example, an AED framework can include capability of performing real-time surveillance, while also benefitting from historical data across multiple fields and wells.

As explained, there can be multiple root causes that could lead to an operational event/alarm; examples include data quality, sensor malfunctions, operational changes and flow-related events. An AEDF can identify one or more of such root causes and provide coherent reports on the events detected. An AEDF can include one or more workflows, for example, with experts who can validate, re-classify and develop "truths" that can be used to further improve the engine.

As an example, AEDF instances can have a configuration that may change over time. Configurations may be managed including an upgrade/rollback strategy. As an example, consider an associated "saved-state" file that preserves cumulative history learned by the AED engine allowing AED to pick up where it left off after a restart following an upgrade.

As to input and output signals, a set of input telemetry signals (e.g., channels, etc.) can be specified for each well. As an example, consider an AEDF that can include (1) a data quality (DQ) engine that produces output data streams indicating the quality of the input signals, and (2) reference signals for each input signal.

As an example, one or more AEDF event detectors can produce event transition output data streams, one for each detector. Each detector may include an associated event severity and detector quality signal.

Examples as to input can include for one or more operations (e.g., artificial lift, other production, etc.): discharge pressure, drive frequency, intake temperature, intake pressure, motor current, motor temperature, wellhead pressure, and wellhead temperature. Examples as to output can include for one or more operations: detector reference signals, a reference for each input signal, detector event outputs, deadhead surface (DH1), deadhead downhole (DH2), gas interference (GI), insufficient lift (IL), stuck pump (SP), pump off event (PO), other event outputs (e.g., pump status (ON/OFF), startups, shutdowns, etc.).

As an example, an AEDF can include detector event severity outputs (e.g., one signal per-detector indicating severity of event (SVxx)) and/or detector status/quality (e.g., one signal per-detector indicating status of detector (QVxx)) and/or data quality event outputs (e.g., event transition output data streams).

Quality of multiple detector outputs concurrently can include missing data, frozen data, gauge failure, etc. (e.g., GFd—broken discharge tube, GFt—broken thermocouple, DEt—downhole electrical tool, DEc—downhole electrical cable, etc.).

AEDF detector event and DQ event outputs can be streams of event transitions. As an example, two transitions can be combined (off-on+ on-off) to form a completed event. These events may be extracted and stored in a database making it possible to associate additional data with the event. An event created with a start transition and no end transition is termed an 'active' event. An event that includes both start and end transitions can be a 'completed' event.

As an example, context can be provided by non-time series data, together with other of the associated measurements and AED time series data. As an example, a +/− feature can be included where a user wants to see a lead up to and/or after the event. Various components may optionally remove these heads and tails portions.

An AEDF GUI can allow a user to quickly focus attention on an event including some context before, during and after an event. As an example, a GUI can display historical events as well as events that are currently active in real-time and, for example, events may be marked for other uses beyond immediate surveillance.

An AEDF GUI can include various components, for example, a real-time portion designed around surveillance and taking immediate, mitigating actions on detected events, and a historical component tailored to analysis, disposition, and editing of past events for reporting and optimization purposes.

As an example, AEDF output may also be utilized in a framework such as the Connected Production framework (Rockwell Automation, Milwaukee, Wisconsin) screens as signals/alarms, and the truth and event data may be utilized by the AVOCET framework (Schlumberger Limited, Houston, Texas) to prepare summary/macro level reports such as # of events in a field, metrics on event duration, top 'offenders' for events in a month, uptime, downtime, etc.

As an example, a framework can include features such as to automate workflows, consider model-driven workflows that can automate standard operating procedures to help improve efficiency and meet regulatory requirements. Such workflows may be configured for a wide range of use cases and initiate an ERP system, user or field event (e.g., a process condition); centralize production monitoring, consider using oil and gas equipment that incorporates remote monitoring to allow for visualizing production and equipment diagnostics across multiple wellheads from one or more location; and improve response times, consider real-time connectivity with seamless integration across automation systems to adjust production equipment or other equipment in response to changes or demands. Such a framework may help to reduce unplanned downtime via diagnoses and evaluation and/or control of performance.

As an example, an AEDF may include features that, as a user is working to resolve an event, control actions can be issued to change one or more operational parameters (e.g., for artificial lift, consider drive frequency and to change the choke position).

As an example, an AEDF can include or be operatively coupled to a ground truth database, which may be or include a label database. In such an example, the ground truth can be a collection of events that have been validated and recorded by one or more domain experts. An expert can look at the context of an event and determines the event type, severity, and duration that the system state represents and records it in an events database. Additional information such as a comment or more fine-grained event classification may also be added to the truth event. As an example, a truth event may be cross referenced to an event in another event management system.

As to event triage, it can be a process of ranking a set of active events and picking the most relevant/highest priority one to handle first. As an example, consider an approach that includes primary parameters for ranking active AED events that can include: severity, duration and event type.

As an example, one or more actions may be taken to resolve an event. In such an example, once an event is resolved, the event can be marked to support ongoing development and analytics (e.g., consider a change in status from active to completed). As to events, a workflow can include one or more of: promote the AED event as truth to an event database; and promote an AED event as truth to an event database with modifications. As an example, a workflow can indicate duration; event type; severity; finer-grained classification; comment addition; mark event as false alarm; etc.

As an example, AEDF generated events can be compared with truth events where statistics can be computed. As an example, an event database can be accessed for automated validation and regression testing.

As an example, an AEDF can include one or more GUIs for create, read, update, or delete (CRUD) of one or more events, which can include one or more truth events (e.g., labeled events) in an event database, optionally without promotion from an AED event (e.g., AEDF event). As an example, one or more truth events can be displayed in context with one or more channels of data from one or more assets (e.g., for event maintenance).

As an example, an audit trail can be generated for operations on an event database, for example, including one or more of the following: original source of event definition (RT AED, offline AED (backfilling events from historical data), user); author(s); and edit date(s) and/or time(s).

As an example, changes may be tracked as from/to pairs or a history of previous states kept; previous states can be reviewed (e.g., where it is desirable to enable a user to step back to revisions to see what the original event duration was, or what the initial, automatically determined event start time was prior to editing).

Examples of AEDF UI Elements can include: charts; trends showing context for events and events themselves; input telemetry; AED events; truth events; DQ events; low-level threshold alarms; graphical interaction for truth editing; interactive legend groupings for usability; real-time updates; grid; show events from selected time range in tabular form; sort/filter/paging/counts; real-time updates of active events; ability to acknowledge an event, etc.

As an example, in well-centric mode, a user may select a well graphic and a GUI can updates to show events related to the selected well in a selected time range. As an example, grid contents can be pre-filtered for the well and multiple events can be rendered (e.g., in one or more charts). As an example, in an event-centric mode, a well selection can be made to select one or more wells and event grid updates can occur to show events from the selected well(s) within a selected time range. As an example, a default behavior may show a real-time, automatically updating stream of events.

As an example, in a well-centric mode, selecting an event in the grid can show a static view of the event for the currently selected event in the grid. As an example, in a well-centric mode, real-time operation can show a window of data streaming in (e.g., as a FIFO, etc.). Completed events in the grid may be unselected. And, if there is an active event, it may update in the chart and in the grid.

As an example, in event-centric mode, real-time operation can update active events in the grid and update chart data stream for active event selected in the grid.

As an example, events shown in the grid may be sorted and filtered by severity and duration to visually rank then for triage. As an example, when an event has been addressed, an operator can acknowledges it in the GUI.

As to features of a GUI, consider one or more of pan; zoom; paging and decimation when moving beyond data extents; operations that cause multiple AED events to come into view; visual highlighting of an event in a chart for a well/event selected in a grid; cursors; channel legends; markers; scales; ability to select and interactively change visible region in time to support managing truth events; and interactions with grid rows to view different wells and events.

As an example, a GUI can provide for AED events as to truth and interact with truth events can be provided as based on time range selections, selected grid events and context shown in a chart.

A GUI may issue signals/information to communicate with a controller or equipment in a control room (e.g., for execution, etc.). As an example, one or more displays can provide content (e.g., adjust ESP speed set point or choke position, etc.) that can depend on particulars of a workflow. In such an example, the content may be associated with a selected event such as one or more actions to mitigate the event.

Some actions may take time to complete and resolve an event. To help manage a workflow of managing triage of many parallel events, these actions can be added to a work in progress graphic and a reminder set up for a deferred review or action related to an unresolved event.

As explained, an AEDF can assist in detecting events. As an example, multiple individual AED instance can be running, communicating, getting good input, and have built up solid references to work optimally. In some instances, an executing AED can still provide degraded output for certain conditions (e.g., lack of data from a channel, noisy data, etc.). In such instances, a GUI may inform an operator as to such conditions or degraded output. As an example, a visual indication may be provided on a per well basis, a per detector basis and/or a per channel basis.

As an example, consider conditions where a given AED instance may not generate signals for some time. An AEDF can monitor AED heartbeats and notify a user if it is not receiving periodic heartbeats from an AED instance.

As an example, an AEDF can include a built in data quality engine that outputs DQ events indicating problems with the input data streams that the detectors use. As an example, consider an AED detector status as to signals that indicate the general health of running detectors.

As an example, a system can respond to severe events promptly. For example, latency between when the event happens and when a user can see an indication of the event can be a metric rendered in a GUI. As an example, once a poor condition is indicated in the GUI, a user can then drill down to try to determine the source and attempt to resolve the problem. As an example, an AED can have a corresponding alarm hierarchy.

As an example, a framework can include: channel name identification; a timestamp: microseconds; a value: represents the telemetry data value of a given tag/channel/IQ; context: data segregated by some context so that the framework can automatically scale and process several wells at the same time (e.g., context as the well name and comes as a header or label with the incoming real-time data); etc.

As mentioned, via an AEDF, users can be able to see events being automatically detected across multiple wells in an event-view fashion and will be given a chance to acknowledge that, promote to truth and navigate through the events captured so far. As an example, AED alarms may be fed into a more expansive surveillance alarm management system to enable a controller, an operator, a production engineer to have access to alerts.

As an example, an AEDF can operate using one or more application programming interfaces (APIs). For example, an AEDF and/or a portion thereof (e.g., AED instances) can be isolated using APIs. For example, an I/O API can help to isolate one or more AEDF components from database specifics and/or communication/protocol technologies. As an example, results may be output using an I/O API approach. As an example, an AEDF can issue API calls and receive information responsive to such API calls. As an example, an AEDF can receive API calls and transmit information responsive to such API calls.

As an example, a method can include: 1) acquiring time-series (TS) data where real-time data are acquired from/by various systems; 2) pushing real-time messages to subscribers (e.g., transforming acquired data into a specified API format and then pushing); 3) feeding an AED (e.g., AED running on incoming real-time data, which may be via an API or APIs); 4) outputting new signals (e.g., AED transforms its output/results into a format defined by an API); 5) loading time-series (TS) to a historian database (e.g., transforming real-time data (telemetry or AED output) into a schema that may be saved into a non-SQL historian database); 6) loading historical data/information (e.g., access to a non-SQL historian database to visualize and/or perform computations (e.g., aggregation)); 7) intelligent aggregating (e.g., extraction of meaningful information from raw and/or calculated real-time data, which may then be stored in a static database (e.g., PDMS)) for reporting, etc.); 8) visualizing (e.g., allows user(s) to see real-time data, historical data and/or other information (e.g., truth, labels, etc.)); 9) truth marking (e.g., truth may be created in real-time, on a historical basis, after the fact, etc.). As an example, a non-SQL historian database can include a schema that allows truth to be created, read, updated, deleted, etc. (e.g., CRUD). As an example, truths may be retrieved by a service that loads historical data.

As an example, an AEDF can include or allow for clients running against a load balanced webserver; browser based client or another frontend calling web services; middleware (e.g., a HTTP REST API that a frontend may use to access time-series and event databases in a convenient and secure manner), which may provide for AED event extraction and storing of events in an AED event database; one or more backend databases (e.g., for SQL queries behind stored procedures executed by a specific service account, which may prohibit SQL injection exposure, where a time-series database may include a native REST API, etc.).

As an example, one or more features of a machine learning platform may be utilized. For example, consider the TENSOR FLOW platform (Google, Mountain View, California), which may be utilized as part of an AEDF, to train one or more structures of an AEDF (e.g., model or models), etc.

As an example, a convolution neural network system (CNNS) can be implemented using one or more platforms such as, for example, a computational platform that includes neural network features. As an example, a computational framework can include an analysis engine that can include one or more features of the TENSORFLOW platform, which includes a software library for dataflow programming that provides for symbolic mathematics, which may be utilized for machine learning applications such as artificial neural networks (ANNs), etc. [00186] As an example, the GAFFE framework (Berkeley AI Research, Berkeley, California) may be utilized. The GAFFE framework includes models and optimization defined by configuration where switching between CPU and GPU setting can be achieved via a single flag to train on a GPU machine then deploy to clusters. As an example, a framework may be at least in part cloud-based where computing resources can include cloud-based resources, which may be provisioned in one or more manners, optionally on demand.

As an example, a system, a method, a GUI, etc., can be for one or more surveillance workflows and visualization based on AED, contextual information and capturing of expert knowledge.

Various examples of complementary concepts demonstrate how user interaction for an asset surveillance and management system may occur. Various examples utilize one or more artificial lift systems as examples of some types of equipment that may be assessed, interacted with, understood, etc.

Various example systems include GUIs that can be utilized by human operators to visualize, understand, interact, etc., with machines and/or people. A single human operator may be overloaded with tasks, duties, data, etc., as may be associated with various assets and operations thereof, which can be dynamic and change responsive to conditions, equipment interactions with other equipment, the environment, people, etc. Dynamic behaviors may be directed, at least in part, to perform desired actions of one or more workflows. Equipment and/or people may issue notifications, communications, etc., that can overwhelm a single operator, which may be trying to handle multiple "threads" for various different assets where each thread may be associated with one or more workflows, with "stop and go" actions that may depend on conditions, equipment, people, resources, etc. For example, consider a single operator that works an 8 hour shift (480 minutes or 28,880 seconds) that receives over 4,000 notifications, communications, etc., during that 8 hour shift, which is, on average, one new item each 7.2 second interval. The operator's focus is to be keen to track multiple assets and multiple workflow threads, which, again, can be dynamic.

As an example, to streamline an operator's environment, a system can utilize a triage score, which can be a single triage score that is numeric and characterizes an item, an incident, a condition, etc., in a manner that can be compared to other items, incidents, conditions, etc. As an example, a system can include a ranking mechanism that is interoperable with a triage scoring component and one or more real-time interfaces, such a ranking mechanism can be utilized, for example, to trigger rendering of graphics, text, etc., to a display. For example, consider a display that includes graphics that represent threads where each thread is associated with a particular asset and one or more workflows for that particular asset. Where a high ranking triage score emerges responsive to receipt of data, information, etc., at an interface, a GUI can render a new thread graphic, which may be at a top row position, a left column position, etc., such that an operator can quickly become aware of the new thread and commence appropriate action. For example, consider a new thread with a graphic that can be selected to render a workflow for handling a triage issue that is particular to an asset. In such a manner, an operator can in a near immediate manner begin to address the triage issue by commencing a suggested workflow. As mentioned, a workflow can be interactive and depend on actions performed by one or more machines, one or more people, etc. Hence, as an example, a wait graphic may be rendered to indicate that after commencement of the workflow to address the triage issue, the system is waiting for input. In such an example, a wait graphic may be a clock graphic with a spinning hand, a slowly blinking graphic, a heartbeat graphic, a colored graphic, etc., which may be visible but not distracting to the point that the operator's eyes become overly strained when viewing one or more system related displays. Once input is received, the wait graphic may transition to a different style such that an operator knows that the workflow is ready to proceed to a next action.

As explained, a single triage score can simplify matters and a triage score can be utilized to sort and/or highlight issues on a dashboard (GUI). As explained, a user may interact with a GUI to select an asset and/or a triage score and commence a workflow to address a triage issue, which may be a recommended workflow. As explained, a workflow can be represented as a thread that can involve many actions, waiting for responses, etc. A GUI can allow that workflow/thread to progress while a user gets back to the dashboard to handle one or more other new or existing issues/workflows/threads. In the instance that a user has ample time (a break in the action), the dashboard may be used to tailor/optimize one or more assets, as may be highlighted via various GUIs. As an example, a system can aim to make a user's job more "free", mentally, as the user may forego having to "remember" what's going on in each of many workflows as swim lanes or other graphics can show existing workflows/threads and status thereof.

As an example, a single triage score can be a way to prioritize, which can simplify a complex system, providing the greatest return and most efficiency of a user's time/efforts given the number of assets/issues that may exist.

In the context of artificial lift, hundreds of thousands of artificially lifted wells can be connected for remote visualization, surveillance, and/or control. The number is expected to rapidly increase as operators seek increased operations efficiencies.

Operating complex electromechanical systems in the harsh environment of a hydrocarbon reservoir presents a number of challenges to operators. Surveillance engineers and operators are often overwhelmed by "alarm floods" and often work in a reactive mode just trying to mitigate emergencies. This leaves less time for work on run-life or production optimization, potentially resulting in shortened run-life for equipment or deferred production. Alarm flood, a high number of manual tasks, and the demand for extreme multi-tasking can result in surveillance engineers making mistakes or, most commonly, overlooking the initial signs of an equipment-damaging event. Various systems, methods, GUIs, etc., described herein can enable surveillance engineers to focus on the right problem at the right time, ultimately resulting in improved equipment run-life and increase production.

Figure 14:
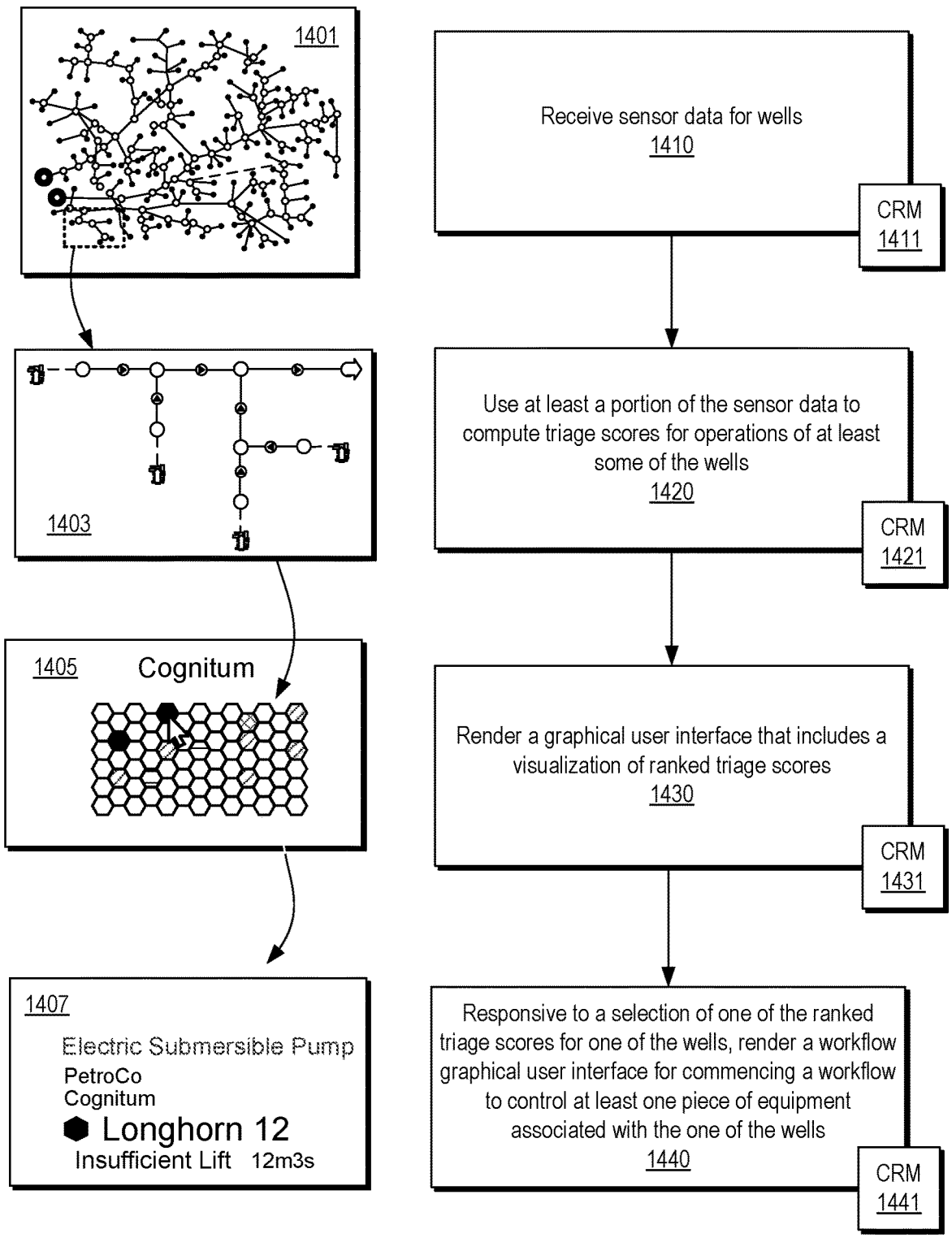
FIG. 14 illustrates an example of a method.

FIG. 14 shows an example of a method 1400 along with some example illustrations of wells 1401 and 1403 and graphical user interfaces 1405 and 1407. As shown, the method 1400 can include a reception block 1410 for receiving sensor data for wells (e.g., assets, equipment at/in wells as assets, etc.); a computation block 1420 for, using at least a portion of the sensor data, computing triage scores for operations of at least some of the wells (e.g., equipment operations, etc.); a render block 1430 for rendering a graphical user interface (GUI) that includes a visualization of ranked triage scores (e.g., raw, normalized, etc.); and a render block 1440 for, responsive to a selection of one of the ranked triage scores for one of the wells, rendering a workflow graphical user interface (GUI) for commencing a workflow to control at least one piece of equipment associated with the one of the wells.

As an example, a workflow can include one or more actions. As an example, a ranked triage score may be associated with a corresponding action, which may be an action of a workflow. In such an example, the action may be a recommended action, which is generated using an AEDF or an action engine operatively coupled to an AEDF framework. As an example, a recommended action can be a control action that controls equipment at a wellsite in an effort to mitigate one or more conditions as associated with a triage score, etc.

As to the illustrations, the wells 1401 may number more than 10, more than 100, more than 1000; some of the wells 1403 may be associated with a particular portion of a surface network of conduits, etc., that provide for transport of fluid (e.g., a natural resource) produced to one or more processing facilities. As an example, where gas lift is implemented as an artificial lift technology, gas (e.g., natural gas, etc.) may be separated from fluid produced and pumped into a well to facilitate further fluid production. In such an example, the gas may be from one or more of the wells 1401 (e.g., gas in a reservoir, etc.). As to the GUI 1405, it includes a visualization as to various wells such as the wells 1401, which may be grouped (e.g., two or more groups, etc.), where one of the groups includes the wells 1403, etc., which may be operatively coupled to a portion of a surface network. As to the GUI 1407, it includes an indication of an issue (e.g., insufficient lift), along with a duration (e.g., 12 minutes and 3 seconds). Further, the type of technology involved is indicated (e.g., "electric submersible pump"). As an example, the GUI 1407 may be utilized to commence a workflow, for example, to address control of the ESP at the Longhorn 12 well as being indicated in appropriate visual coding (e.g., color coding, etc.) due to a high triage score. As an example, a GUI such as, for example, a GUI 1900 of FIG. 19, a GUI 2500 of FIG. 25, etc., may be utilized to commence a workflow, issue one or more control actions, etc. As an example, the GUI 1407 may be operatively coupled to a GUI that includes one or more of the features of the GUI 1900 of FIG. 19, the GUI 2500 of FIG. 25, etc.

The method 1400 is shown along with various computer-readable media blocks 1411, 1421, 1431 and 1441 (e.g., CRM blocks). Such blocks may be utilized to perform one or more actions of the method 1400. For example, consider the system 790 of FIG. 7 and the instructions 796, which may include instructions of one or more of the CRM blocks 1411, 1421, 1431 and 1441.

FIG. 15 shows examples of GUIs 1510 and 1530 that include graphics for groups of wells with names Tranquility, Imbrium and Cognitum where each group includes over 50 wells (e.g., over 50 assets). The GUIs 1510 and 1530 include a graphical control for selecting one of a plurality of different ways to code the wells. For example, the GUI 1510 includes coding by production (e.g., production of a natural resource) and the GUI 1530 including coding by triage score (e.g., as to one or more events as may be detected using an AEDF). In such an approach, a user may toggle between different coding mechanisms to understand one or more aspects of an asset and its operation. As an example, a coding approach can include coding for components that are considered in calculating a triage score. For example, production can be a component that is used for calculating a triage score. In such an example, a triage score may be higher where production is high (e.g., an issue places high production at risk). By toggling between views, a user may ascertain whether a triage score is high due in part to high production or otherwise understand production in relationship to a triage score (e.g., code, which may be a color, etc.).

Figure 16:
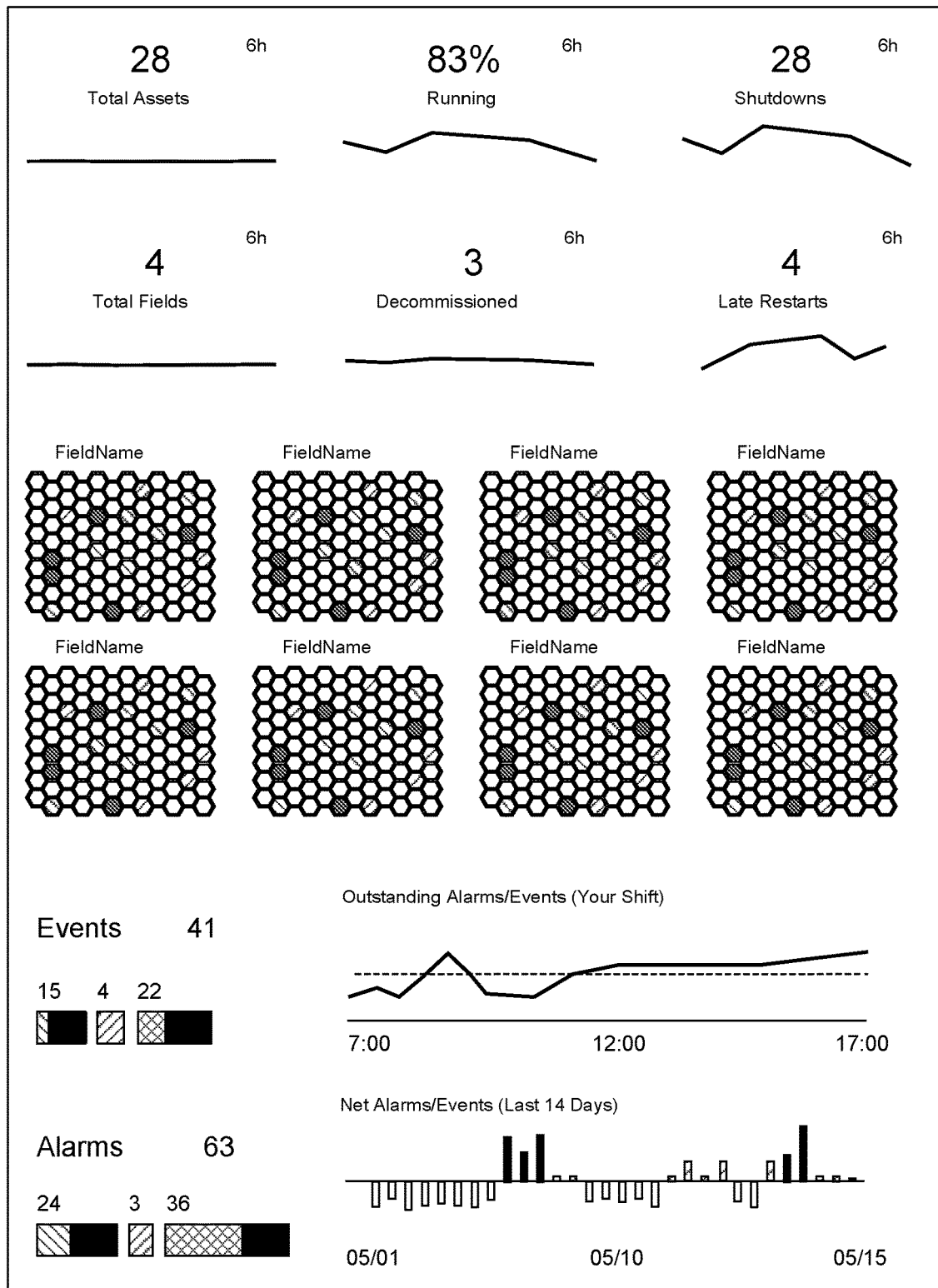
FIG. 16 illustrates an example of a graphical user interface.

FIG. 16 shows an example of a GUI 1600 that includes various data as to operations in various fields. The GUI 1600 can include a summary for a selected field or fields that can show a number of assets (e.g., 28), percentage of assets in operation (e.g., 83 percent), a number of shutdowns as to operations (e.g., 28), a total number of fields (e.g., 4), a number of decommissioned assets (e.g., 3), and a number of operations with late restarts (e.g., 4) where time lines may be shown with historic data. As mentioned, graphics can illustrate assets per field or other manner, which can include color or other coding. As an example, an events graphic can show a number of events for a selected field or fields (e.g., one or more assets), a number of alarms, etc., which may be coded in a manner that is utilized for bulk graphical representations of assets. As an example, a graphic can show a number of outstanding alarms and/or events for a particular individual or team, which may be along a timeline. As an example, a statistical representation of net alarms and/or events within a time period may be rendered (e.g., as a bar graph, etc.).

FIG. 17 shows an example of a GUI 1700 that includes various graphical controls and information as to various assets. As shown, columns can include assigned, client, field, triage score, AED type, autopilot (e.g., automatic control), level "Lo", rate of change "RoC" and level "Hi". As an example, the levels can be adjusted such as a level "Lolo" and a level "HiHi". In FIG. 17, the GUI 1700 shows various triage scores, which are in a range, for example, of 0 to 1 where a higher score provides for a higher ranking. As shown, well EB-12 has a highest ranked AED event as indicated by the triage score of 0.95, which may be color coded, etc. The AED type is indicated as "pump off" with a duration of 24 minutes, which may be compared to well EB-11, which has a triage score of 0.37 with "pump off" for 17 minutes. Such an approach can allow a user to discern differences in wells given triage scores where a user may understand components that make up a triage score. In such an example, well EB-12 may be higher scored due to production (e.g., being higher than production for well EB-11) or another factor that is used to compute the triage score.

Figure 18:
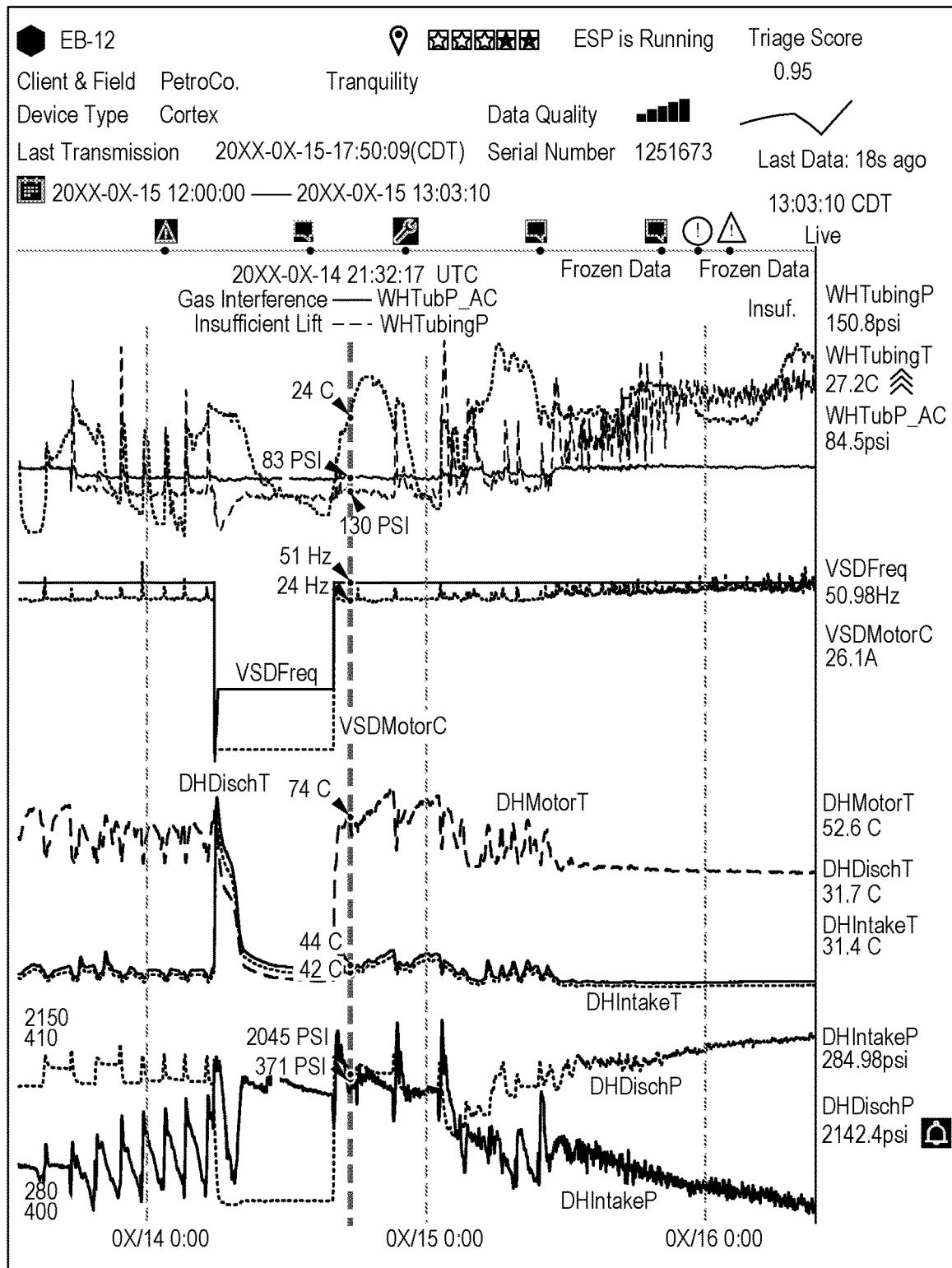
FIG. 18 illustrates an example of a graphical user interface.

FIG. 18 shows an example of a GUI 1800 that is for a particular asset such as, for example, the well EB-12. The GUI 1800 provides a graph of the triage score for the asset with respect to time. Further, various types of data from various channels are rendered along with particular indications of alarms, limits, etc., and corresponding values for the channel data. The plots include a time line with a "live" indicator where numeric values are shown to the right of the live indicator. As shown in the GUI 1800, the well EB-12 has an ESP that is experiencing gas interference and insufficient lift. Further, various instances of "frozen" data are indicated as well as a data quality indicator (see, e.g., bar graph). The event is experienced at least in part over a time period between day 14 and day 15. Various drops in frequency and current are shown with respect to operation of the ESP.

In FIG. 18, the GUI 1800 also provides various data as to particular equipment. For example, a serial number is given along with a device type (e.g., cortex). As an example, a method can include accessing data for a particular manufacturer, model, device, etc., which may include accessing a database of updates (e.g., a knowledge base, recalls, firmware upgrades, etc.), a database of historical data (e.g., operation history, repair history, maintenance history, etc.) and/or one or more other databases. As an example, past operational history may include efficiency data with operations parameters, experienced operational limits (e.g., flow, efficiency, temperature, current, etc.), etc. As shown in the GUI 1800, time-series and model data with the known asset details (e.g. pump construction, reservoir/formation details, etc.) can be rendered where one or more of such types of data may be utilized for triage score calculation for an event and/or associating one or more actions with an event. For example, consider a database that indicates that the specific ESP experienced an event on a prior job (e.g., another well, etc.) that was mitigated/remedied by a taking a particular action. In such an example, that action can be associated with the same type of event or a related type of event as a recommended action. Such an approach may be tiered, for example, where data for the specific ESP is not available (or not indicating the same or similar event), a multi-ESP databased, an ESP model database and/or ESP manufacturer database may be accessed, which can include event related data and one or more types of actions that may be appropriate for event mitigation, etc.

As an example, a method can include utilizing a combination of time-series and model data with one or more of equipment, asset, and reservoir specific details. For example, consider an analysis that assesses pressures in view of what data are available about a reservoir (e.g., as to possible damage to a reservoir, as to pump performance, expected duration of artificial lift employment, etc.); or, for example, an analysis that assesses motor temperature in view of the maximum operating temperature of the motor (e.g., where a higher operating temperature may shorten operational life, shorten time to maintenance, etc.); or, for example, an analysis that assesses pump operating point in view of a manufacturer's operating curve (e.g., deviation from manufacturer's operating curve, etc.). Such approaches can, for example, help to detect an event and/or associate an action with an event. For example, consider a sandface pressure related event that can be mitigated by a control action of an ESP that reduces risk of reservoir damage. As to temperature, it may be related to flow, as fluid flow may cool an electric motor of an ESP. In such an example, an action can be recommended that balances heat generated by the electric motor and cooling of the electric motor by transfer of heat to pumped fluid.

FIG. 19 shows an example of a GUI 1900 that may optionally be co-rendered with one or more other GUIs such as, for example, the GUI 1800 of FIG. 18. As an example, the GUI 1800 and/or the GUI 1900 may be rendered responsive to interaction with a GUI such as the GUI 1510, the GUI 1530, the GUI 1600 and/or the GUI 1700. The GUI 1900 includes a list of various operational events along with duration, source, severity, start, end, and action. As an example, the list of operational events can be ordered by ranking of triage scores as computed for each of the events. As shown, an operational event, which may be an AED event (e.g., from an AEDF) can be rendered with a corresponding action, which may be, for example, a workflow (see, e.g., various workflows "WF"). In the example of FIG. 19, the first two events (top listed events) have a start time but no end time, which means that their status can be "active"; whereas, one or more of the other events may have a status "completed". In the example of FIG. 19, the "pump off" event is an AED event that is deemed to be severe with a start time and no end time where an associated action is to perform a workflow WFX1. In such an example, a user may select the event using the GUI 1900 (e.g., and a human input device) to cause the workflow WFX1 to commence or otherwise to cause information pertaining to the execution of the workflow to be rendered and/or transmitted. In such an example, a user can readily discern various events and their status as well as actions that may have been taken to resolve the events, which may give rise to their corresponding end times.

As mentioned, a triage score may be calculated, which may be via a computational triage engine that is operatively coupled to one or more interfaces that can receive data, etc.

Figure 20:
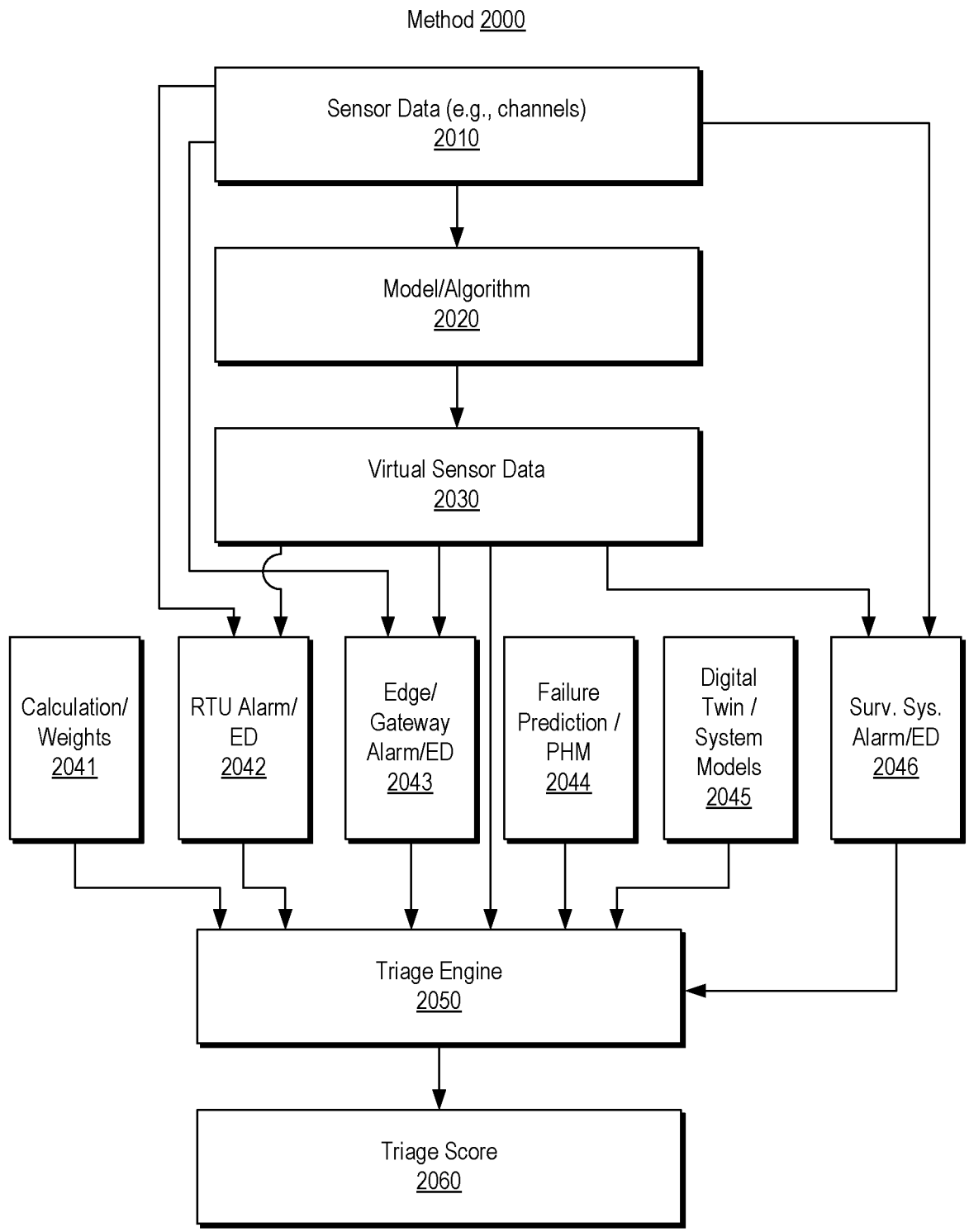
FIG. 20 illustrates an example of a method.

FIG. 20 shows an example of a method 2000 for computing a triage score 2060, for example, by a triage engine 2050. As shown, the method 2000 includes a sensor data block 2010, a model/algorithm block 2020, and a virtual sensor data block 2030, where such blocks can provide input or inputs to the triage engine 2050 such that the triage engine 2050 can output the triage score 2060, which can be an event specific triage score, which may be raw or normalized.

As shown in FIG. 20, the triage engine 2050 can include various inputs as may be provided by input blocks such as, for example, a calculation and weights block 2041; an RTU alarm and event detection (ED) block 2042; an edge, gateway alarm and/or ED block 2043, a failure prediction and/or PHM block 2044, a digital twin (e.g., digital avatar, etc.) and/or system model(s) block 2045, and a surveillance system alarm and/or ED block 2046. As shown, the virtual sensor data block 2030 can be operatively coupled to various input blocks and may provide virtual sensor data where, for example, a sensor does not exist, a sensor has failed, sensor data is not being received as expected, etc.

As an example, a triage engine can receive multiple forms of information, including raw sensor data, event and/or alarm detections from either edge devices such as the RTU or gateway, event and/or alarm detections from server/cloud-side processing, and optionally one or more virtual sensor, and then implement a calculation and weight algorithm to combine these sources of information using various techniques to arrive at a single triage score for each event, each asset under control, each protection (e.g., consider an asset to be protected from certain operation, operational conditions, etc.), or each surveillance. As an example, virtual sensors may include such triage engine inputs as "virtual flow", "modeled pump temperature", or "estimated slip". As an example, event detector sources may include threshold alarms or higher-level diagnostics such as the output of an advance failure prediction model, prognostic health monitoring model, or comprehensive "digital twin" (e.g., an artificial lift system avatar, etc.).

Figure 21:
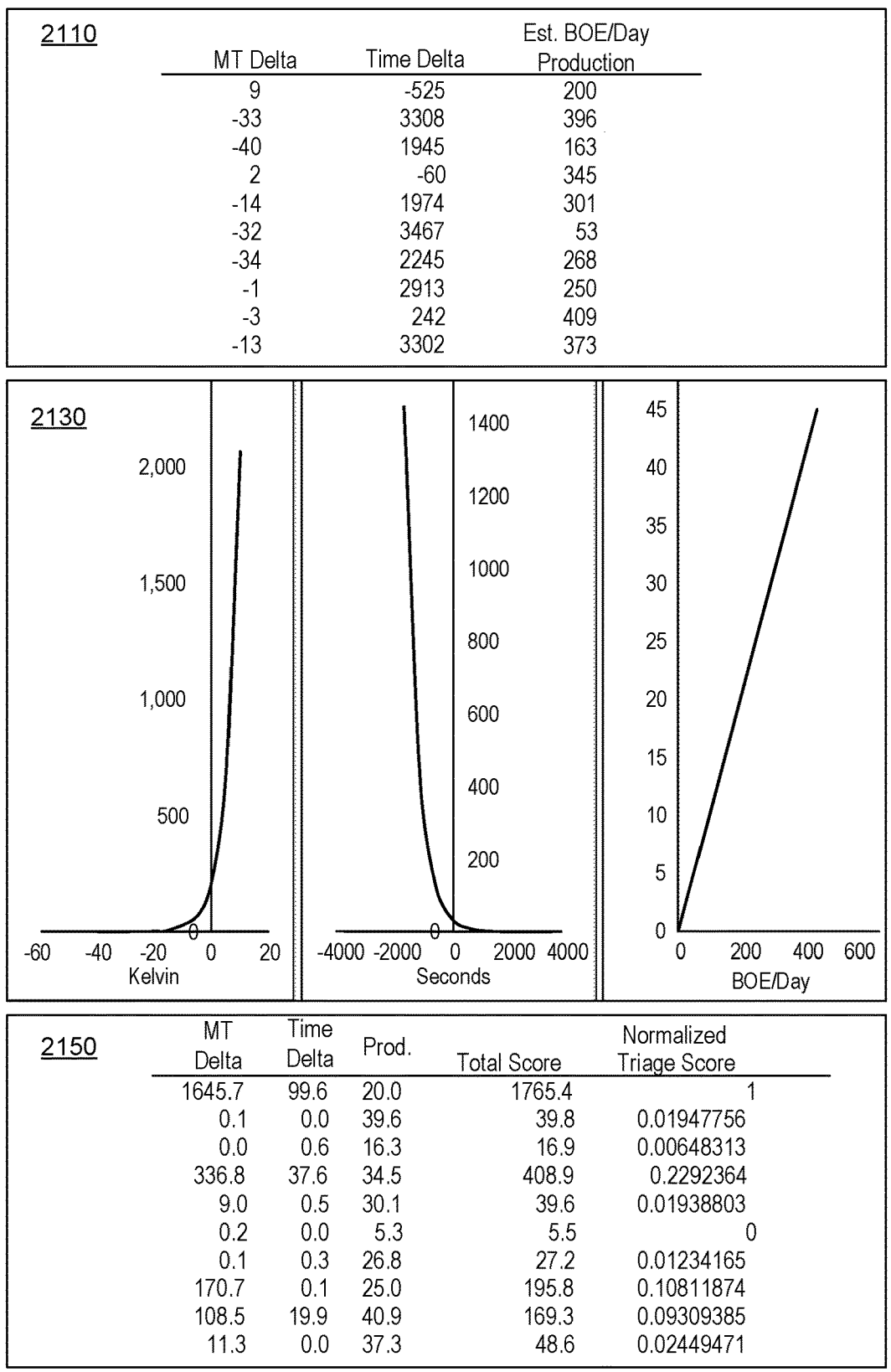
FIG. 21 illustrates examples of graphical user interfaces for computations of one or more triage scores that can be ranked.

FIG. 21 shows examples of graphical user interfaces (GUIs) that include examples of a table of measurements and estimates 2110, examples of plots 2130 of numbers that have been assigned to the curves for motor temperature delta, time, and production, and an example table 2150, which includes ranked normalized triage scores.

As an example, consider a scenario where the measurements and estimates 2110 are obtained from assets with operational equipment such as electric submersible pumps. Such a table may be a GUI, for example, with color coding.to show rank with peers.

In the example of FIG. 21, each of the three measured/estimated parameters can be assigned a cost function. Both motor temperature delta from threshold and estimated time from threshold temperature in this example can utilize a non-linear exponential function of form: $y=a*e^{bx}$.

And estimated BOE/day production may follow a linear function: $y=m*x+b$.

In FIG. 21, the plots 2130 shows, for illustrative purposes, numbers that have been assigned to the curves for motor temperature delta, time, and production. In FIG. 21, the plots 2130 show various parameter values below each of the plots. By applying these to the relevant measurement/estimate, a method can provide a table of costs that may be summed, ranked, and normalized.

In FIG. 21, the example table 2150 includes ranked normalized triage scores. While the table 2150 shows numeric values, as an example, graphics may be rendered to a GUI, optionally with numeric values.

As explained, a triage score can provide a surveillance engineer or other user tasked with actively managing and protecting assets with a rank-able numerical score to guide their decision on which asset event to manage first.

As an example, a system may provide for triage expression editing, testing, and refinement. For example, consider a triage engine that utilizes weights and calculations that are defined by an asset owner and or key stakeholders in asset stewardship. As an example, a system can be tailored to operator specific demands and the operating conditions that exist in a specific field, regulatory regime, or environment. As an example, a triage engine can be generated that provides for codification of best practices to ensure consistency across a population of asset managers. As an example, with a configurable triage ruleset, one operator may wish to slightly prioritize production over the likelihood of equipment deterioration.

As an example, an expression editor tool can enable clients/stakeholders to ensure their business logic, PIs, POs, and other inputs are captured in a reviewable, auditable, and testable fashion. Additional tools such as backtesters can assist with running a retrospective review of how the rules would have worked in the past. Such an approach can provide a sanity check on the rules behavior before they are put into place.

As an example, alternatively or additionally, an option may be to collect user input either through running the triaging system in a 'training' mode for a short period of time, days or weeks, to capture how the most senior experts select the top issues. For example, a naïve system can present issues in a list ranked by classification and number of events, for example the number of major, minor events and threshold alarms. As an example, expert users can then work on this list while the system would tracks and collects the sequence of interaction to enable future analysis or training.

As an example, an option can exist to collect input to have the system generate multiple scenarios with representative data. These scenarios may then be distributed to senior asset management people (e.g., surveillance engineers) within the stakeholder organizations, and where they then rank the assets in priority. A modified approach may be used to ingest the human-ranked input and turn this into a training set for machine-learning/neural-network AI techniques that would ultimately form the basis of the triage engine. Such an approach can be less demanding as to a complex and time consuming step of manually generating, testing, and adjusting the weighting techniques. Evaluation techniques combined with a large corpus of historical data may provide confidence in the consistency of operation.

As an example, assets can provide a varied amount of instrumentation and data which will in turn affect the amount of higher-level analysis, such as event detection, that may be performed on the asset. For example, an ESP well missing the downhole tool lacks sufficient measurements to enable automated event detection. This does not mean that the ESP will not have protection from the triage system, rather the triage system can include a mode that automatically adjusts ranking to account for missing sensors, signals, or event identifiers. As an example, an event detection engine can inform the triage engine on the state of its operation, so the triage engine can be explicitly informed on whether higher-level modeling or analysis is available for each asset and can adjust the weighting accordingly.

As an example, parameters definitions may be updated as frequently or infrequently as desired (e.g., optionally responsive to one or more triggers as to condition(s)). For example, one client may desire a highly regimented process that demands infrequent updates and extensive reviews; another client may desire a highly dynamic system capable of on-the-fly, real-time tuning by either or both human and machine learning tools. As an example, a triage engine can be adaptable and can accommodate a spectrum of update frequency.

As an example, a system can provide for severity and priority grouping. For example, a system can allow for triage and alarms to be administered to logical groups to increase granularity and applicability. As an example, triage rules, algorithms and weights may differ across clients, but may be further refined by applying the rules to fields, pads, or logical asset grouping. As an example, one or more alarms may be defined with differing weights/severities by group.

As an example, to help assure appropriate weighting of an entire population, a hierarchical ranking system may be applied. For example, a client with a small number of wells may frequently have disproportionally high triage scores vs. a client with hundreds of wells. Also worth considering is that a small population of high-tier offshore wells with a higher-level service contract may benefit from an extra weighting factor to ensure these assets are treated with priority ahead of low-tier, low-cost land wells with a basic service contract.

As an example, a triage score can enable a dynamic dashboard to be created showing assets in precarious states, with the top of the list being the one most urgently demanding intervention/attention (see, e.g., FIG. 19). As the issue(s) is(are) mitigated, the triage score can automatically begin to decrease, as the factors that lead to it being highly ranked begin to fall back towards safe or acceptable levels, resulting in a lower score. As an example, where a workflow thread is graphically rendered, the thread may be positioned accordingly to reflect a change in triage score of an underlying asset.

As an example, a GUI can include delta cursors in a line chart. For example, two cursors may be used to track the rate of change for each measurement/channel presented in a line chart. Such an approach can provide the user with a rapid means of understanding how fast a measurement signal is increasing or decreasing over time. As an example, cursors may include the following capabilities or attributes: machine determination of relevant timeframe, e.g. appropriate slope such as −0.8 degrees C./hour instead of 0.0002 degrees C./second; draggable cursors that may up across multiple stacked line charts and extend into the previously described timelines; features to set delta cursors to the start and end of a region selected in the timeline; and features to set one of the delta cursor positions to a specific point in time selected from the timeline.

As an example, a system can utilize one or more of auto-tuning thresholds and rate-of-change alarms. For example, setting threshold alarms tends to be a time-consuming, manual task to be performed routinely to account for the evolving nature of a producing reservoir. As the reservoir is depleted various characteristics can change, which leads to threshold alarms that become stale and potentially triggering too early (nuisance alarms) or too late (allowing excessive risk or equipment damage). As such, many operations call for routine alarm threshold reviews and updates, and this process can take up a considerable portion of time for operations managing many wells and/or locations with highly complex alarming schemes. Such manual intervention can be detrimental to addressing one or more high ranking triage score asset issues.

As an example, via combining automation with event detection components (such as AED) and/or advanced models, such as a digital twin, a system can simplify threshold and/or alarm-related processes and, for example, result in better protection while freeing up a considerable amount of human time. As an example, a system can provide for thresholds that can be automatically updated on a much more frequent interval with more appropriate thresholds.

As an example, a space can be defined by amplitude, one or more variates and time. As an example, a system can utilize an auto-adjustment approach to adjusting thresholds (e.g., alarm, surveillance, etc.). For example, operational changes and/or events may be taken into consideration.

As an example, the GUIs 1510 and 1530 may be heatmaps, which can be coded for monitoring various assets. As an example, a system can provide for rendering of space-optimized heatmaps to allow a user to quickly visualize the status of multiple assets, for example, by using color to indicate either a quantitative or qualitative measure. For example, a heatmap grid can help an asset manager or surveillance engineer rapidly visualize an asset's: alarm state; estimated health; production rate; energy utilization; instantaneous power; asset uptime or downtime, etc. As explained, the GUIs 1510 and 1530 can include selectable items in a menu such that a user may simultaneously render or toggle between views.

As an example, in the GUIs 1510 and 1530, a mouse-over tooltips (e.g., finger hover, stylus hover, voice command, etc.) with graphical indicators can provide quick context on the asset to the user. Tooltip information can include the most relevant information for the user to determine if an action is to occur. For example: operating state; alarm state; asset identifying information; asset type; and state duration.

As mentioned, trends may be rendered, for example, consider the GUI 1600 of FIG. 16 and the GUI 1800 of FIG. 18. As an example, a trend that starts with a baseline count at the start of the shift can give the user a baseline to work against, and indicate in a readily understood visualization if the number of issues is decreasing or increasing as the user or team works to address tasks and mitigate problems.

As an example, a GUI can provide for attributes/characteristics of a short-term trend, where one or more of: the performance trends may reset at the start of the user/team shift; the performance trend may be bound to the total number of issues, or a filtered list of issues (e.g. total count of particular issues); and the performance trend may be bound to a specific user or team (e.g. issues assigned to user John Doe). As an example, consider attributes/characteristics of the long-term trend, where one or more of: the trend may indicate a macro view of how well that particular user or shift is performing over a longer period of time (e.g., n shifts); a positive indicator (direction, color, etc.) can indicate that the user or group addressed more problems than were generated for the observation duration (e.g., shift); a mildly negative indicator can indicate that the user or group addressed slightly fewer problems than were generated for the observation period; a strongly negative indicator can indicate that the user or group addressed considerably fewer problems than were generated for the observation period;

and a long-term trend view may include benchmark lines such as the a PI or objective and/or a peer benchmark.

As shown in the example GUIs 1700 of FIG. 17 and 1900 of FIG. 19, a table format may be rendered, which can be for various actions. As an example, as part of multi-monitoring workflows, a system can include a dedicated actions screen that helps the users manage their ongoing work. For example, consider a GUI that includes one or more of: a live countdown timer until they are scheduled to follow up on the next task; a current state/triage as well as the initial state/triage; how long the issue has been actively managed; who or what is assigned to next act on the action; and what next action is recommended, which may be a workflow or workflow action (see, e.g., workflows "WF" of the GUI 1900 of FIG. 19).

As an example, a system may automatically reassign actions to a hand-over/shift-replacement user when the system is being used in a shift-scheduled workplace. For example, such an action may be handled in one or more manners, such as: a user logging out at the end of their shift may delegate any outstanding actions to their shift replacement, e.g.: "assign my (3) outstanding actions to J. Doe"; a user logging in to start their shift may pull actions to their shift. The system may suggest users that have a shift that has recently ended or will soon end. For example: "assign responsibility for (3) of J. Doe's outstanding actions to me."

Figure 22:
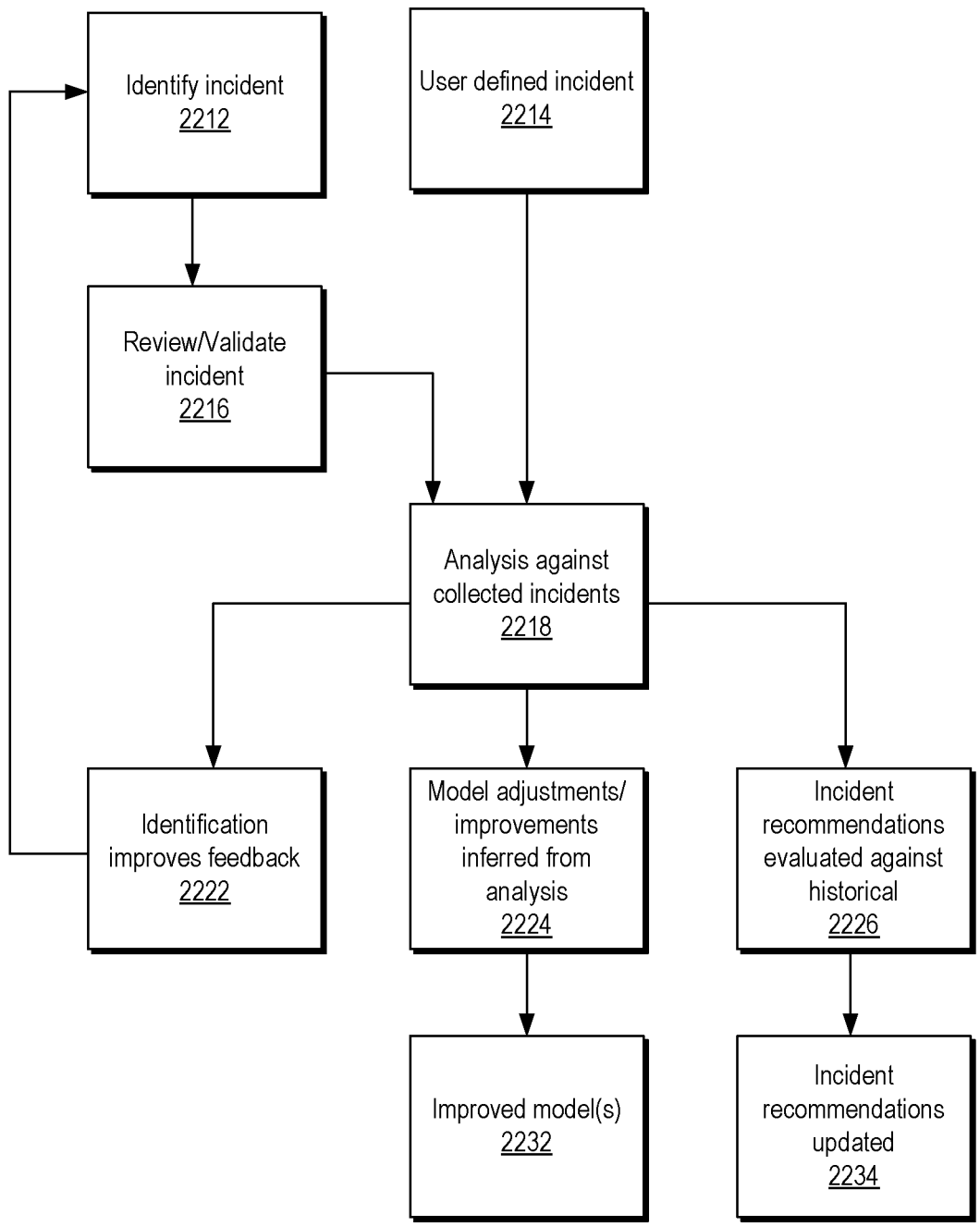
FIG. 22 illustrates an example of a method.

FIG. 22 shows an example of a method 2200, which may be utilized for incidents and model updates and retraining. In FIG. 22, the method 2200 includes an incident identification block 2212 and a user defined incident block 2214. In such an approach, the block 2212 may operate using a machine that automatically detects incidents while the block 2214 may operate using a human input device (HID) that is operatively coupled to a machine. As shown, the method 2200 includes a review/validation block 2216 and an analysis block 2218 that can provide for analysis of incidents against collected incidents. As shown, the analysis block 2218 can provide output to an identification improvement feedback block 2222, a model adjustment and improvement block 2224 and an incident recommendation block 2226 for evaluation of an incident recommendation against, for example, historical data, etc. As shown, the method 2200 can include a model improvement block 2232 for improving one or more models and can include an incident recommendation update block 2234 for updating a recommendation with respect to an incident.

As an example, a system can output an incident where the incident characterizes condition(s) that may be caused many individual events, alarms, user actions, and comments into a more readily understood concept. For example, a shutdown may spawn a dozen notifications, threshold alarms, and other warnings to the user. Addressing each of these in isolation can be time consuming and repetitive. As an example, a system can provide an ability to group such items together under a descriptive type of incident (e.g., "power loss incident", etc.). Such an approach may be automatic, semi-automatic and/or via user interactions with one or more GUIs. As an example, a grouping component can provide for streamlined alarm/event handling for a surveillance user; and/or simplified incident reporting to a client (e.g., telling the client there was a "power loss" is more immediately useful than showing many different threshold alarms such as low intake pressure, low discharge pressure, low motor amps, low drive frequency, etc.).

Figure 23:
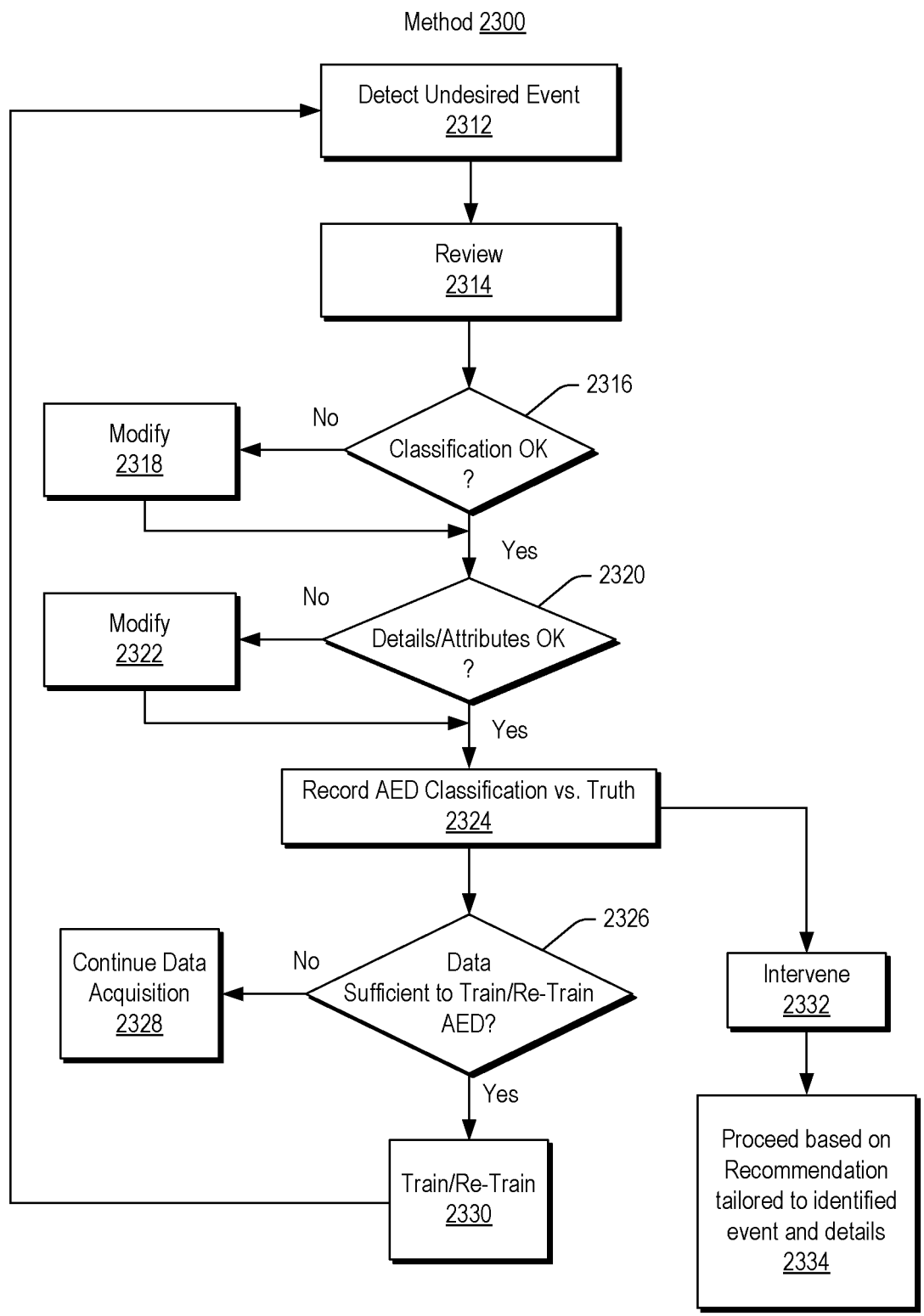
FIG. 23 illustrates an example of a method.

FIG. 23 shows an example of a method 2300 that includes a detection block 2312 for detecting an undesired event, a review block 2314 for reviewing and classifying the detected undesired event, a decision block 2316 for deciding whether the classification is acceptable, a modification block 2318 for modifying an unacceptable classification, a decision block 2320 for deciding whether details and/or attributes of the classified, undesired event are acceptable, a modification block 2322 for modifying one or more unacceptable details and/or attributes, a recordation block 2324 for recording the classified, undesired event versus a ground truth (e.g., a label, etc.), a decision block 2326 for deciding whether data are sufficient to train and/or re-train an automatic event detection engine, a continuation block 2328 for continuing to acquire data, a training block 2330 for training and/or re-training an automatic event detection engine (e.g., a machine learning model, etc.), an intervention block 2332 for intervening in one or more operations associated with the undesired event, which may be an undesired operational event, and a proceed block 2334 for proceeding with an intervention based on a recommendation tailored to address the detected, undesired event, which can be based on one or more details of the detected, undesired event. As shown, the block 2330 can be utilize for further detection(s), for example, per the block 2312, which may operate using an automatic event detection engine.

As an example, the method 2300 may operate in conjunction with one or more triage engines. For example, the detected, undesired event can be utilized to generate a triage score, which may be ranked, associated with an action, etc. For example, the intervention block 2332 may be operatively coupled to a triage engine such that the intervention occurs in a manner that depends on a triage score and, for example, an associated action. As explained, a triage score that may be ranked lower than one or more others may be not as, relatively, urgent as to intervention. As shown in the example of FIG. 23, the method 2300 can call for intervention and can call for training and/or re-training of an automatic event detection engine (e.g., of an AEDF, etc.).

The method 2300 can, for example, provide for decision making to continue acquiring training data, training/retraining of an event detection system, proceeding to intervention, etc.

As an example, based on event classification, duration, and well-specific details, a system can provide tailored intervention recommendations to a user via one or more GUIs. Such an approach can, for example, result in shortened intervention and mitigation cycles, as a user may tend to have fewer potential courses of action to analyze and choose from (see, e.g., the GUI 1900 of FIG. 19).

As an example, a system can acquire data on success rate of system-provided suggestions and how users act on guidance. As these metrics are collected, a system may feed into further analysis tools such as, for example: one or more machine learning or AI tools that can then make improved recommendations based on the effectiveness of historical recommendations and corresponding actions; and/or one or more operator efficacy/performance evaluation tools that can determine which system users are meeting performance objectives or how to rank operators by ability to protect assets in the shortest amount of time where, for example, quantitative information can be utilized to further prioritize or deprioritize the expert's future actions for the training of future models. For example, if user A tends to take the right action while user B does not, user A's actions will be used to positively inform the model while user B's actions will not.

Figure 24:
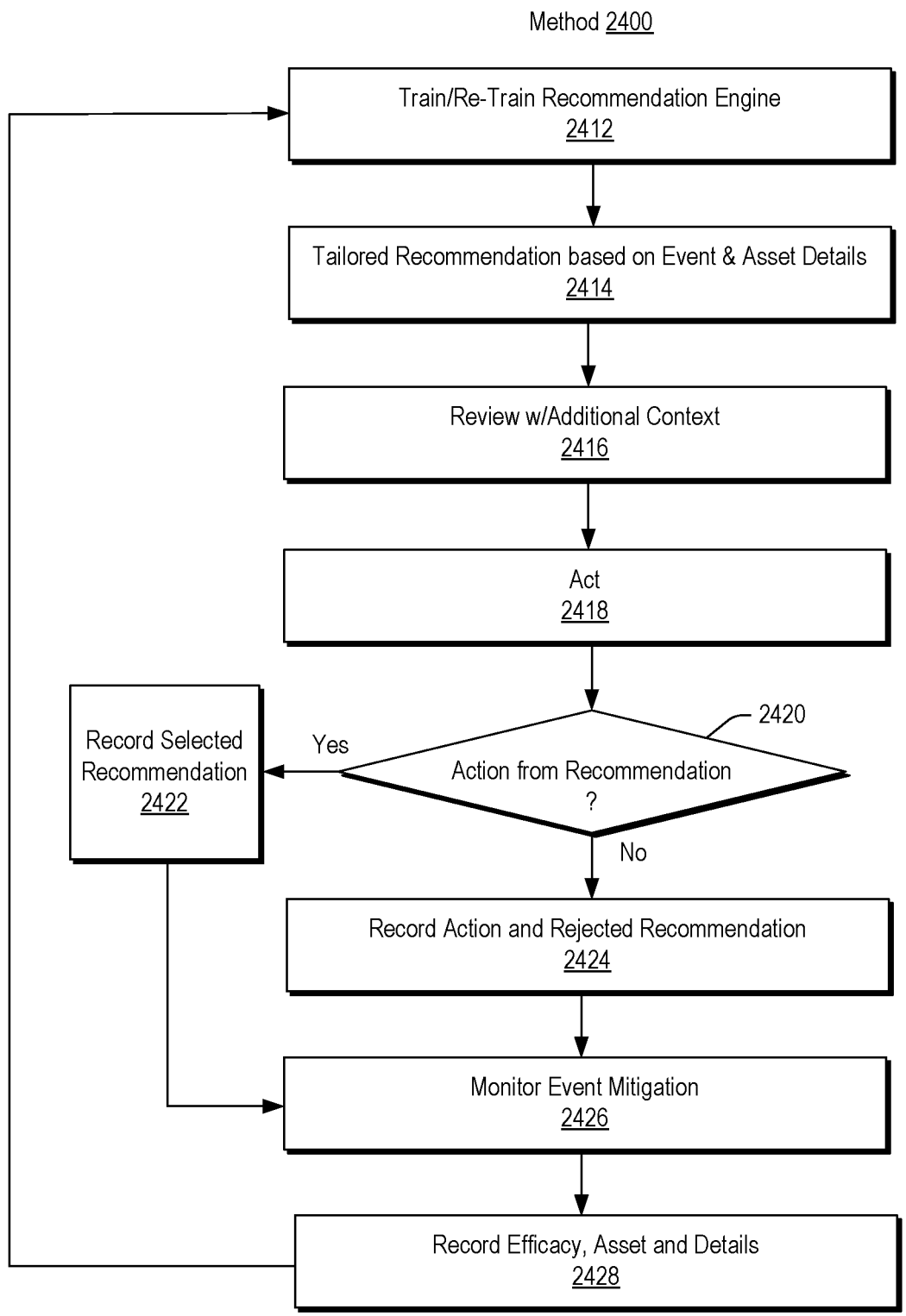
FIG. 24 illustrates an example of a method.

FIG. 24 shows an example of a method 2400 that includes a training block 2412 for training and/or re-training a recommendation engine, a tailoring block 2414 for tailoring a recommendation based on an event and/or asset details, a review block 2416 for reviewing a recommendation, optionally with additional contextual information, an action block 2318 for acting according to the recommendation, a decision block 2420 for deciding whether the action is a proscribed action or an action derived from the recommendation, a recordation block 2422 for recording the taking of the selected action, a recordation block 2424 for recording the action as being an action not from the recommendation (e.g., a rejected recommendation), a monitor block 2426 for monitoring mitigation of the event responsive to taking the action per the action block 2418, and a recordation block 2428 for recording efficacy of the action, along with asset data and one or more other details. As indicated, the method 2400 can include a loop such that the recordation block 2428 can be utilized for training and/or re-training per the training block 2412.

As explained, a method can provide for training and/or re-training of one or more types of engines, which may be utilized for detection, decision making, recommendations, etc. As an example, a system can provide for collecting expert feedback on event classification in real-time or near-real-time such that the system may more rapidly incorporate a growing body of truth data to retrain an automated event detection engine. Compared to a training cycle that demands a separate phase of retraining an underlying machine learning component of a detection system on acquired historical truth, an online truth collection system may utilize the information more frequently to retrain the system, evaluate the new performance against success criteria, and even automatically self-deploy if the criteria are met. Such an approach can shorten an improvement cycle and can result in a rapidly improving detection system with reduced human input.

As shown in various GUIs (see, e.g., FIGS. 16, 17, 18 and 19), a system can include an event comparison tool that allows a user to evaluate a selected event against one or more of the same type of events, for example, from the same or similar assets (e.g., or other criterion or criteria). For example, a user may wish to compare startups, and look at how similar the drive frequency, choke position, and motor current are from each start on that asset.

As an example, a comparison tool can allow a user to select the n-th last event with navigation tools, so the user can select the last event or an earlier event as the baseline for comparison.

As an example, with respect to artificial lift as implemented by ESPs, events may include, for example, one or more of: starts, stops, AED events, such as: gas interference, stuck pump, insufficient lift, dead head, etc.; first start (compared to similar peers); etc.

As an example, a system can provide for multi-asset startup or shutdown orchestration. For example, starting or stopping multiple assets can present challenges on both asset inputs and outputs. As an example, a system can provide for execution of bulk actions on a number of assets. Such an approach may be automated and customized for one or more purposes in a manner that may proceed without a user's particular consideration to constraints, which may create ripple effects on the larger system. For example, a system can implement an intentional, rational approach that can result in minimized disruption.

As an example, consider, after a field, pad, or multi-pad shutdown: excessive demands can be placed on the electrical grid and/or generators when attempting to restart all of the electrical equipment at the same time. A system that has reasonably accurate estimates of the asset power requirements and startup profiles can create an optimized startup schedule that can bring the assets online as fast as possible without overstressing the electrical supply and potentially resulting in unintended sags, brownouts, or further 'trips' necessitating additional restart attempts.

As an example, consider, after field, pad, or multi-pad shutdown, downstream production infrastructure and/or facilities may not be prepared to deal with the rapid transition from zero production to the assets producing nearly simultaneously again. This can result in reactionary changes to manage the incoming production, and this reactionary approach can result in restricting flow or production from the wrong assets (e.g., assets that can be considered above others).

As an example, a system can provide a user with "smart" bulk-action tools that can identify common problems, such as excess power demand on the infrastructure, and offer recommendations to the user that will address the bottleneck or restraints.

As an example, to reduce mental strain and the problems associated with vigilance tasks that demand frequent mental "context switching", multiple, dedicated displays can be coordinated by a system (e.g., a coordination application) and used to perform very specific, related tasks. Such an approach can address issues that may arise from copying and pasting information between windows or applications, complex navigation, or arranging multiple graphical user interface panels or windows to work through a complex task.

As an example, dedicated displays can present an asset manager with a simplified workspace that uses spatial consistency to simplify the mental tasks of working through a problem. For example, consider an arrangement that allows a user to: use their left-most display to assess emergent situations that jeopardize operations or assets; use their center display to investigate the situation and take the corrective action; and use the right-most display to keep track of various multi-step asset management tasks that are in progress.

As an example, consider dedicated displays on the outside (e.g., left-most and right-most) can both drive a center display, which is where a user tends to spend most of the time performing complex and demanding tasks. In such an example, the user can focus her attention immediately in front and temporarily ignore potential distractions of the other displays while she performs time-sensitive, high-risk corrective action or investigation. Once a high-intensity task has been completed, she can then resume observing the outside, secondary displays for issues that are either developing and deserve attention (left-most display), or actions that are coming due for follow up (right-most display).

As an example, GUIs can provide a timeline, where the timeline may utilize an X-axis as a trend chart/x-y scatter chart, which may provide a user with a highly-intuitive view of various things, such as specific points in time where an annotation, hazard/event, or action was taken. As an example, placement of lines/bars and graphical indicators/icons can be driven by the X-axis as the time-series trends above or below the timeline. As an example, a GUI can provide, for a specific point in time, rendering of signals related to an event region or regions with defined start and end points, as well as events with specific points in time. As an example, consider rendering of colored bars and point-in-time events indicated with graphical symbols to indicate comments, alarms, and actions.

As an example, a system can provide for interactions between users and/or "bots" that may interact with various users in an automated manner. For example, a bot may prompt a user to make a comment (e.g., "this trend is pertaining to what issue?"). In turn, the input may be utilized to label and/or suggest labels for trends in data for one or more other assets, which may be under monitoring by the user and/or by another user. As an example, a bot approach may spread a labeled trend amongst a community of user, which may help to confirm and/or deny and/or customize (e.g., refine, etc.) a trend. Such an approach may operate in a crowdsourcing manner, where "votes" may be accumulated and/or comments, for example, in one or more conversations. As an example, a user may highlight one or more of the conversations as indicative of details as to reasoning (e.g., underlying cause), prevention, action, etc. As an example, an AI approach may be utilized to learn from votes, comments, etc., which may be a bot driven and/or human interaction drive approach to improving a system. As an example, a feature may be switched on, for example, to train new users and, for example, switched off, where an experienced user does not desire to be directly involved in one or more aspects of a community-based approach.

As an example, a GUI can render a tabular list of events (see, e.g., the GUI 1900 of FIG. 19). As an example, a tabular view of events can include regions, point-in-time events, actions and comments. Such a tabular view may be filtered and navigated as an ascending or descending list sorted by multiple criteria. As an example, when an item from a list is selected, it can move a timeline and line-chart to cover that region in time, so that the user can quickly and easily see what the signals looked like around that event. Such an approach can provide a much faster and more intuitive way to review events without a user having to manually 'scrub' or navigate through a timeline or historical chart to try to match up events and signals.

As an example, a GUI can include a visualization of one or more past events, for example, in the context of an unfolding event. For example, consider a GUI that presents data associated with a previous startup, which may include accompanying comments as a new startup is executed on the same well/platform. As an example, comments may be presented along a timeline that includes various startup actions.

As an example, a user may select an item from a timeline of a GUI, where a system automatically selects a corresponding item in a tabular list of events.

Figure 25:
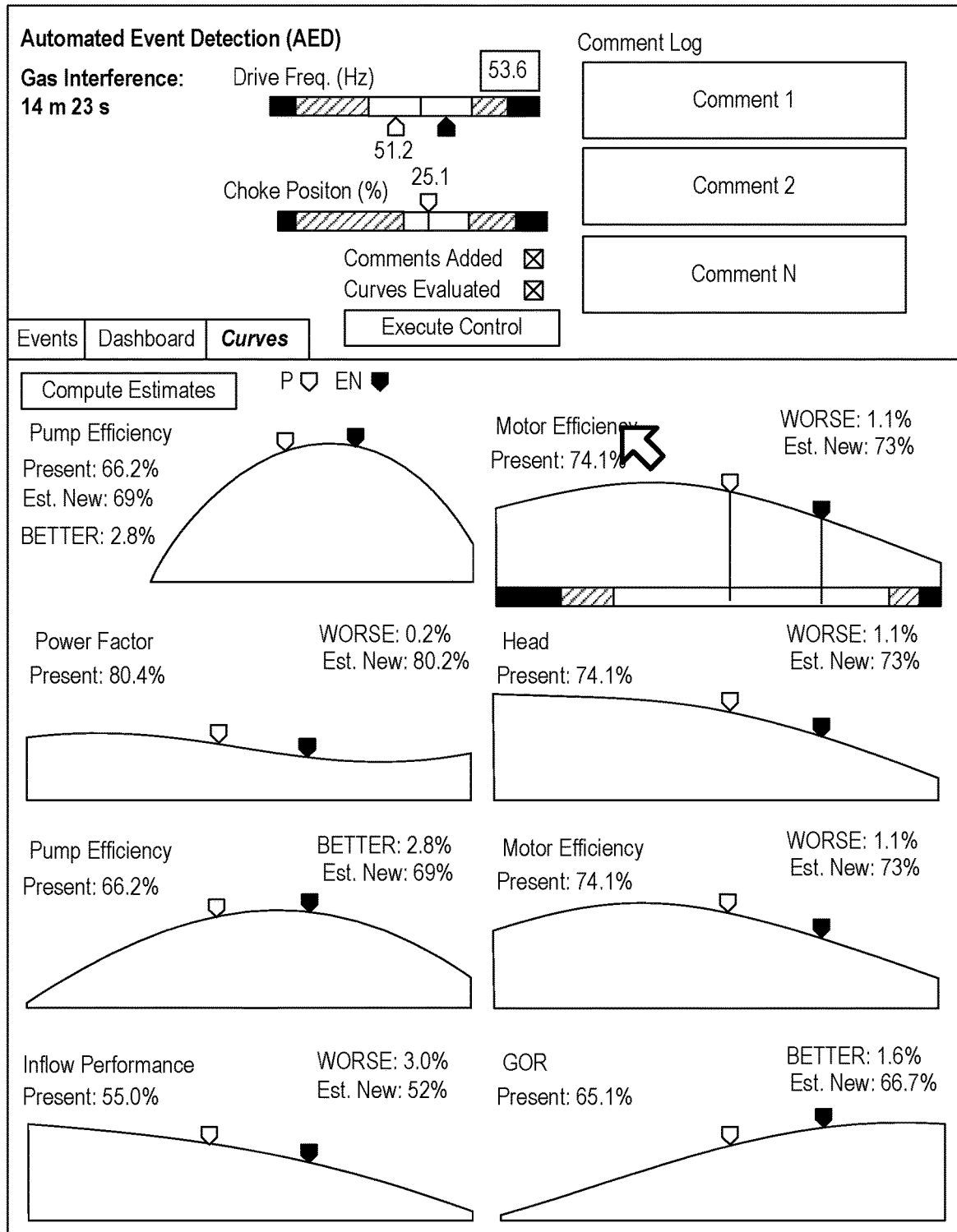
FIG. 25 illustrates an example of a graphical user interface.

FIG. 25 shows an example of a GUI 2500 that includes various graphics that include a "P" and an "EN", which stand for present (P) and estimated new (EN). In such an example, a user can readily assess consequences of transitioning from a present state to an estimated new state. Such an approach may be utilized for optimization and/or for addressing one or more issues that may arise, for example, as classified by a triage score. In the example of FIG. 25, the issue is indicated to be gas interference, with a time duration of approximately 14 minutes and 23 seconds. As shown, the drive frequency is approximately 51.2 Hz and a EN is 53.6 Hz; while a choke position in percent is at 25.1 (e.g., for a choke flow valve at a wellhead that controls flow of fluid out of the well to a surface equipment network). As shown, an "execute control" graphic can be rendered that allows a user to cause a system to issue one or more control instructions to, for example, change the operational frequency from 51.2 Hz to 53.6 Hz. The GUI 2500 also shows various comments in a comment log, which can include various concerns, learnings, etc., which may guide a user in deciding whether or not to cause the system to issue the control instruction(s). The GUI 2500 can also include a "compute estimates" graphical control, which may provide for detailed views of what may happen if the recommended change in frequency is implemented.

As an example, a system can provide for model-assisted interventions and control actions. For example, in the context of an ESP, functionality provided by a system via a GUI can allow a user to perform power optimization with surface voltage and/or volts/Hz adjustments along with frequency.

As shown in the GUI 2500, there can be a variety of performance envelopes to consider when making changes to an operating point of a production asset (e.g., from 51.2 Hz to 53.6 Hz). As an example, even a change of a single operating point, for example drive frequency or surface choke position, can result in various underlying parameters shifting within a performance envelope. In the example GUI 2500, the envelopes pertain to an ESP variable frequency drive frequency and include pump efficiency, power factor, inflow performance, motor efficiency, head and GOR. As shown, in moving from P to EN, some envelopes improve while others worsen. As such, a user may visual tradeoffs. As shown, an underlying range indicator can facilitate review where a worsening envelope may still be within an acceptable operational range (see, e.g., motor efficiency where the EN is within a green operational range).

As explained, by linking the ESP surveillance and control system with models, the operator has the ability to estimate the impact of the new operating point before making the change. In the example GUI 2500, the operator is going to increase the variable drive frequency from 51.2 Hz to 53.6 Hz. Before executing the control, the operator can run the estimation with the model(s), and the user interface can present the estimates to the user in an easy to understand format, which can include one or more of the following: 1. A net change, indicating if the change is positive or negative; 2. The present position on the curve or within the model, with optional additional context of how that relates to the equipment, system, or sub-system performance envelope (represented above by red, yellow, and green bars along the bottom of the curve); 3. The estimated new position along the curve or within the model; and 4. The present value and the estimated new value once the change has been executed and the system becomes stable at the new operating point.

A GUI such as the GUI 2500 can present various types of data to a user, which can allow the user to determine if the new point is likely to fall within the safe operating envelope and check for potentially hazardous or unintended consequences, such as putting the pump into upthrust, entering pump-off, or moving the motor efficiency outside the recommended operating range. By integrating the modeling into the workflow, the user can make this a regular part of a workflow, increasing the safe operation of the system. As mentioned, the issue "gas interference" may be characterized by a triage score as computed by a triage engine. In such an example, a dashboard may provide an indication of the triage score where a user may interact with the dashboard to commence a workflow (e.g., a thread) to address the issue, which may cause rendering of one or more graphical controls such as in the example GUI 2500 to allow the user to assess and/or take one or more actions.

Managing a large population of assets operating within a complex system becomes challenging for humans as the number of variables to be managed increases. For example, consider the following abbreviated list of variables to consider when managing a number of electromechanical machines installed in hydrocarbon reservoirs: reservoir drawdown versus optimal production rate for maximum revenue; reservoir pressure versus minimum sandface pressure before damage to the reservoir occurs; nameplate ratings of the electric submersible pump motor, including maximum current; available lift energy for the field (e.g., electricity for ESPs, gas for gas lift, etc., where a goal may be to optimize power consumption to maximize overall production at the field level); pump operating curve, including regions of upthrust/downthrust; rate at which the motor temperature is increasing; motor/equipment temperature vs. the maximum operating temperature of the equipment where failure, degradation, or shortening of the equipment life occurs; production rate of the pump; energy dissipated in pump; water cut (e.g., percentage of the fluid being produced is marketable hydrocarbons); etc.

In isolation, an experienced individual may manage the asset and successfully mitigate dangerous events, controlling the pump speed (RPM) or pressure control valves after consulting with information that will inform the safe operating envelope of the equipment. This becomes extremely challenging though when the operator is responsible for dozens or even hundreds of assets and when multiple assets are in dangerous events/scenarios at one time. In this case, the human operator can often resort to making an immediate decision on which asset to sacrifice or jeopardize, and which asset to save (e.g., mitigate). To address such a local operator-to-operator based decision making process, a system can utilize a triage engine as a computational tool for weighing multiple criteria in accordance with the asset owner/stakeholder objectives and business goals as to technological processes at hand, and then presenting the user with a single score per asset that indicates priority of action.

Without the triage engine, if a user is presented with three assets experiencing a rapidly escalating, time-sensitive event, the user may not intuitively know which asset is to be worked on first due to the large number of factors to be considered. With a system utilizing a triage engine, each of the three wells presenting a triage score, which may be ranked, a user can focus on the asset with the highest triage score, as this is the asset determined to objectively present the biggest risk to the enterprise with respect to one or more technological processes.

Figure 26:
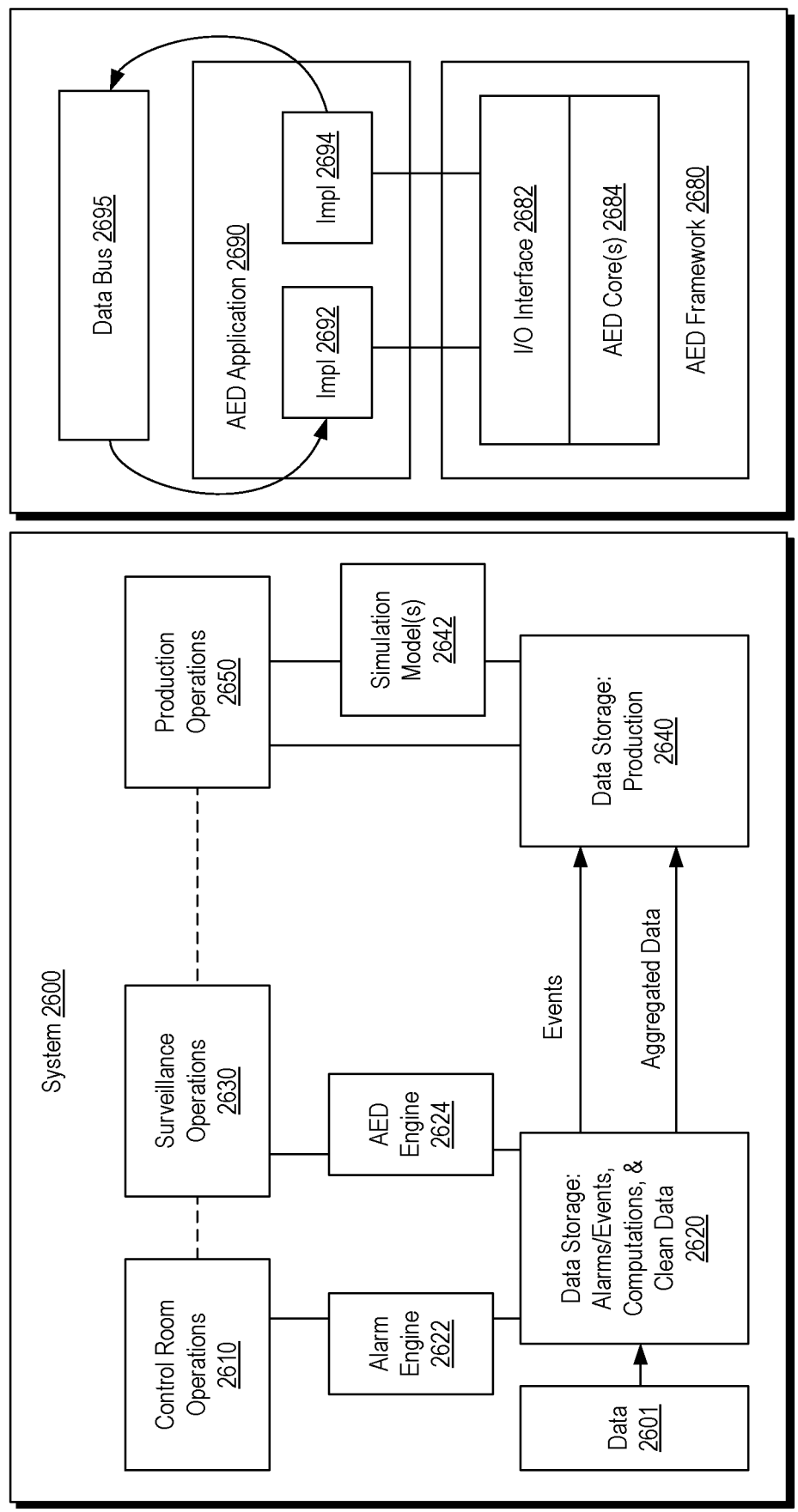
FIG. 26 illustrates an example of a system and example components that include an automated event detection framework.

FIG. 26 shows an example of a system 2600 and various components thereof. As shown, the system 2600 can include a data component 2601 that is operatively coupled to a data storage component 2620, which can be operatively coupled to a data storage 2640 that, for example, is utilized for production management (e.g., production decision making, control, etc.). As shown, the system can include or be operatively coupled to various equipment in various environments such as a control room for control room operations 2610, a surveillance environment for surveillance operations 2630, and a production environment for production operations 2650. As an example, an alarm engine 2622 may be utilized for transmitting alarms for the control room operations 2610, an AED engine 2624 may be utilized for detecting and transmitting events for the surveillance operations 2630, and one or more simulation models 2642 may be utilized for transmitting results as to production for the production operations 2650.

In FIG. 26, various example components are illustrated such as an AED framework 2680, an AED application 2690 and a data bus 2695 (e.g., wired and/or wireless). As shown, at a level of the AEDF 2680, there are an 1/0 interface 2682 and one or more AED cores 2684 that can be utilized to host one or more AED applications (e.g., AEDAs) 2690 (see, e.g., implementations 2692 and 2694), which can interface with one or more data busses 2695. As shown, an AEDA can receive and/or transmit data, where transmission may include transmission of one or more signals that can call for a control action with respect to one or more pieces of equipment. As shown in FIG. 26, AEDF 2680 is practically applied through use of various types of technology, which can include expert-based or expert-tuned technology, which can be implemented via one or more types of GUIs, which can allow for real-time and/or offline interactions.

As development, production, etc., of a field progresses, the system 2600 can become "smarter", for example, able to generate more accurate output and/or select more particular input for purposes of generating more accurate output. As mentioned, an expert may interact with a GUI to add something that an AEDF did not detect. In response, an AEDF can adjust to call for one or more different types of input, call for analysis of inputs at certain times, call for analysis of inputs not previously analyzed together, call for different types of control actions, etc.

As an example, a method can include detecting an event occurring in an oilfield via a computational framework; rendering the event to a graphical user interface of the computational framework; responsive to the detecting, performing an action in the oilfield; assessing an impact of the action; determining whether the event is terminated; and, responsive to the event not being terminated, interacting with the computational framework to revise the computational framework.

As an example, an event can be an artificial lift event, a drilling event, a stimulation event (e.g., hydraulic fracturing, chemical treatment, water flooding, SAGO, etc.), or another type of oilfield operational event.

As an example, a computational framework can include one or more processors and memory accessible by at least one of the one or more processors. As an example, a computational framework can be operatively coupled to at least one piece of equipment in the oilfield. As an example, computational framework can be or include a field equipment controller.

As an example, a computational framework can be operatively coupled to a database where interacting with the computational framework revises the database.

As an example, detecting can be performed via a trained machine model and a method can include re-training the machine model based at least in part on interacting with to generate a re-trained machine model for detecting events.

As an example, a system can include a processor; memory accessible by the processor; processor-executable instructions stored in the memory and executable to instruct the system to: detect an event occurring in an oilfield via a computational framework; render the event to a graphical user interface of the computational framework; responsive to detection of an event, perform an action in the oilfield; assess an impact of the action; determine whether the event is terminated; and, responsive to the event not being terminated, interact with the computational framework to revise the computational framework. As to termination of an event, resolution and/or completion may cause termination.

As an example, one or more computer-readable storage media can include processor-executable instructions to instruct a computing system to: detect an event occurring in an oilfield via a computational framework; render the event to a graphical user interface of the computational framework; responsive to detection of an event, perform an action in the oilfield; assess an impact of the action; determine whether the event is terminated; and, responsive to the event not being terminated, interact with the computational framework to revise the computational framework.

As an example, a method can include receiving time series data acquired during equipment operations at a plurality of natural resource sites; detecting operational events using the time series data; ranking the operational events; associating each of the operational events with a corresponding operational action; and outputting at least a portion of the ranked operational events, each with its corresponding operational action. In such an example, outputting can include rendering graphics for the at least a portion of the ranked events to a graphical user interface, where the graphical user interface includes graphical controls linked to the graphics that associate each of the at least a portion of the ranked events with its corresponding operational action.

As an example, time series data can include one or more of temperature time series data, pressure time series data, fluid flow time series data and electrical time series data. For example, temperature time series data can include equipment temperature time series data for pieces of equipment that perform the equipment operations; flow time series data can include associated fluid composition data (e.g., gas fraction, gas ratio, hydrocarbon, fluid, water, etc.); pressure time series data can include one or more of reservoir fluid pressure data, wellbore fluid pressure data, pump inlet pressure data, and pump outlet pressure data; and electrical time series data can include electrical time series data for power utilized by individual pieces of equipment that perform at least a portion of the equipment operations.

As an example, a method can include ranking of operational events by computing an operational event score for each of the operational events. Such an operational event score may be a triage score. As an example, consider computing the operational event score by utilizing time series natural resource production data. In such an example, equipment operations can include pumping operations performed by pumps where the time series natural resource production data include fluid flow time series data for a natural resource pumped from a reservoir by the pumps. As an example, equipment operations can include pumping operations performed by pumps where time series natural resource production data include pressure time series data for a natural resource pumped from a reservoir by the pumps. As an example, a method can include comparing at least a portion of time series natural resource production data to model data, where computing an operational event score increases the operational event score for a decrease in natural resource production at one of the natural resource sites.

As an example, a method can include classifying each of a plurality of operational events as active or completed.

As an example, a method can include, for each of a plurality of operational events, determining one or more of a severity, a duration and a type. [00283] As an example, a method can include, responsive to receipt of a mode indicator, organizing at least a portion of ranked operational events according to the mode indicator. For example, consider using a natural resource site mode or an equipment mode. As an example, a mode indicator can be for a natural resource site mode where natural resource sites include wells in fluid communication with a common reservoir and where a method can output at least a portion of ranked operational events by outputting a ranked list of at least a portion of the wells that correspond to the at least a portion of the ranked operational events.

As an example, a mode indicator can be for an equipment mode where equipment operations are performed by pumps and where a method can output at least a portion of ranked operational events by outputting a ranked list of at least a portion of the pumps that correspond to the at least a portion of the ranked operational events.

As an example, a plurality of natural resource sites can include wells in fluid communication with a common reservoir and a method can include detecting operational events using time series data by detecting an operational event that decreases sandface pressure in a wellbore of one of the wells in relationship to reservoir pressure of the common reservoir. As mentioned, such a condition may possibly give rise to reservoir damage.

As an example, a method can include determining an operational event status. For example, consider an operational event status that is an active status or a completed status. As an example, a method can include, responsive to determining that one of a plurality of operational events has a completed operational event status, a method can include ranking the operational events without that one of the operational events.

As an example, time series data can include natural resource site identifiers, channel identifiers, timestamps and values.

As an example, a method can include, responsive to receipt of a selection of one of a plurality of output ranked operational events, issuing a control instruction that instructs equipment to perform a corresponding operational action. For example, consider a method that includes rendering a graphic to a graphical user interface for the selected one of the output ranked operational events, determining a control status of the selected one of the output ranked operational events, and dynamically updating the graphic responsive to the determined control status. In such an example, rendering can include rendering the graphic adjacent to a graphic for another selected one of the output ranked operational events. In such an example, a method can include dynamically adjusting an order of the graphics responsive to a change in the ranking of the selected output ranked operational events.

As an example, a method can include outputting an operational action graphic that includes at least one optimal equipment operation parameter value. For example, consider equipment operations that include pumping performed by pumps where the at least one optimal equipment operation parameter value is for optimal efficiency of one of the pumps.

As an example, a system can include a processor; memory accessible to the processor; processor-executable instructions stored in the memory and executable by the process to instruct the system to: receive time series data acquired during equipment operations at a plurality of natural resource sites; detect operational events using the time series data; rank the operational events; associate each of the operational events with a corresponding operational action; and output at least a portion of the ranked operational events, each with its corresponding operational action.

As an example, one or more computer-readable storage media can include computer-executable instructions executable to instruct a computing system to: receive time series data acquired during equipment operations at a plurality of natural resource sites; detect operational events using the time series data; rank the operational events; associate each of the operational events with a corresponding operational action; and output at least a portion of the ranked operational events, each with its corresponding operational action.

A method can be associated with various computer-readable media (CRM) blocks. Such blocks generally include instructions suitable for execution by one or more processors (or cores) to instruct a computing device or system to perform one or more actions. While various blocks are shown, a single medium may be configured with instructions to allow for, at least in part, performance of various actions of a method. As an example, a CRM block can be a computer-readable storage medium that is non-transitory, not a carrier wave and not a signal. As an example, such blocks can include instructions that can be stored in memory and can be executable by one or more of processors.

As an example, a method may be implemented in part using computer-readable media (CRM), for example, as a module, a block, etc. that include information such as instructions suitable for execution by one or more processors (or processor cores) to instruct a computing device or system to perform one or more actions. As an example, a single medium may be configured with instructions to allow for, at least in part, performance of various actions of a method. As an example, a computer-readable medium (CRM) may be a computer-readable storage medium (e.g., a non-transitory medium) that is not a carrier wave.

Figure 27:
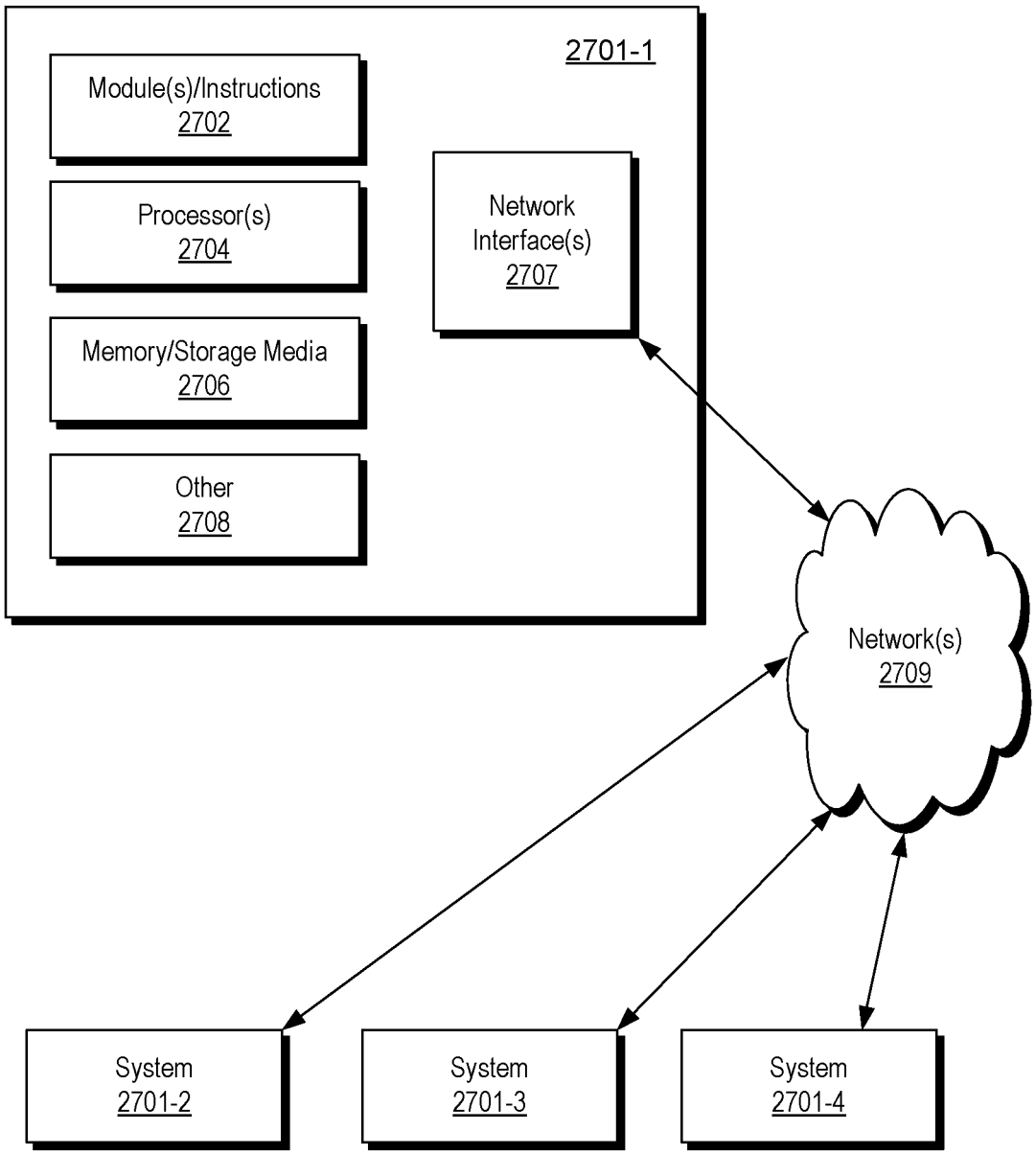
FIG. 27 illustrates an example of computing system.

According to an embodiment, one or more computer-readable media may include computer-executable instructions to instruct a computing system to output information for controlling a process. For example, such instructions may provide for output to sensing process, an injection process, drilling process, an extraction process, an extrusion process, a pumping process, a heating process, etc. [00295] In some embodiments, a method or methods may be executed by a computing system. FIG. 27 shows an example of a system 2700 that can include one or more computing systems 2701-1, 2701-2, 2701-3 and 2701-4, which may be operatively coupled via one or more networks 2709, which may include wired and/or wireless networks.

As an example, a system can include an individual computer system or an arrangement of distributed computer systems. In the example of FIG. 27, the computer system 2701-1 can include one or more modules 2702, which may be or include processor-executable instructions, for example, executable to perform various tasks (e.g., receiving information, requesting information, processing information, simulation, outputting information, etc.).

As an example, a module may be executed independently, or in coordination with, one or more processors 2704, which is (or are) operatively coupled to one or more storage media 2706 (e.g., via wire, wirelessly, etc.). As an example, one or more of the one or more processors 2704 can be operatively coupled to at least one of one or more network interface 2707. In such an example, the computer system 2701-1 can transmit and/or receive information, for example, via the one or more networks 2709 (e.g., consider one or more of the Internet, a private network, a cellular network, a satellite network, etc.).

As an example, the computer system 2701-1 may receive from and/or transmit information to one or more other devices, which may be or include, for example, one or more of the computer systems 2701-2, etc. A device may be located in a physical location that differs from that of the computer system 2701-1. As an example, a location may be, for example, a processing facility location, a data center location (e.g., server farm, etc.), a rig location, a wellsite location, a downhole location, etc.

As an example, a processor may be or include a microprocessor, microcontroller, processor module or subsystem, programmable integrated circuit, programmable gate array, or another control or computing device.

As an example, the storage media 2706 may be implemented as one or more computer-readable or machine-readable storage media. As an example, storage may be distributed within and/or across multiple internal and/or external enclosures of a computing system and/or additional computing systems.

As an example, a storage medium or storage media may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY® disks, or other types of optical storage, or other types of storage devices.

As an example, a storage medium or media may be located in a machine running machine-readable instructions, or located at a remote site from which machine-readable instructions may be downloaded over a network for execution.

As an example, various components of a system such as, for example, a computer system, may be implemented in hardware, software, or a combination of both hardware and software (e.g., including firmware), including one or more signal processing and/or application specific integrated circuits.

As an example, a system may include a processing apparatus that may be or include a general purpose processors or application specific chips (e.g., or chipsets), such as ASICs, FPGAs, PLOs, or other appropriate devices.

As an example, a device may be a mobile device that includes one or more network interfaces for communication of information. For example, a mobile device may include a wireless network interface (e.g., operable via IEEE 802.11, ETSI GSM, BLUETOOTH®, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 20 or a 30 printer. As an example, a 30 printer may include one or more substances that can be output to construct a 30 object. For example, data may be provided to a 30 printer to construct a 30 representation of a subterranean formation. As an example, layers may be constructed in 30 (e.g., horizons, etc.), geobodies constructed in 30, etc. As an example, holes, fractures, etc., may be constructed in 3D (e.g., as positive structures, as negative structures, etc.).

Although only a few examples have been described in detail above, those skilled in the art will readily appreciate that many modifications are possible in the examples. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A method comprising:
   receiving time series data acquired during equipment operations at a plurality of natural resource sites;
   detecting operational events using the time series data based on comparing the time series data to a corresponding threshold, wherein at least one operational event of the operational events is a low frequency event corresponding to a pump;
   ranking the operational events based on an operational event score for each of the operational events, wherein the operational event score is increased for an increase in an amount of energy dissipated by the pump;
   associating each of the operational events with a corresponding operational action;
   outputting at least a portion of the ranked operational events, each with a corresponding operational action; and
   responsive to receipt of a mode indicator, organizing at least the portion of the ranked operational events according to the mode indicator wherein the mode indicator comprises a natural resource site mode;
   wherein the natural resource sites comprise wells in fluid communication with a common reservoir; and
   wherein the outputting at least the portion of the ranked operational events comprises outputting a ranked list of at least a portion of the wells that correspond to at least the portion of the ranked operational events.

2. The method of claim 1 wherein the outputting comprises rendering graphics for the at least a portion of the ranked events to a graphical user interface, wherein the graphical user interface comprises graphical controls linked to graphics that associate each of the at least a portion of the ranked events with a corresponding operational action.

3. The method of claim 1 wherein the time series data comprise one or more of temperature time series data, pressure time series data, fluid flow time series data and electrical time series data.

4. The method of claim 1 wherein the ranking of the operational events comprises computing the operational event score for each of the operational events.

5. The method of claim 4 wherein the equipment operations comprise pumping operations performed by pumps and wherein the time series data comprises time series natural resource production data comprise pressure time series data for a natural resource pumped from a reservoir by the pumps.

6. The method of claim 4 wherein the time series data comprise time series natural resource production data and wherein the computing the operational event score comprises utilizing at least a portion of the time series natural resource production data.

7. The method of claim 6 wherein the equipment operations comprise pumping operations performed by pumps and wherein the time series natural resource production data comprise fluid flow time series data for a natural resource pumped from a reservoir by the pumps.

8. The method of claim 1 comprising classifying each of the operational events as active or completed.

9. The method of claim 1 comprising, for each of the operational events, determining one or more of a severity, a duration and a type.

10. The method of claim 1, wherein the mode indicator comprises the natural resource site mode or an equipment mode.

11. A method comprising:
    receiving time series data acquired during equipment operations at a plurality of natural resource sites;
    detecting operational events using the time series data based on comparing the time series data to a corresponding threshold, wherein at least one operational event of the operational events is a low frequency event corresponding to a pump;
    ranking the operational events based on an operational event score for each of the operational events, wherein the operational event score is increased for an increase in an amount of energy dissipated by the pump;
    associating each of the operational events with a corresponding operational action;
    outputting at least a portion of the ranked operational events, each with a corresponding operational action; and
    responsive to receipt of a selection of one of the output ranked operational events, issuing a control instruction that instructs equipment to perform the corresponding operational action.

12. The method of claim 11 comprising rendering a graphic to a graphical user interface for the selected one of the output ranked operational events, determining a control status of the selected one of the output ranked operational events, and dynamically updating the graphic responsive to the determined control status.

13. A method comprising:
    receiving time series data acquired during equipment operations at a plurality of natural resource sites, wherein the plurality of natural resource sites comprise wells in fluid communication with a common reservoir;
    detecting operational events using the time series data based on comparing the time series data to a corresponding threshold, wherein at least one operational event of the operational events is a low frequency event corresponding to a pump, wherein detecting operational events using the time series data comprises detecting an operational event that decreases sandface pressure in a wellbore of one of the wells in relationship to reservoir pressure of the common reservoir;
    comparing at least a portion of time series natural resource production data of the time series data to model data; and
    ranking the operational events comprising computing an operational event score for each of the operational events, wherein the computing increases the operational event score for a decrease in natural resource production at one of the natural resource sites.

14. A system comprising:
a processor;
memory accessible to the processor;
processor-executable instructions stored in the memory and executable by the process to instruct the system to:
receive time series data acquired during equipment operations at a plurality of natural resource sites;
detect operational events using the time series data based on comparing the time series data to a corresponding threshold, wherein at least one operational event of the operational events is a low frequency event corresponding to a pump;
rank the operational events based on an operational event score for each of the operational events, wherein the operational event score is increased for an increase amount of energy dissipated by the pump;
associate each of the operational events with a corresponding operational action;
output at least a portion of the ranked operational events, each with a corresponding operational action; and
responsive to receipt of a mode indicator, organize at least the portion of the ranked operational events according to the mode indicator, wherein the mode indicator comprises an equipment mode wherein the equipment operations are performed by pumps;
wherein the outputting at least the portion of the ranked operational events comprises outputting a ranked list of at least a portion of the pumps that correspond to at least the portion of the ranked operational events.

15. One or more computer-readable storage media comprising computer-executable instructions executable to instruct a computing system to:
receive time series data acquired during equipment operations at a plurality of natural resource sites, wherein the time series data comprises natural resource site identifiers, channel identifiers, timestamps and values;
detect operational events using the time series data based on comparing the time series data to a corresponding threshold, wherein at least one operational event of the operational events is a low frequency event corresponding to a pump;
rank the operational events based on an operational event score for each of the operational events, wherein the operational event score is increased for an increase amount of energy dissipated by the pump;
associate each of the operational events with a corresponding operational action; and
output at least a portion of the ranked operational events, each with a corresponding operational action.

* * * * *